United States Patent
Koaizawa et al.

(10) Patent No.: US 6,543,257 B1
(45) Date of Patent: Apr. 8, 2003

(54) DEHYDRATION AND SINTERING APPARATUS FOR POROUS OPTICAL FIBER PREFORM

(75) Inventors: Hisashi Koaizawa, Chiba (JP); Nobuaki Orita, Chiba (JP); Junichi Takeda, Chiba (JP); Satoshi Sugiyama, Chiba (JP); Yoshiyuki Sakamoto, Shiga (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/545,673

(22) Filed: Apr. 7, 2000

(30) Foreign Application Priority Data

May 28, 1999 (JP) .......................... 11-149476
Nov. 25, 1999 (JP) .......................... 11-334246

(51) Int. Cl.[7] .......................................... C03B 37/014
(52) U.S. Cl. .......................... 65/489; 65/530; 37/29
(58) Field of Search .......................... 65/489, 500, 530, 65/426, 427, 379

(56) References Cited

U.S. PATENT DOCUMENTS

| | | | | |
|---|---|---|---|---|
| 4,906,268 A | * | 3/1990 | Lane et al. | 219/658 |
| 5,106,401 A | * | 4/1992 | Ishikawa et al. | 65/398 |
| 5,259,856 A | * | 11/1993 | Ohga et al. | 65/423 |
| 5,470,369 A | * | 11/1995 | Tsuchiya et al. | 65/379 |
| 5,549,756 A | * | 8/1996 | Sorensen et al. | 118/663 |
| 2002/0029592 A1 | * | 3/2002 | Yamazaki et al. | 65/424 |

FOREIGN PATENT DOCUMENTS

| | | | | |
|---|---|---|---|---|
| JP | 61-286239 | * | 12/1986 | 65/427 |
| JP | 62-27343 | | 2/1987 | |
| JP | 3-164442 | * | 7/1991 | 65/426 |
| JP | 4-18626 | | 1/1992 | |
| JP | 4-21535 | * | 1/1992 | 65/427 |
| JP | 5-78140 | * | 3/1993 | 65/426 |
| JP | 6-59438 | | 3/1994 | |
| JP | 6-127964 | * | 5/1994 | 65/427 |
| WO | WO 93/23341 | * | 11/1993 | 65/427 |

* cited by examiner

*Primary Examiner*—John Hoffman
(74) *Attorney, Agent, or Firm*—Arent Fox Kintner Plotkin & Kahn, PLLC

(57) ABSTRACT

A porous optical fiber preform dehydration and sintering apparatus capable of improving the sealing performance between an upper lid and an elevating shaft and between the upper lid and a furnace tube or a furnace body, wherein an upper opening of a furnace tube for accommodating a porous optical fiber preform is shut by the upper lid, a preform holder is provided at the bottom end of an elevating shaft passing through the upper lid to be freely elevated therethrough, the porous optical fiber preform in the furnace tube is heated by a heater provided around the outer circumference of the furnace tube, the upper lid is formed by a metal, the preform holder is formed by a quartz glass or a ceramic, a corrosion-resistant layer is provided on an inner surface of the upper lid, a seal member made of rubber or resin is provided in an elevating shaft passage of the upper lid.

21 Claims, 24 Drawing Sheets

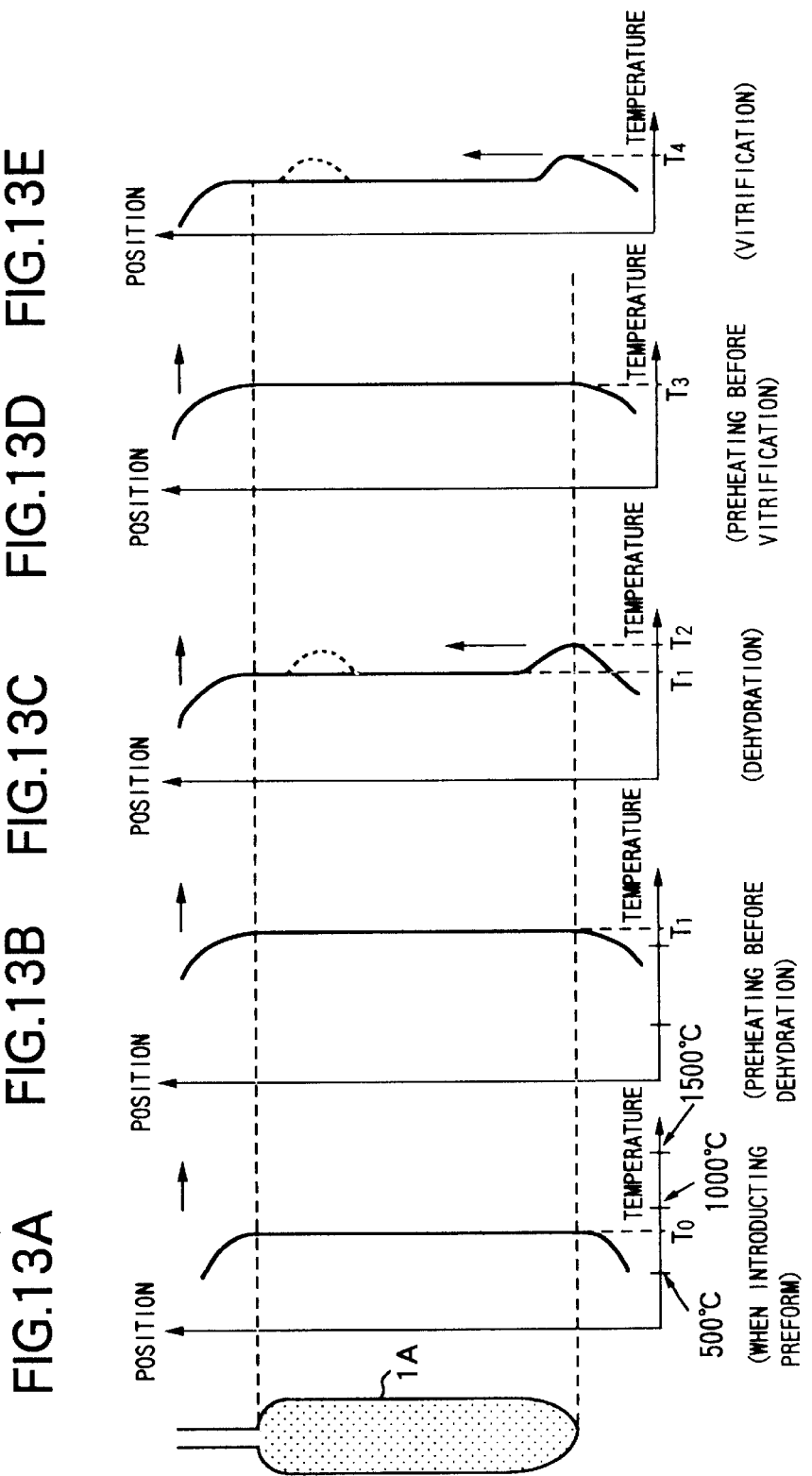

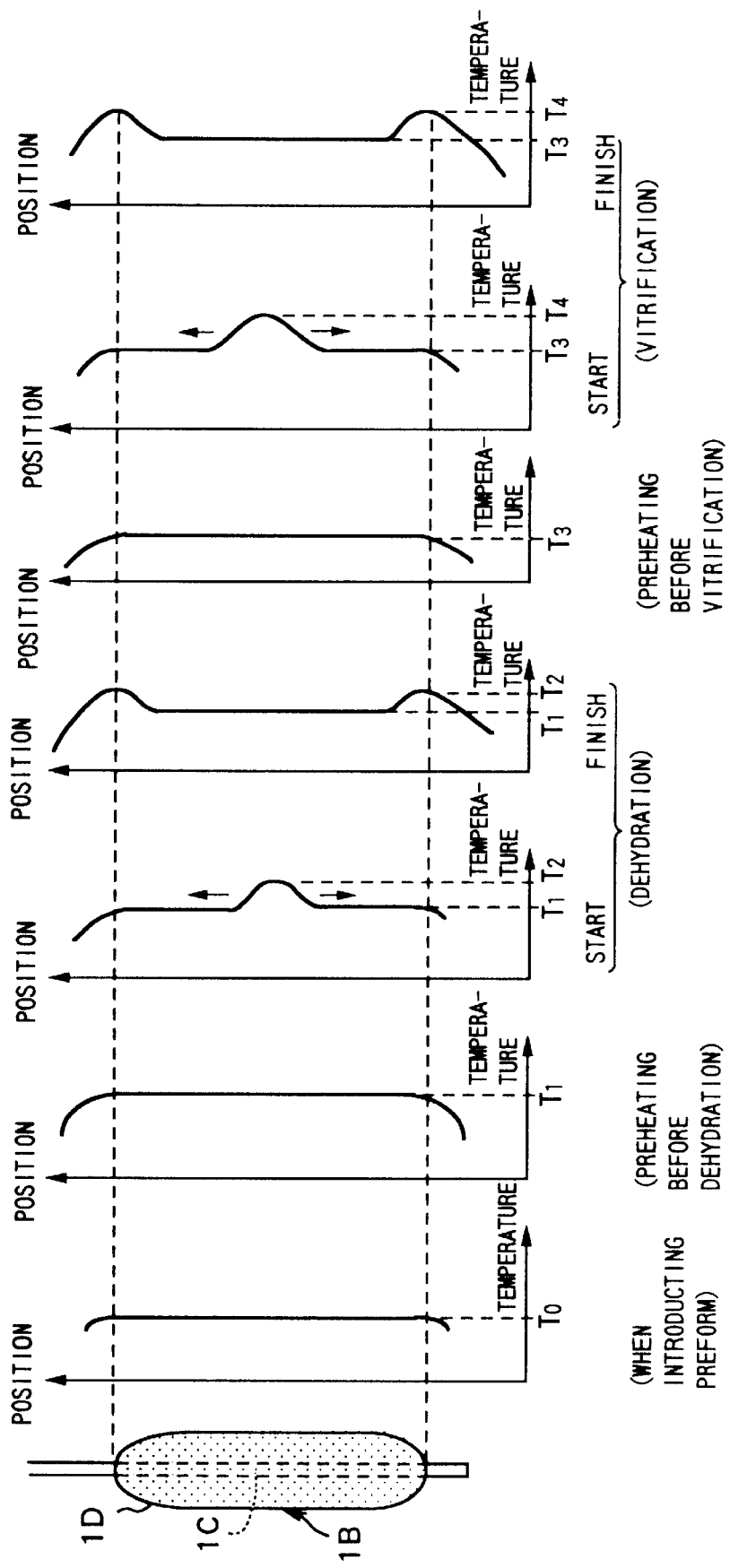

FIG.19A DEHYDRATION DOPING 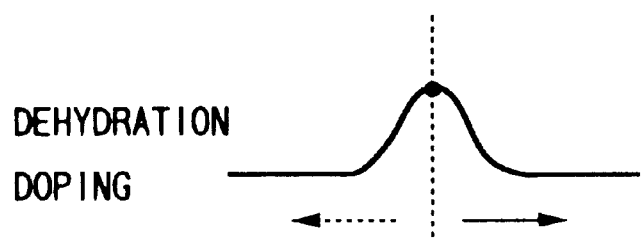
FIG.19B VITRIFICATION 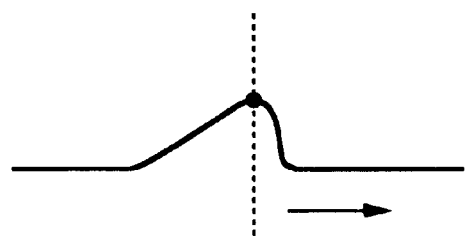

FIG.24A
FIG.24B
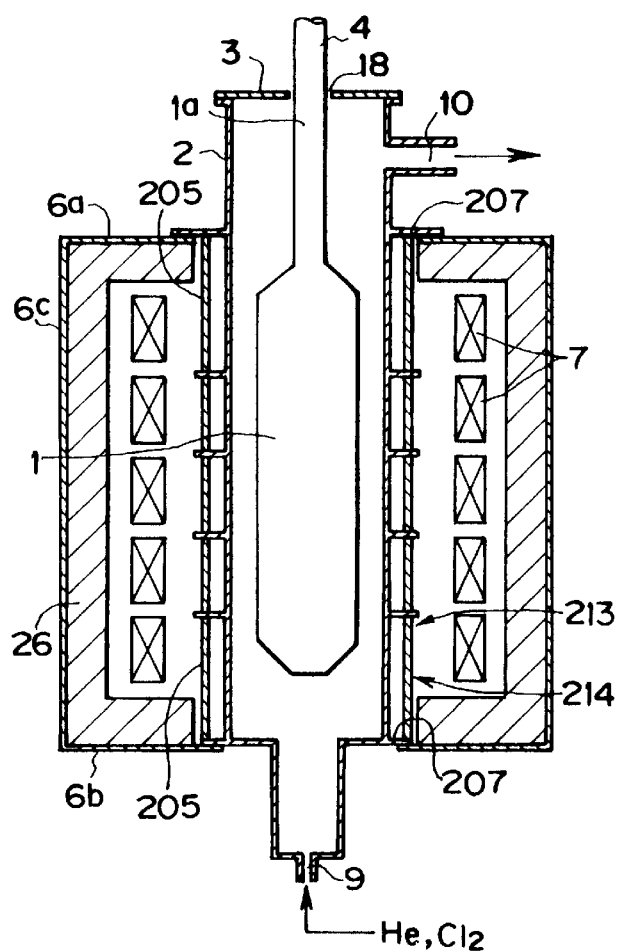
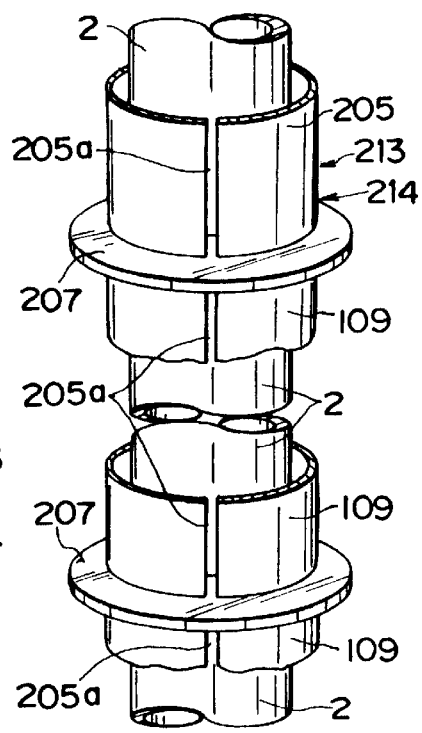

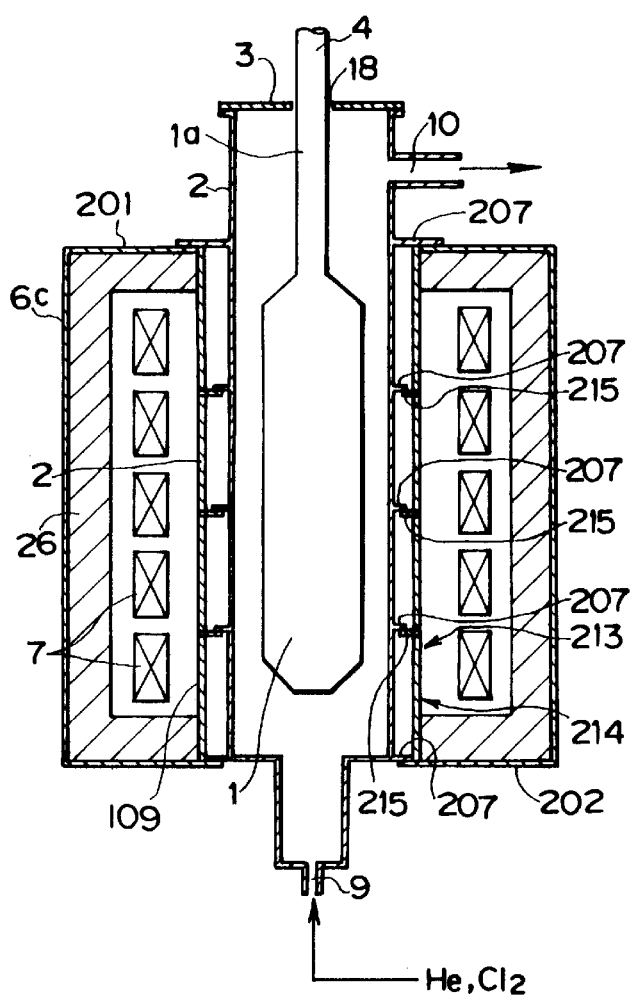
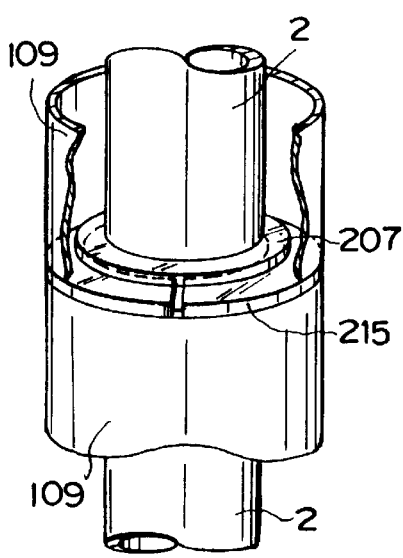
FIG.25A
FIG.25B

DEHYDRATION AND SINTERING APPARATUS FOR POROUS OPTICAL FIBER PREFORM

BACKGROUND OF THE INVENTION

1. Field of the Invention

The present invention relates to a porous optical fiber preform dehydration and vitrification apparatus for dehydrating and vitrifying a porous optical fiber preform.

More specifically, the present invention relates to a porous optical fiber preform dehydration and vitrification apparatus for improving the air-tightness of an upper portion of a furnace tube for introducing and elevating and lowering the porous optical fiber preform.

Still more specifically, the present invention relates to a porous optical fiber preform dehydration and vitrification apparatus having a structure capable of shortening a dehydration and vitrification time and having a controlling means. Further, the present invention relates to a method of heat treatment of a porous optical fiber preform for adequate control of temperature by using such a dehydration and vitrification apparatus.

Still more specifically, the present invention relates to a porous optical fiber preform dehydration and vitrification apparatus free from damage to the furnace tube and capable of being extended in service life even if used for a large-sized porous optical fiber preform.

Still more specifically, the present invention relates to a porous optical fiber preform dehydration and vitrification apparatus combining all of the above.

2. Description of the Related Art

A single mode optical fiber having for example a diameter of a core of 10 $\mu$m and a diameter of a cladding formed on an outer circumference of the core of 125 $\mu$m is produced by drawing an optical fiber preform in a heated state.

Such an optical fiber preform is produced by dehydrating and vitrifying a porous optical fiber preform produced by a vapor axial deposition (VAD) method, an outer vapor deposition (OVD) method, or the like.

When dehydrating and vitrifying such a porous optical fiber preform produced by the VAD process, the OVD process. etc., use is made of for example a porous optical fiber preform dehydration and vitrification apparatus illustrated in FIG. 1.

A furnace tube 2 is provided in the dehydration and vitrification apparatus, and a heating furnace 8 is provided around the periphery of the furnace tube 2. By gradually lowering the porous optical fiber preform 1 downward in the furnace tube 2 from above and passing it through a high temperature portion of the heating furnace 8 having a heater 7 accommodated in a furnace body 6 disposed at the outer circumference of the furnace tube 2, the porous optical fiber preform 1 is first dehydrated. At the time of this dehydration, helium (He) gas, a chlorine-containing gas, or the like is passed inside the furnace tube 2. Also, the temperature in the furnace tube 2 is made for example about 1100 to 1300° C.

After this dehydration ends, the porous optical fiber preform 1 is pulled up once from the interior of the upper portion of the furnace tube 2 of the dehydration and vitrification apparatus, the temperature in the furnace tube 2 is raised to for example 1500 to 1600° C., and the dehydrated porous optical fiber preform 1 is lowered into the furnace tube 2 again from above the furnace tube 2 to heat the porous optical fiber preform 1 by the heater 7 and vitrify it to form an optical fiber preform. At the time of this vitrification, He gas may be passed through the furnace tube 2 or a gas the same as that at the dehydration may be passed.

After the dehydration, the porous optical fiber preform 1 is sometimes doped by adding a dopant for forming a refractive index distribution. This doping is carried out by feeding an atmospheric gas (mainly He gas) and a doping gas (gas containing either of fluorine, boron, or chlorine) into the furnace tube 2 and controlling the temperature in the furnace tube 2 to for example about 1000 to 1300° C. (this temperature differs according to the doping gas).

Further, the doping in the dehydration and vitrification apparatus may be carried out simultaneously with the vitrification. In this case, the doping is carried out by incorporating the doping gas into the atmospheric gas in an ordinary vitrification furnace tube 2.

As disclosed in Japanese Unexamined Utility Model Publication (Kokai) No. 6-59438, there has also been proposed a method of dehydration and vitrification by arranging a plurality of heaters (heat sources) in a longitudinal direction of the furnace tube at the outer circumference of the furnace tube in place of movement of the porous optical fiber preform 1 at the time of such heat treatment, sequentially switching the plurality of heaters along the longitudinal direction of the porous optical fiber preform, and therefore sequentially heating the heaters to predetermined temperatures without moving the porous optical fiber preform.

Further, as disclosed in Japanese Unexamined Patent Publication (Kokai) No. 9-110456, there also has been known a method of dehydrating and vitrifying a porous optical fiber preform formed by the VAD process or the OVD process, drawing this, depositing fine glass particles synthesized in a burner flame on the surface using this as a target to prepare a porous optical fiber preform (such a porous optical fiber preform being referred to as a "porous optical fiber preform with target" in the present specification), where when no dopant changing the refractive index distribution in advance is contained in the porous layer, the dehydration and vitrification are performed by heating the porous optical fiber preform with target all at once by a plurality of heat sources.

According to the two above heat treatment methods using the plurality of heaters, since it is not necessary to lower the porous optical fiber preform, there is the advantage that the treatment time can be shortened compared with the method of heat treatment by a dehydration and vitrification apparatus using one heater.

However, the method of heat treatment using a plurality of heaters suffers from the problem that it is hard to apply this method to dehydration and vitrification of a porous optical fiber preform containing a dopant forming a refractive index distribution in advance (this will be referred to as a "porous optical fiber preform without target" in the present specification). The reason for this will be explained. In dehydration, the dopant contained in the porous optical fiber preform in advance reacts, so it is difficult to make the concentration of chlorine gas uniform in the longitudinal direction of the porous optical fiber preform and, as a result, it is difficult to make the refractive index distribution of the porous optical fiber preform uniform in the longitudinal direction of the porous optical fiber preform. Further, it is also difficult to make the temperature in the furnace uniform in the longitudinal direction. Therefore, even if the concentration of chlorine gas could be made uniform in the longitudinal direction, it would be difficult to make the refractive index distribution of the porous optical fiber preform uniform in the longitudinal direction of the porous optical fiber preform.

Even in the case of the "porous optical fiber preform with target" in which a dopant changing the refractive index is not contained in the porous layer at the surface, there was a problem that the dehydration temperature could only be raised to a temperature of the same extent as that for the "porous optical fiber preform without target", for example about 1300° C. at most. This is because due to the treatment at a constant temperature for a long time, for example about 2 to 6 hours, if the entire porous optical fiber preform is raised to a high temperature, firing proceeds from the surface of the porous optical fiber preform and dehydration becomes difficult.

Further, where doping the porous optical fiber preform, there was a problem that the distribution of the dopant of the porous optical fiber preform after the heat treatment did not become uniform in the longitudinal direction. As the cause of this, inadequate temperature hysteresis of the porous optical fiber preform at the time of heat treatment of the porous optical fiber preform can be considered.

A porous optical fiber preform dehydration and vitrification apparatus will be explained in more detail next by referring to FIG. 1.

FIG. 1 is a vertical sectional view of the general configuration of a porous optical fiber preform dehydration and vitrification apparatus according to the related art.

The porous optical fiber preform dehydration and vitrification apparatus illustrated in FIG. 1 has a furnace tube 2 made of quartz glass, carbon, or a ceramic such as alumina for accommodating a porous optical fiber preform 1 to be heat treated for dehydration and vitrification. The dehydration and vitrification apparatus further has an upper lid 31 made of quartz glass, carbon, or a ceramic such as alumina detachably attached to an upper flange 2b of the furnace tube 2 so as to shut an upper opening 2a of furnace tube 2 for inserting and pulling out the porous optical fiber preform 1, an elevating shaft 41 made of quartz glass or a ceramic such as alumina penetrating through this upper lid 31 so that it can freely elevate, and a preform holder 5 provided at the bottom end of this elevating shaft 41 and holding a starting rod 1a at the upper portion of the porous optical fiber preform 1. The dehydration and vitrification apparatus further has a heating furnace 8 provided with a furnace body 6 provided around the outer circumference of the furnace tube 2 and a heater 7 provided in this furnace body 6 for heating the porous optical fiber preform 1 in the furnace tube 2 by the heater 7. The dehydration and vitrification apparatus has a gas feed port 9 for feeding an internal gas into the furnace tube 2 from a lower portion of the furnace tube 2, a gas discharge port 10 for discharging the gas in the furnace tube 2 from the upper side of the furnace tube 2, a gas feed port 11 for feeding an inert gas into the furnace body 6, and an annular furnace tube upper sealing gas feeder 12 which is provided interposed between the upper flange 2b of furnace tube 2 and the upper lid 31 to seal the upper opening 2a of the furnace tube 2.

The elevating shaft 41 is elevated and lowered by a not illustrated elevating mechanism arranged above the furnace tube 2 and is rotated around the center of its axis by a not illustrated rotation mechanism such as a motor. Further, exhaust gas in the furnace tube 2 is discharged from the gas discharge port 10 of the furnace tube 2, passes through an exhaust pipe 13 and a pressure control valve 14 provided at the middle thereof, and is fed to a not illustrated discharge gas treatment device.

The exhaust from the interior of the furnace body 6 passes through an exhaust pipe passage 15 and a pressure control valve 16 provided at the middle thereof and is fed into the not illustrated discharge gas treatment device. The pressure in the furnace 8 and the differential pressure between the gas pressure in the furnace body 6 and the gas pressure in the furnace tube 2 are detected at a pressure meter 17a and a differential pressure meter 17b. The pressure control valves 14 and 16 are controlled by a not illustrated controller so that the differential pressure becomes constant.

The reason for using a furnace tube 2 made of quartz glass, carbon, or a ceramic such as alumina in the porous optical fiber preform dehydration and vitrification apparatus illustrated in FIG. 1 is that a halogen-based gas is used at the time of heat treatment of the porous optical fiber preform 1, so this gas must be prevented from diffusing into the ambient atmosphere or entering into the furnace body 6.

In the porous optical fiber preform dehydration and vitrification apparatus illustrated in FIG. 1, the upper lid 31 is detached from the furnace tube 2, the porous optical fiber preform 1 is inserted into the furnace tube 2 by a lowering operation of the not illustrated elevating mechanism, the upper lid 31 is placed over the upper opening 2a of the furnace tube 2 so that atmospheric air (outside air) does not enter into this furnace tube 2, and the porous optical fiber preform 1 is dehydrated or vitrified in the atmosphere of the gas fed from the gas feed port 9 into the furnace tube 2 while lowering the porous optical fiber preform 1 in the furnace tube 2 by the lowering operation of the not illustrated elevating mechanism and while rotating the porous optical fiber preform 1 around the center of its axis by the rotation operation of the not illustrated rotation mechanism.

At the time of this heat treatment, the heat porous optical fiber preform 1 is heat treated while rotating it around the center of its axis as explained above, therefore, with an elevating shaft 41 and an upper lid 31 made of quartz glass or a ceramic such as alumina, a certain degree of clearance 18 must be provided between the elevating shaft 41 and the upper lid 31 in view of the level of machining precision of the materials. Accordingly, gas sealing has been carried out by an inert gas such as nitrogen gas or argon gas ejected from the furnace tube upper sealing gas feeder 12 so that the atmospheric air (outside air) does not enter into the furnace tube 2 through this clearance 18.

In the sealing structure of the elevating shaft passage of the upper lid 31 through which the elevating shaft 41 shown in FIG. 1 penetrates, however, a sufficient sealing performance cannot be obtained at the time of heat treatment by bringing the interior of the furnace tube 2 into a depressurized state (or a vacuum state) or a pressurized state.

In order to raise the air-tightness between the elevating shaft 41 and the upper lid 31, as disclosed in for example Japanese Unexamined Patent Publication (Kokai) No. 62-27343, it has been proposed to perform the sealing by providing a seal member made of an O-ring in the elevating shaft passage of the upper lid 31 through which the elevating shaft 41 passes. In the sealing structure disclosed in Japanese Unexamined Patent Publication (Kokai) No. 62-27343, however, only an O-ring is provided as the seal member, so there is the inconvenience that the O-ring is thermally damaged due to the heat at the time of heat treatment. The durability of the seal member is low and this structure is hard to put into practical use.

Further, in order to raise the air-tightness between the elevating shaft 41 and the upper lid 31, as disclosed in for example Japanese Unexamined Patent Publication (Kokai) No. 4-18626, it has been proposed to perform the sealing by providing a seal member made of carbon fiber in the elevating shaft passage of the upper lid 31 through which the elevating shaft 41 passes. In the sealing structure disclosed in Japanese Unexamined Utility Model Publication (Kokai) No. 4-18626, however, there is the inconvenience that the carbon fiber used as the seal member generates dust due to abrasion of the carbon fiber at the elevation of the elevating shaft 41, this dust enters into the furnace tube 2 and therefore a foreign substance adheres to the porous optical fiber preform 1.

Further, in the porous optical fiber preform dehydration and vitrification apparatus illustrated in FIG. 1, when the amount of the gas (mainly the He gas) fed into the furnace tube 2 is reduced, the optical fiber transmission characteristic tends to become degraded. For this reason, the He gas must be sufficiently fed, but He gas is expensive, so production of the porous optical fiber preform becomes higher in cost. Conversely speaking, the amount of the expensive He gas fed cannot be reduced in the illustrated porous optical fiber preform dehydration and vitrification apparatus.

When the outside diameter of the porous optical fiber preform becomes larger and the diameter of the furnace tube 2 becomes larger as in recent years, the amount of the He gas fed is increased, so the problem of the amount of feed of the He gas becomes larger.

If forming the furnace tube 2 by a quartz material, when the heating temperature by the heater 7 becomes 1300 to 1400° C. or more, the furnace tube 2 becomes soft and deforms. In order to prevent this deformation, there was the restriction that the pressure in the furnace tube 2 had to be made higher than the pressure in the furnace body 6 by several mmAq to several tens of mmAq.

Further, if a carbon heater is used as the heater 7, the pressure in the furnace body 6 must be made higher than the atmospheric pressure by several mmAq, therefore ordinarily the pressure of the furnace tube 2 made higher than the atmospheric pressure by ten or so mmAq. If feeding an inert gas such as nitrogen gas or argon gas from the furnace tube upper sealing gas feeder 12 for the sealing so that the atmosphere does not enter through the clearance 18 between the upper lid 31 and the elevating shaft 41, Due to the gas in the furnace tube 2 higher than the atmospheric pressure by ten and several mmAq, there was the problem that a considerably large amount of sealing gas became necessary.

Further, along with the increase in demand for optical fiber in recent years, the porous optical fiber preforms 1 for optical fibers have become larger, that is, they have become larger in diameter and longer in length. In order to heat such a large porous optical fiber preform to and dehydrate and vitrify (sinter) it, a large-sized heating furnace becomes necessary. However, when dehydrating and firing a large porous optical fiber preform, since a furnace tube 2 made of quartz would be heated to 1500° C. or more over a wide range, there is a possibility that the furnace tube 2 would become soft and the furnace tube 2 would buckle and deform due to its own weight.

SUMMARY OF THE INVENTION

An object of a first aspect of the present invention is to provide a porous optical fiber preform dehydration and vitrific ation apparatus capable of improving the sealing performance between the upper lid and the elevating shaft or between the upper lid and the furnace tube or the furnace body.

Another object of the first aspect of the present invention is to provide a porous optical fiber preform dehydration and vitrification apparatus resistant to thermal damage even if the upper lid is formed by a metal and a seal member made of rubber or a resin is interposed between the upper lid and the elevating shaft.

Still another object of the first aspect of the present invention is to provide a porous optical fiber preform dehydration and vitrification apparatus capable of easily performing heat treatment by bringing the interior of the furnace tube into a depressurized state (or a vacuum state) or a pressurized state.

Still another object of the first aspect of the present invention is to provide a porous optical fiber preform dehydration and vitrification apparatus resistant to corrosion by the treatment gas even if the upper lid and the elevating shaft are made of a metal.

Still another object of the first aspect of the present invention is to provide a porous optical fiber preform dehydration and vitrification apparatus capable of preventing radiant heat in the furnace tube from being conducted to the upper lid.

Still another object of the first aspect of the present invention is to provide a porous optical fiber preform dehydration and vitrification apparatus capable of suppressing the flow of the sealing gas into a treatment chamber containing the porous optical fiber preform.

Still another object of the first aspect of the present invention is to provide a porous optical fiber preform dehydration and vitrification apparatus capable of performing heat treatment of the porous optical fiber preform without moving the porous optical fiber preform in the furnace tube.

An object of a second aspect of the present invention is to provide a method of heat treatment of a porous optical fiber capable of shortening the treatment time of the heat treatment required in the porous optical fiber preform dehydration and vitrification apparatus.

Another object of the second aspect of the present invention is to provide a method of heat treatment of a porous optical fiber, of a type performing the required heat treatment in a state where the elevation or descent of the porous optical fiber preform to be treated in the porous optical fiber preform dehydration and vitrification apparatus is suspended, which can shorten the heat treatment time.

Still another object of the second aspect of the present invention is to provide a method of heat treatment of a porous optical fiber, of a type performing the required heat treatment while moving the porous optical fiber preform to be treated in the porous optical fiber preform dehydration and vitrification apparatus, which can shorten the time of the required heat treatment.

An object of a third aspect of the present invention is to provide a porous optical fiber preform dehydration and vitrification apparatus capable of preventing buckling and deformation of the furnace tube at the time of high temperature heating due to its own weight.

Another object of the third aspect of the present invention is to provide a porous optical fiber preform dehydration and vitrification apparatus capable of preventing buckling and deformation of the furnace tube at the time of high temperature heating due to its own weight by utilizing muffle pipes.

An object of a fourth aspect of the present invention is to provide a porous optical fiber preform dehydration and vitrification apparatus which suitably combines the features of the porous optical fiber preform dehydration and vitrification apparatuses of the first to third aspects and can achieve all of the above objects.

First, the porous optical fiber preform dehydration and vitrification apparatus of the first aspect of the present invention will be explained.

The porous optical fiber preform dehydration and vitrification apparatus of the first aspect of the present invention is provided with a furnace tube made of quartz glass, a ceramic, etc, for accommodating a porous optical fiber preform to be treated, an upper lid detachably attached to an upper portion of the furnace tube so as to shut an upper opening of the furnace tube for inserting and pulling up the porous optical fiber preform, an elevating shaft penetrating through the upper lid so that it can freely elevate, a preform holder provided at the bottom end of the elevating shaft and holding the upper portion of the porous optical fiber preform, a heating furnace provided around the outer circumference of the furnace tube and heating the porous optical fiber preform in the furnace tube by a heater, a gas feed port for feeding the gas from the lower portion to the internal portion of the furnace tube, and a gas discharge port for discharging the gas in the furnace tube at the upper side of the furnace tube. This porous optical fiber preform dehydration and vitrification apparatus is characterized in that the upper lid is formed by a metal, and the preform holder is formed by quartz glass or a ceramic.

A corrosion-resistant layer can be provided on at least an inner surface of the upper lid.

A seal member made of rubber or a resin can be provided at the elevating shaft passage of the upper lid through which the elevating shaft penetrates so that the elevating shaft can elevate while the sealed state is held.

The sealing can be carried out between the upper lid and the furnace tube or furnace body by the seal member made of rubber or a resin.

A cooling means for cooling the upper lid by a cooling medium can be provided at the upper lid.

By forming the upper lid by a metal in this way, the machining of the seal member for forming the sealing portion between the upper lid and the elevating shaft becomes easy, the clearance between the upper lid and the elevating shaft can be made as small as possible, and the two can be easily sealed by the seal member made of rubber or a resin.

If sealing between the upper lid and the elevating shaft and between the upper lid and the furnace tube or the furnace body by the seal member made of rubber or a resin, reliable sealing is possible without generating dust in the upper portion of the furnace tube.

If reliable sealing is possible between the upper lid and the elevating shaft and between the upper lid and the furnace tube or furnace body, the heat treatment by bringing the interior of the furnace tube into the vacuum state or the pressurized state becomes easy.

Even if the seal member is made of rubber or a resin, the upper lid is cooled by the cooling means by the cooling medium, so the thermal damage of the seal member can be further effectively prevented.

Further, when both of the upper lid and the elevating shaft are formed by a metal, the precision of the sealing part can be further improved and reliable sealing becomes possible. In this case, desirably the corrosion-reslstant layer is provided at the surface of the elevating shaft.

Even when the elevating shaft is made of a metal, since the preform holder is formed by quartz glass or a ceramic, an intrusion of a foreign substance from the preform holder near the porous optical fiber preform into the porous optical fiber preform can be avoided as much as possible.

Even if both of the upper lid and the elevating shaft are made of a metal, since the corrosion-resistant layer is provided on at least the inner surface of the upper lid and the surface of the elevating shaft, corrosion of them by the treatment gas can be prevented.

In this case, preferably a heat insulating material is provided at the upper lid covering the inner surface thereof. When providing this, the conductance of the radiant heat from the heater to the upper lid can be reduced, and the thermal damage of the seal member can be prevented.

Preferably, the upper lid is provided with an inert gas passage for passing an inert gas covering the inner surface thereof and covering the surface of the elevating shaft projecting into the upper lid. When providing this, the treatment gas can be kept from reaching the metal upper lid and elevating shaft by the inert gas flowing through this inert gas passage.

Preferably, a heat insulating means for preventing the radiant heat in the furnace tube from being conducted to the upper lid is supported at the upper portion of the preform holder. By doing this, the temperature rise of the upper lid due to the radiant heat in the furnace tube can be suppressed, and the thermal damage of the seal member made of rubber or resin can be more effectively prevented.

Preferably, a gas blocking means for keeping the sealing gas sealed between the upper lid and the elevating shaft penetrating through this from flowing into the treatment chamber containing the porous optical fiber preform is provided between the upper lid and the heat insulating means. By doing this, the flow of the sealing gas into the treatment chamber containing the porous optical fiber preform can be suppressed. For this reason, degradation of the transmission characteristic of the optical fiber due to the reduction of the treatment gas (mainly He gas) to be fed into the treatment chamber can be prevented. In this way, according to the present invention, the amount of the expensive He gas used can be reduced. Even when the diameter of the furnace tube becomes large, the degradation of the transmission characteristic of the optical fiber can be suppressed.

The heat insulating means is preferably always arranged lower than the gas discharge port during the period when the porous optical fiber preform is treated. By doing this, the sealing gas entering into the furnace tube is discharged to the outside from the gas discharge port of the furnace tube, and the flow of the sealing gas into the treatment chamber containing the porous optical fiber preform can be further effectively reduced.

The gas blocking means is preferably always arranged higher than the gas discharge port during the period when the porous optical fiber preform is heat treated. By doing this, the part of the furnace tube between the upper lid and the gas blocking means acts as a buffer chamber. The gas pressure in this buffer chamber can be made a little higher than the part connected to the gas discharge port, so the amount of the sealing gas can be reduced.

In the upper portion of the preform holder, preferably the gas blocking and insulating means which prevents the conductance of the radiant heat in the furnace tube to the upper lid and always arranged lower than the gas discharge port during the period when the porous optical fiber preform is heat treated is supported. By doing this, the increase of the radiant heat from the heater and conductance of it to the upper lid can be reduced and therefore the thermal damage of the seal member can be prevented. In addition, the flow of the sealing gas into the treatment chamber containing the porous optical fiber preform can be suppressed, therefore the degradation of the transmission characteristic of the optical fiber due to the reduction of the treatment gas (mainly He gas) to be fed into the treatment chamber can be suppressed and thus the amount of the expensive He gas used can be reduced. Further, even when the diameter of the furnace tube becomes large, the degradation of the transmission characteristic of the optical fiber can be suppressed.

Preferably, heaters are provided in a plurality of stages in a direction toward the longitudinal direction of the porous optical fiber preform. By doing this, by controlling the supply of power to the different heaters, an intended position of the quartz porous optical fiber preform in the longitudinal direction can be heated without moving the porous optical fiber preform in the furnace tube, therefore there are the advantages that it becomes possible to reduce the rubbing at a shaft sealed part along with the elevation or lowering of the elevating shaft, achieve an extension of the service life, and eliminate the strict requirement on the machining precision of the elevating shaft.

Next, a porous optical fiber preform dehydration and vitrification apparatus according to the second aspect of the present invention will be explained.

The second aspect of the present invention improves the method of heat treatment of a porous optical fiber preform which arranges a plurality of heat sources along the longitudinal direction around the outer circumference of a furnace tube in a porous optical fiber preform dehydration and vitrification apparatus, arranges the porous optical fiber preform in its heating furnace, and thereby performs the required heat treatment on the porous optical fiber preform.

The present inventors engaged in various studies and as a result discovered that dehydration, doping, vitrification, and other heat treatment occur through two time periods: (a) a time of temperature rise required for raising the temperature of the porous optical fiber preform up to the treatment temperature and (b) a time where the porous optical fiber preform reaches the required heat treatment temperature and the reactions of the dehydration, doping, and vitrification sufficiently advance.

Further, the present inventors discovered that the higher the dehydration temperature, the faster the reaction, but conversely sufficient dehydration was no longer possible since the surface of the porous optical fiber preform began to be fired and therefore the surface of the porous optical fiber preform became densified.

The present inventors discovered from the above that, in order to shorten the treatment time of the dehydration or the vitrification, (1) it was important to preheat the porous optical fiber preform and (2) if the treatment time was short, the heat treatment temperature of the porous optical fiber preform was preferably made high.

Further, the present inventors discovered that, in order to efficiently dope the preform, the density of at least the surface part of the porous part of the porous optical fiber preform was desirably made high immediately after the doping.

Therefore, in the method of heat treatment of porous optical fiber preform of the second aspect of the present invention, before the required heat treatment on the porous optical fiber preform, the entire porous optical fiber preform is preheated up to a predetermined preheating temperature lower than the required heat treatment temperature. In this state, the porous optical fiber preform is heat treated as required while moving the position where the porous optical fiber preform becomes the required heat treatment temperature from the preheating temperature in the longitudinal direction of the porous optical fiber preform.

If preheating the entire porous optical fiber preform up to a predetermined preheating temperature lower than the required heat treatment temperature in advance before performing the required heat treatment on the porous optical fiber preform in this way, it is possible to shorten the time for raising the temperature of the porous optical fiber preform up to the temperature of the required heat treatment and perform the required heat treatment over the entire length of the porous optical fiber preform. Further, when performing the required heat treatment on the porous optical fiber preform while moving the position where the porous optical fiber preform becomes the required heat treatment temperature in the longitudinal direction of the porous optical fiber preform, it is possible to perform the required heat treatment at an almost uniform temperature over the entire length of the porous optical fiber preform and to make the refractive index distribution of the porous optical fiber preform almost completely uniform in the longitudinal direction of the porous optical fiber preform.

In the second aspect of the present invention, preferably the heating is carried out so that the rates of temperature rise from the preheating temperature until reaching the required heat treatment temperature become substantially constant at all portions in the longitudinal direction of the porous optical fiber preform. Further, more preferably the heating is carried out so that the rates of temperature fall from the required heat treatment temperature to the preheating temperature become substantially constant at all portions in the longitudinal direction of the porous optical fiber preform.

By doing this, all parts of the porous optical fiber preform in the longitudinal direction can be raised in temperature at a constant rate of temperature rise for heat treatment and the quality of the parts of the porous optical fiber preform in the longitudinal direction after the heat treatment can be stabilized. In this case, if the rate of temperature fall for lowering the parts of the porous optical fiber preform in the longitudinal direction from the required heat treatment temperature to the preheating temperature becomes substantially constant, the quality of the parts of the porous optical fiber preform in the longitudinal direction after heat treatment can be stabilized much better.

Further, in the second aspect of the present invention, as one of operations of movement of the position where the porous optical fiber preform becomes the required heat treatment temperature in the longitudinal direction of the porous optical fiber preform, the temperatures of a plurality of heat sources (heaters) arranged in the longitudinal direction around the outer circumference of the furnace tube are sequentially controlled along the longitudinal direction of the furnace tube so that the temperatures of the parts of the furnace tube corresponding to the heat sources become the required heat treatment temperature from preheating temperatures lower than the required heat treatment temperature.

When employing such a method, the operation of moving the position where the porous optical fiber preform becomes the required heat treatment temperature in the longitudinal direction of the porous optical fiber preform can be easily carried out by just controlling the conditions of supply of power to the plurality of heat sources etc.

Further, in the second aspect of the present invention, when using a plurality of heat sources to heat the porous optical fiber preform, preferably the first position at which the porous optical fiber preform is raised from the preheating temperature to the required heat treatment temperature is made the substantial center of the porous optical fiber preform in the longitudinal direction and the position where the porous optical fiber preform becomes the required heat treatment temperature from the preheating temperature is moved from that position toward the two ends of the porous optical fiber preform in the longitudinal direction for the required heat treatment on the porous optical fiber preform.

When employing such a heat treatment method, the heat treatment time with respect to the entire length of the porous optical fiber preform can be shortened to about a half compared with that by a method of heat treatment from one end of the porous optical fiber preform to the other end.

Further, in the second aspect of the present invention, as another operation moving the position where the porous optical fiber preform becomes the required heat treatment temperature in the longitudinal direction of the porous optical fiber preform, the temperature of a specific part of the heat sources arranged along the longitudinal direction around the outer circumference of the furnace tube is set so that the temperature in the furnace tube at the corresponding position becomes the required heat treatment temperature, the temperatures of the remaining parts of the heat sources are set so that the temperatures in the furnace tube at the corresponding positions become a preheating temperature lower than the required heat treatment temperature, and the heat treatment is carried out while moving the porous optical fiber preform in the longitudinal direction so that portions of the porous optical fiber preform sequentially face the specific part of the heat sources.

When employing such a method, since the operation of moving the position where the porous optical fiber preform becomes the required heat treatment temperature in the longitudinal direction of the porous optical fiber preform can be carried out by setting the temperature of a specific part of the heat sources arranged along the longitudinal direction around the outer circumference of the furnace tube so that the temperature in the furnace tube at the corresponding position becomes the required heat treatment temperature and setting the temperatures of the other parts of the heat sources so that the temperatures in the furnace tube at the corresponding portions become the preheating temperatures or post-treatment temperatures lower than the required heat treatment temperature, there are the advantages that the part of the heat sources to be set so that the furnace tube becomes the required heat treatment temperature becomes small and temperature control of the heat sources to be set so that the furnace tube becomes the required heat treatment temperature becomes easy.

Further, in the second aspect of the present invention, where the heat treatment of the porous optical fiber preform is doping, by carrying this out between the dehydration and the vitrification and making the temperature for uniformly heating the entire porous optical fiber preform a temperature by which densification of the surface part of the porous optical fiber preform starts, it is possible to densify the entire surface of the porous optical fiber preform in a short time and to suppress dispersal of the dopant from the surface of the porous optical fiber preform. Note that when adding the doping gas into the atmosphere of the preheating before the vitrification to be performed after the end of the doping, the dispersal of the dopant from the surface of the porous optical fiber preform can be further suppressed.

Further, in the second aspect of the present invention, it is also possible to perform the doping at the time of the vitrification. In this case, the porous optical fiber preform is sufficiently preheated by the preheating, so the temperature difference in the diametrical direction of the porous optical fiber preform can be reduced. Further, the rate of change of the temperature in the longitudinal direction is made substantially constant at the time of the vitrification, so the temperature difference in the longitudinal direction of the porous optical fiber preform can be reduced. Accordingly, the doping can be carried out substantially uniformly with respect to the entire porous optical fiber preform.

Further, in the second aspect of the present invention, the heat treatment of the porous optical fiber preform may be any of dehydration, doping, or vitrification of the porous optical fiber preform.

The porous optical fiber preform dehydration and vitrification apparatus of the third aspect of the present invention will be explained next.

According to the third aspect of the present invention, there is provided a porous optical fiber preform dehydration and vitrification apparatus provided with a furnace tube which penetrates through the center of a furnace body for accommodating a porous glass preform and a heating portion provided with a heating element arranged around the periphery of the furnace tube in the furnace body for heating the porous optical fiber preform in the furnace tube, wherein a furnace tube weight distributing means for distributing the weight of the furnace tube in its longitudinal direction is provided around the outer circumference of the furnace tube.

The furnace tube weight distributing means can be provided around the outer circumference of the furnace tube with a plurality of flanges provided at predetermined intervals in the longitudinal direction and a furnace tube weight receiving means for supporting the flanges around the outer circumference of the furnace tube.

The furnace tube weight receiving means can be constituted by muffle pipes which is interposed between vertically adjoining flanges around the outer circumference of the furnace tube and bears the weight of the furnace tube ac ting upon the upper flanges.

The furnace tube weight receiving means can also be constituted by muffle pipes arranged along the outer circumference of the furnace tube and a plurality of supports which are provided in the muffle pipes corresponding to the flange of the furnace tube and support the flange.

The furnace tube weight receiving means comprises a first muffle pipe provided around the outer circumference of the furnace tube and between vertically adjoining flanges, and bears the weight of the furnace tube acting upon the upper flanges, and a second muffle pipe along the outer circumference of the furnace tube.

BRIEF DESCRIPTION OF THE DRAWINGS

These and other objects and features of the present invention will become more apparent from the following description of preferred embodiments given with reference to the accompanying drawings, wherein:

FIGS. 13A to 13E are views of temperature distributions in the furnace tube at steps when heat treating the porous optical fiber preform without target according to the 11th embodiment of the present invention;

FIGS. 14A to 14G are graphs of the temperature distributions in the furnace tube at steps when heat treating the porous optical fiber preform with target according to the 12th embodiment of the present invention;

FIG. 19A is a view of the temperature pattern preferred at the time of movement in the longitudinal direction in the case of dehydration and doping in the embodiments of the present invention;

FIG. 19B is a view of the temperature pattern preferred at the time of movement in the longitudinal direction in the case of vitrification in the embodiments of the present invention;

FIG. 24A is a vertical sectional view of a porous optical fiber preform dehydration and vitrification apparatus according to a 15th embodiment of the present invention;

FIG. 24B is a perspective view of a furnace tube weight distributing means used in the porous optical fiber preform dehydration and vitrification apparatus illustrated in FIG. 24A;

FIG. 25A is a vertical sectional view of a porous optical fiber preform dehydration and vitrification apparatus according to a 16th embodiment of the present invention;

FIG. 25B is a perspective view of a furnace tube weight distributing means used in the porous optical fiber preform dehydration and vitrification apparatus illustrated in FIG. 25A.

DESCRIPTION OF THE PREFERRED EMBODIMENTS

Preferred embodiments of the porous optical fiber preform dehydration and vitrification apparatus of the present invention and the method of heat treatment using the same will be explained next by referring to the attached drawings.

A preferred embodiment of the porous optical fiber preform dehydration and vitrification apparatus of the present invention to a porous optical fiber preform dehydration and vitrification apparatus combining the features of the porous optical fiber preform dehydration and vitrification apparatuses illustrated in FIG. 2 to FIG. 26.

However, for the illustration and description, a porous optical fiber preform dehydration and vitrification apparatus improved in the air-tightness of the upper portion of the furnace tube will be explained by referring to FIG. 2 to FIG. 11 as the first aspect, a porous optical fiber preform dehydration and vitrification apparatus improved in the temperature control of the dehydration and vitrification of the porous optical fiber preform and a method of heat treatment using the same will be explained by referring to FIG. 12 to FIG. 21 as the second aspect, and a porous optical fiber preform dehydration and vitrification apparatus having a furnace tube which can be used for a large porous optical fiber preform will be explained by referring to FIG. 24 to FIG. 26 as a third aspect. Note that by suitably combining the features of these porous optical fiber preform dehydration and vitrification apparatuses, the porous optical fiber preform dehydration and vitrification apparatus of the fourth aspect of the present invention is obtained.

First to 10th embodiments of the porous optical fiber preform dehydration and vitrification apparatus will be explained below referring to FIG. 2 to FIG. 11 as embodiments of the first aspect of the present invention.

First Embodiment

A first embodiment of the present invention will be explained next.

Figure 2:
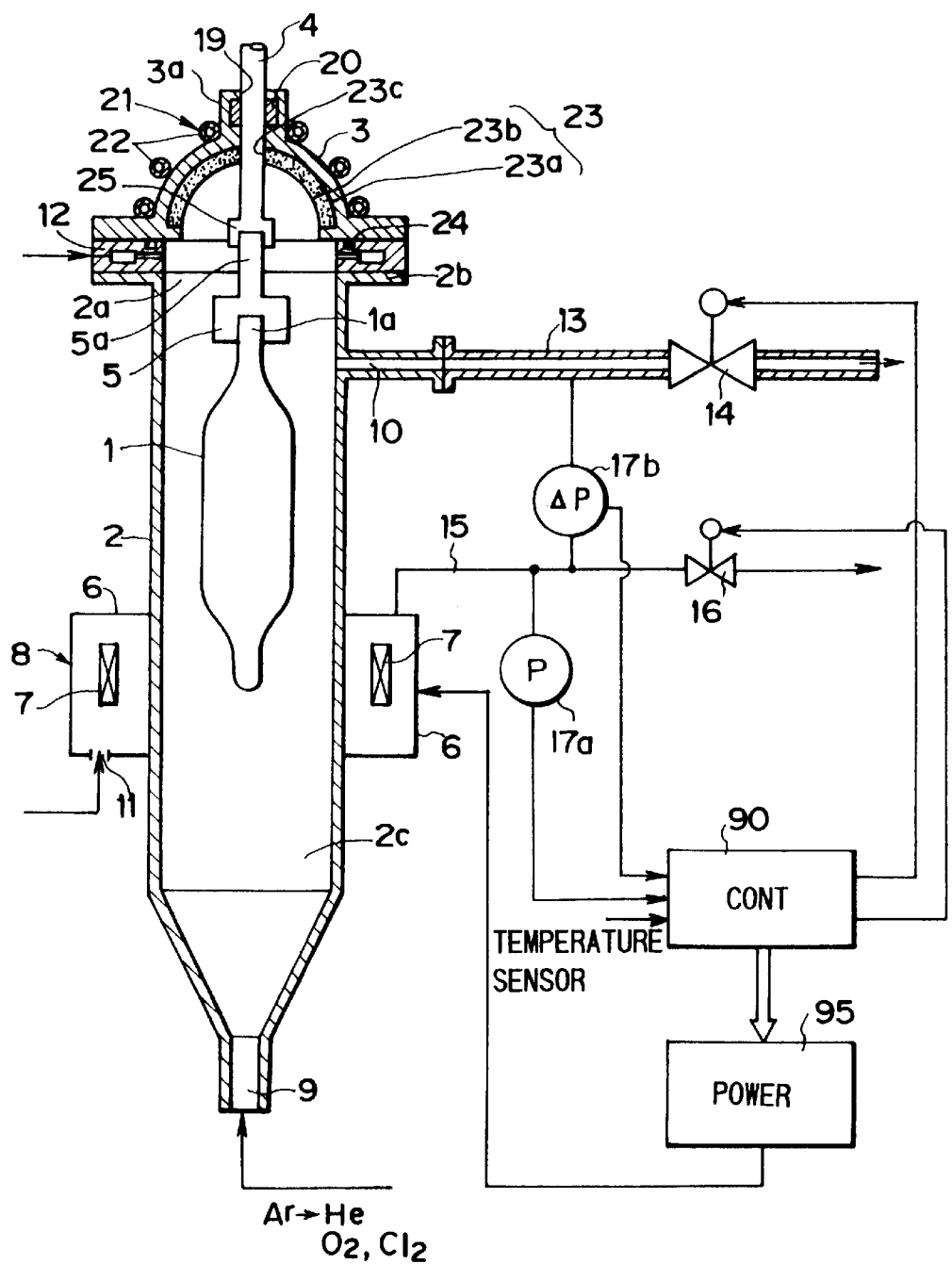
FIG. 2 is a vertical sectional view of a porous optical fiber preform dehydration and vitrification apparatus according to a first embodiment of the present invention.

FIG. 2 is a vertical sectional view of the general configuration of a porous optical fiber preform dehydration and vitrification apparatus according to the first embodiment of the present invention.

The porous optical fiber preform dehydration and vitrification apparatus (below, simply referred to as "the dehydration and vitrification apparatus") illustrated in FIG. 2 has a structure resembling the dehydration and vitrification apparatus illustrated in FIG. 1.

The structure of the dehydration and vitrification apparatus illustrated in FIG. 2 will be explained next.

The dehydration and vitrification apparatus is provided with a furnace tube 2 for accommodating and dehydrating and vitrifying the porous optical fiber preform 1, a heating furnace 8 comprising a heater 7 and a furnace body 6 accommodating the heater 7, a gas feed port 9 for feeding a gas from the bottom to the inside of the furnace tube 2, a gas feed port 11 for feeding a gas into the heating furnace 8, an exhaust pipe 13 for discharging the gas inside the furnace tube 2 to the outside from the upper portion of the furnace tube 2, an exhaust pipe passage 15 for discharging the gas in the heating furnace 8, a pressure meter 17a for detecting a pressure of a gas in the exhaust pipe passage 15, a differential pressure meter 17b for detecting the difference between a pressure of the gas in the exhaust pipe 13 and a pressure of the gas in the exhaust pipe passage 15, a pressure control valve 14 and a pressure control valve 16 controlled according to the pressure detected at the pressure meter 17a, the differential pressure detected at the differential pressure meter 17, and a controller 90 for performing the control thereof. The controller 90 acts as the pressure controlling means in the present embodiment. Further, the controller 90 acts also as the temperature controlling means for controlling the heater 7 via a power supply 95.

The dehydration and vitrification apparatus of FIG. 2 further has a preform holder 5 for holding the starting rod 1a of the upper portion of the porous optical fiber preform 1 an elevating shaft 4 located at the upper portion of the preform holder 5, an upper lid 3, and a furnace tube upper sealing gas feeder 12 introducing a gas from the upper portion of the furnace tube 2.

Figure 1:
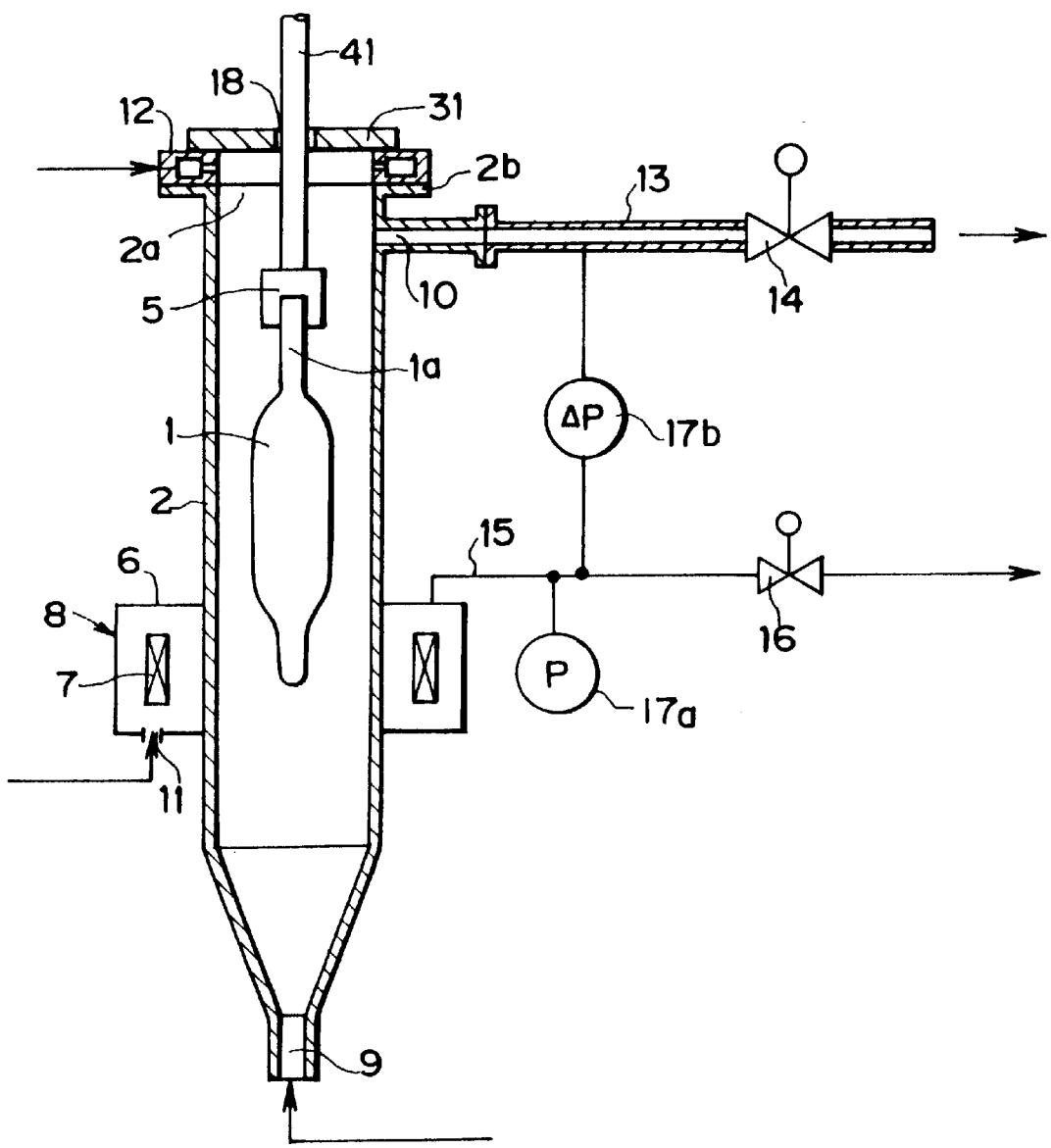
FIG. 1 is a vertical sectional view of the general configuration of a porous optical fiber preform dehydration and vitrification apparatus according to the related art.

The elevating shaft 4 illustrated in FIG. 2 corresponds to the elevating shaft 41 illustrated in FIG. 1, while the upper lid 3 of FIG. 2 corresponds to the upper lid 31 illustrated in FIG. 2.

In this dehydration and vitrification apparatus, the upper lid 3 is formed by a metal such as stainless steel. A corrosion-resistant layer made of for example a polytetrafluoroethyene coating or a ceramic coating (for example, a titanium coating, an alumna coating, a nickel coating) is provided on at least the inner surface of the upper lid 3, preferably the entire surface of the upper lid 3.

The preform holder 5 is formed by a material having a heat resistance and corrision resistance, for example, quartz glass or a ceramic.

The elevating shaft 4 is desirably formed by quartz glass. In this case, by sufficiently finishing the surface of the elevating shaft 4 or covering the surface of the elevating shaft 4 by a resin such as polytetrafluoroethylene, it becomes possible to reduce the abrasion of a seal member 20 explained later.

The elevating shaft 4 may also be formed by a metal similar to that for the upper lid 3. In this case, a corrosion-resistant layer similar to that of the upper lid 3 is provided at the surface of the elevating shaft 4.

Note that the elevating shaft 4, as will be explained later, desirably is structured inside to pass a cooling medium from an outbound path to a return path by for example a double tube pipe so that the elevating shaft 4 is cooled. In such a structure, when the elevating shaft 4 is made of metal, the machining is easy and the maintenance of the mechanical strength is easy as well and can be performed without obstacles.

Next, the structure of the dehydration and vitrification apparatus illustrated in FIG. 2 will be explained.

A ring-shaped seal member 20 made of rubber or a resin such as polytetrafluoroethylene is supported at the inner circumference of a shaft bore 19 provided in an elevating shaft passage 3a of the upper lid 3 through which the elevating shaft 4 passes so that the elevating shaft 4 can be elevated or lowered while maintaining the sealed state.

A cooling means 21 for cooling the upper lid 3 by a cooling medium such as cooling water is provided in the upper lid 3. The cooling means 21 of this embodiment is constituted by a cooling pipe 22 which is wound around the outer circumference of the upper lid 3 and attached thereto by welding or the like so that heat conductance is possible.

Further, a heat insulating means 23 serving as the first insulating means of the present invention is attached to the upper lid 3 so as to cover its inner surface. The heat insulating means 23 is comprised of a carbon felt shaped article or quartz wool or another insulating material 23a covered by a cover 23b made of quartz. A through hole 23a for passing the elevating shaft 4 is provided at the center of the heat insulating means 23. The inner circumference of this through hole 23c is covered by the quartz cover 23b. Note that when a carbon felt shaped article is used as the heat insulating material 23a of the heat insulating means 23, the quartz cover 23b is unnecessary from the viewpoint of imparting a required shape for attachment to the inner surface of the upper lid 3 to the heat insulating means 23, but desirably the quartz cover 23b is provided for the prevention of the falling dust.

In the dehydration and vitrification apparatus illustrated in FIG. 2, a seal member 24 comprising an O-ring made of rubber or a synthetic resin such as polytetrafluoroethylene is further interposed between the annular furnace tube upper sealing gas feeder 12 and the upper lid 3 for sealing between the furnace tube upper sealing gas feeder 12 and the upper lid 3.

A lid holder 25 for supporting the upper lid 3 via the heat insulating means 23 is provided at the lower portion of the elevating shaft 4. A shaft 5a of the preform holder 5 is connected to this lid holder 25.

In the dehydration and vitrification apparatus illustrated in FIG. 2, parts the same as those illustrated in FIG. 1 are similar to those explained by referring to FIG. 1.

The operation for introducing the porous optical fiber preform 1 into the furnace tube 2 will be explained next.

Note that, as the means for introducing the porous optical fiber preform 1 into the furnace tube 2 and elevating and lowering the furnace tube 2, preferably use is made of for example an elevating mechanism 120 explained later by referring to FIG. 20. The elevating mechanism 120 illustrated in FIG. 20 has a horizontally oriented elevating horizontal arm 114 holding the elevating shaft 4 connected to the preform holder 5, a motor 115, a threaded hole 116, a vertically oriented elevating drive shaft 117, a bearing 118, and a motor 119. The motor 119 operates to rotate the vertically oriented elevating drive shaft 117, move the horizontally oriented elevating horizontal arm 114 up and down via the threaded hole 116, and elevate the elevating shaft 4. The motor 115 rotates the elevating shaft 4 to rotate the porous optical fiber preform 1 held by the preform holder 5 around the center. The elevating mechanism 120 acts as a porous optical fiber preform elevating and rotating means for elevating the porous optical fiber preform 1 and rotating it around the center in this way.

Figure 20:
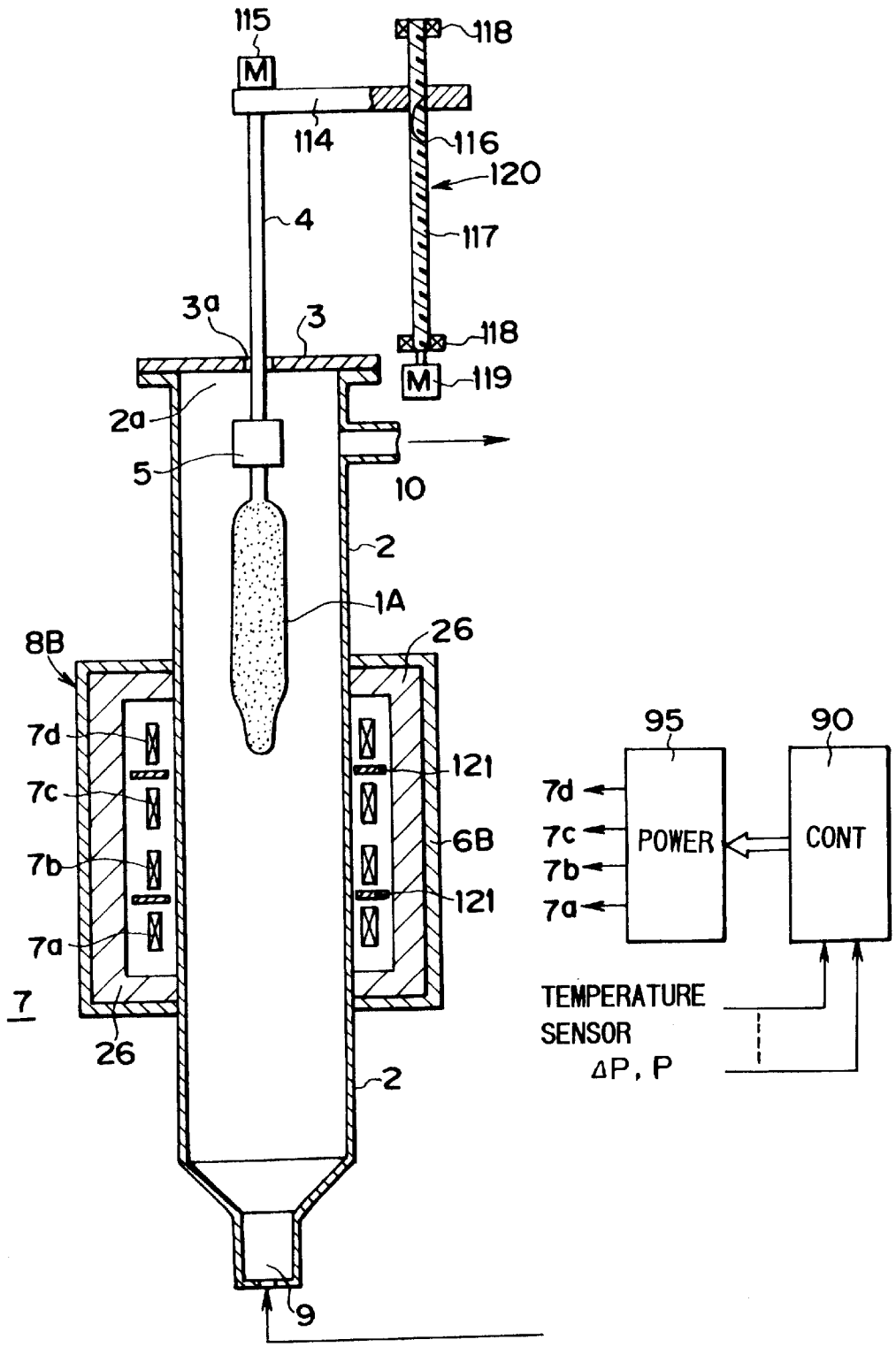
FIG. 20 is a vertical sectional view of a porous optical fiber preform dehydration and vitrification apparatus according to a 13th embodiment of the present invention.

In the dehydration and vitrification apparatus illustrated in FIG. 2, when opening the upper opening portion 2a of the furnace tube 2 to introduce the porous optical fiber preform 1 into the furnace tube 2 by using for example the elevating mechanism 120 of FIG. 20, the elevating shaft 4 is raised by the operation of the elevating mechanism 120. The lid holder 25 provided at the lower portion of the elevating shaft 4 abuts against the upper lid 3 via the heat insulating means 23 during that process. The upper lid 3 rises together with the elevating shaft 4 and moves away from the top end of the furnace tube 2, whereby the upper opening 2a of the furnace tube 2 opens.

When the preform holder 5 stops at the upper position away from the top end of the furnace tube 2, the location of the quartz glass starting rod 1a at the front end of the upper portion of the porous optical fiber preform 1 is grasped by using the preform holder 5. Thereafter, the elevating shaft 4 is lowered by the operation of for example the elevating mechanism 120 of FIG. 20, the porous optical fiber preform 1 and the upper lid 3 are lowered together, and the porous optical fiber preform 1 is inserted into a treatment chamber 2c of the furnace tube 2. The upper lid 3 is placed on the top end of the furnace tube 2 via the furnace tube upper sealing gas feeder 12 to close the upper opening 2a of the furnace tube 2.

In such a state, under the control of the controller 90, the interior of the furnace tube 2 is made the atmosphere of the required gas fed from the gas feed port 9, and the heater 7 is used for heating for the dehydration and the vitrification of the porous optical fiber preform 1 located inside the furnace tube 2.

The dehydration is carried out by switching from the standby mode gas (Ar gas) to He gas in the furnace tube 2 by control of the gas feed from the gas feed port 9 of the controller 90. The controller 90 raises the temperature of the heating furnace 8 up to the temperature of the dehydration by the heater 7. After the temperature of the heater 7 is stabilized, the controller 90 gradually lowers the porous optical fiber preform 1 at a predetermined rate by using for example the elevating mechanism 120 of FIG. 20 while further feeding a treatment gas such as oxygen ($O_2$) and chlorine ($Cl_2$) from the gas feed port 9 into the furnace tube 2 and moves the heating position of the porous optical fiber preform 1 in the axial direction.

Note that the preferred method of heating of this porous optical fiber preform 1 will be explained later as the second aspect of the present invention by referring to FIG. 12 to FIG. 20. Further, details of the structure and operation of the elevating mechanism 120 will be explained later by referring to FIG. 20.

After the dehydration ends, the porous optical fiber preform 1 is pulled up to the dehydration start location by using for example the elevating mechanism 120 of FIG. 20, then the vitrification is carried out. Namely, the vitrification is performed by changing the gas to be fed into the treatment chamber 2c of the furnace tube 2 to the gas conditions for the vitrification by the controller 90, the heater 7 is heated up to the vitrification temperature, and, when the temperature is stabilized, the controller 90 further lowers the porous optical fiber preform 1 at a predetermined rate and changes the heated position of the porous optical fiber preform 1, whereby a transparent optical fiber preform is obtained.

When the vitrification ends, by the operation of for example the elevating mechanism 120 illustrated in FIG. 20, the elevating shaft 4 is raised and the upper lid 3 is raised together. When the upper lid 3 moves away from the top end of the furnace tube 2 and the transparent optical fiber preform leaves the furnace tube 2, the transparent optical fiber preform is removed from the preform holder 5.

Note that the controller 90 also functions as a temperature controlling means for controlling the heater 7 in the heating furnace 8 explained above as illustrated in FIG. 12 other than functioning as the pressure controlling means explained above. Further, in order to perform such temperature control, a temperature sensor for measuring the temperature of the internal portion of the furnace tube 2 or the temperature of the heaters 7 in the heating furnace 8, for example, a thermocouple or a radiation temperature detector is disposed in the dehydration and vitrification apparatus. Further, the power supply 95 is provided so as to supply power to the heater 7 according to control instructions from the controller 90.

Such a temperature controller will be explained later as a second aspect of the present invention by referring to FIG. 12 to FIG. 20.

During this treatment, the exhaust discharged from the gas discharge port 10 is treated by a not illustrated exhaust treatment device.

As described above, in the dehydration and vitrification apparatus of the present embodiment, since the upper lid 3 is formed by a metal, the machining of the seal member 20 for forming the sealing portion between the upper lid 3 and the elevating shaft 4 becomes easy, the clearance between the upper lid 3 and the elevating shaft 4 can be made as small as possible, and the two can be easily sealed by the ring-shaped seal member 20 made of rubber or a resin.

Further, by sealing the upper lid 3 and elevating shaft 4 and the furnace tube 2 and upper lid 3 by the seal members 20 and 24 made of rubber or a resin, the periphery of the upper lid 3 and the upper portion of the furnace tube 2 can be reliably sealed without generating dust at the upper portion of the furnace tube 2.

Further, if the upper lid 3 and elevating shaft 4 and the upper lid 3 and furnace tube 2 can be reliably sealed, the interior of the furnace tube 2 can be placed into vacuum state or heat treatment in the pressurized state can be easily carried out.

Further, even with seal members 20 and 24 made of rubber or a resin, since the upper lid 3 is cooled by the cooling means 21 by the cooling medium, thermal damage of the seal members 20 and 24 can be prevented.

Even when the elevating shaft 4 is made of metal, since the preform holder 5 is formed by quartz glass or a ceramic, the intrusion of a foreign substance from the preform holder 5 near the porous optical fiber preform 1 into the porous optical fiber preform 1 can be avoided as much as possible.

Even if the upper lid 3 is made by a metal and the elevating shaft 4 is made by a metal, since a corrosion-resistant layer is provided on at least the inner surface of the upper lid 3 and the surface of the elevating shaft 4, their corrosion due to the treatment gas introduced from the gas feed port 9 into the furnace tube 2 can be prevented.

In this case, since the heat insulating means 23 is provided at the upper lid 3 covering its inner surface, the conductance of the radiant heat from the heater 7 to the upper lid 3 can be reduced and the thermal damage of the rubber or resin seal member 20 can be prevented. In this case, since the surface of the heat insulating means 23 is covered by the quartz cover 23b, the dropping of fiber of the carbon felt shaped article or quartz wool or other insulating material 23a to the porous optical fiber preform 1 side at the time of an elevation or lowering operation can be prevented.

Second Embodiment

Figure 3:
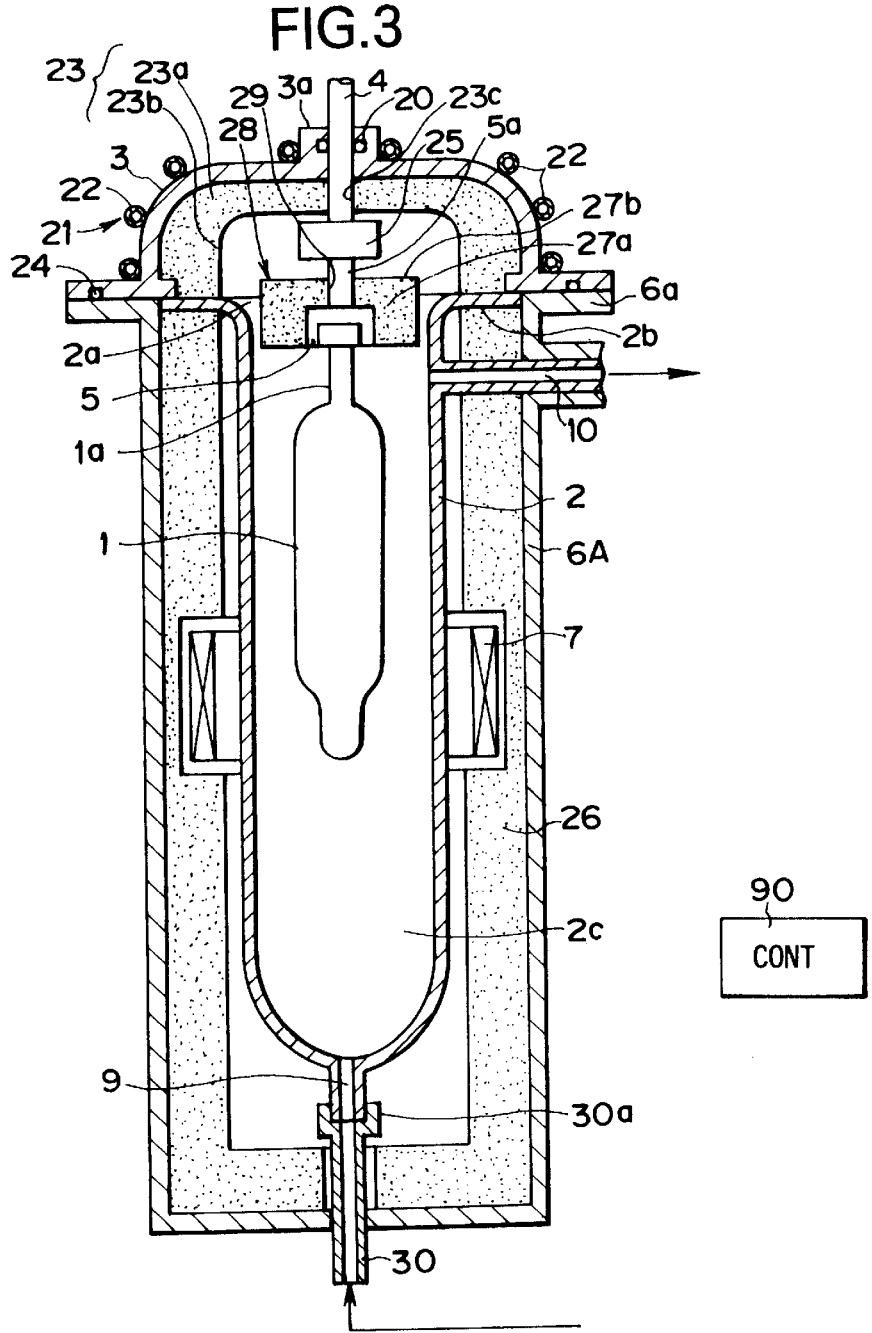
FIG. 3 is a vertical sectional view of a porous optical fiber preform dehydration and vitrification apparatus according to a second embodiment of the present invention.
Figure 4:
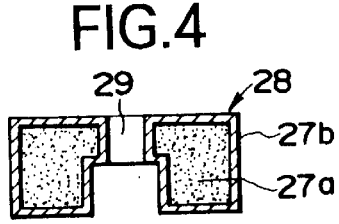
FIG. 4 is an enlarged vertical sectional view of a heat insulating material cover mounted on the preform holder illustrated in FIG. 3.

FIG. 3 and FIG. 4 are views of the general configuration of a porous optical fiber preform dehydration and vitrification apparatus according to a second embodiment of the present invention, in which FIG. 3 is a vertical sectional view of the dehydration and vitrification apparatus, and FIG. 4 is an enlarged vertical sectional view of the heat insulating means mounted on the preform holder in FIG. 3.

In the dehydration and vitrification apparatus illustrated in FIG. 3 and FIG. 4, parts given the same reference numerals as those of the dehydration and vitrification apparatus illustrated in FIG. 1 and FIG. 2 are the same as or similar to the parts in the dehydration and vitrification apparatus illustrated in FIG. 1 and FIG. 2.

Note that, in FIG. 3 and FIG. 4, structural parts and operations common to those of the first embodiment for which the illustrations should be simplified and overlapped explanations omitted, for example the exhaust pipe 13, pressure control valve 14, pressure control valve 16, differential pressure meter 17, controller 90, and power supply 95 are omitted. This same is true for the other embodiments explained later.

In the dehydration and vitrification apparatus of the second embodiment illustrated in FIG. 3 and FIG. 4, a furnace body 6A is provided so as to cover the entire furnace tube 2, and a heat insulating material 26 made of carbon felt or the like is arranged between the furnace tube 2 and the furnace body 6A while covering the furnace tube 2 and the heater 7. On the outer circumference of the top end of the furnace body 6A, a flange 6a supporting the upper lid 3 is provided.

The upper lid 3 and the elevating shaft 4 are formed by a metal such as stainless steel in the same way as the first embodiment illustrated in FIG. 2, while the preform holder 5 is formed by quartz glass or a ceramic.

In the present embodiment, the upper lid 3 made of metal is directly placed on the flange 6a of the furnace body 6A via the seal member 24 comprised of a O-ring made of rubber or a resin such as polytetrafluoroethylene. On at least the inner surface of the upper lid 3, preferably the entire surface of the upper lid 3, and the surface of the elevating shaft 4, in the same way as the first embodiment, a corrosion-resistant layer, for example, a polytetrafluoroethylene coating, titanium coating, or nickel coating, or alumina coating is provided. Further, in the same way as the first embodiment, the heat insulating means 23 serving as the first insulating means of the present invention is attached to the upper lid 3 while covering its inner surface.

This insulating means 23 is comprised of a carbon felt shaped article or quartz wool or other insulating material 23a covered by a cover 23b made of quartz. At the center of the heat insulating means 23, a through hole 23c is provided for passing the elevating shaft 4. The inner circumference of this through hole 23c is covered by the quartz cover 23b.

At the inner circumference of the shaft bore 19 provided in the elevating shaft passage 3a of the upper lid 3 through which the elevating shaft 4 passes, in the same way as the first embodiment, the seal member 20 comprising the O-ring made of rubber or a resin such as polytetrafluoroethylene is supported so that the elevating shaft 4 can be elevated or lowered while maintaining the sealed state.

The upper lid 3 is provided with the cooling means 21 for cooling the upper lid 3 by a cooling medium such as cooling water in the same way as the first embodiment illustrated in FIG. 2.

The cooling means 21 of the second embodiment is also constituted by a cooling pipe 22 wound around the outer circumference of the upper lid 3 and attached thereto by welding or the like so that heat conductance is possible.

On the preform holder 5, the heat insulating member 28 serving as the second insulating means of the present invention is attached for preventing the conductance of the radiant heat in the furnace tube 2 to the upper lid 3.

The heat insulating member 28 comprises a carbon felt shaped article or quartz wool or other insulating material 27a covered by a cover 27b made of quartz.

At the center of the heat insulating means 28, the through hole 29 passing the elevating shaft 4 therethrough is provided. The inner circumference of this through hole 29 is covered by the quartz cover 27b.

In the second embodiment, since the furnace body 6A is provided so as to cover the entire furnace tube 2, a gas feed connection pipe 30 is passed through it and supported at the lower portion of the furnace body 6A. The gas feed port 9 is inserted and connected to a joint 30a at the upper end thereof.

In the dehydration and vitrification apparatus of the second embodiment illustrated in FIG. 3 and FIG. 4, the following effects can be obtained in addition to the effects of the first embodiment.

(1) In the second embodiment, since the furnace body 6A is provided so as to cover the entire furnace tube 2, and the heat insulating material 26 made of the carbon felt shaped article or the like is arranged between the furnace tube 2 and the furnace body 6A so as to cover the furnace tube 2 and the heater 7 when the porous optical fiber preform 1 is heated, the porous optical fiber preform 1 can be efficiently heated without allowing the heat to escape from the heater 7 to the outside.

(2) The heat insulating means 28 according to the second insulating means of the present invention for preventing the conductance of the radiant heat in the furnace tube 2 to the upper lid 3 is arranged at the upper portion of the preform holder 5, so the temperature rise of the upper lid 3 due to the radiant heat in the furnace tube 2 can be suppressed and the thermal damage of the seal member 20 made or rubber or resin can be more effectively prevented. In this case, the surface of the heat insulating means 28 is covered by the quartz cover 27b, so the dropping of fiber of the carbon felt shaped article or quartz wool or other insulating material 27a to the porous optical fiber preform 1 side at the time of the elevation or lowering operation can be prevented.

Third Embodiment

Figure 5:
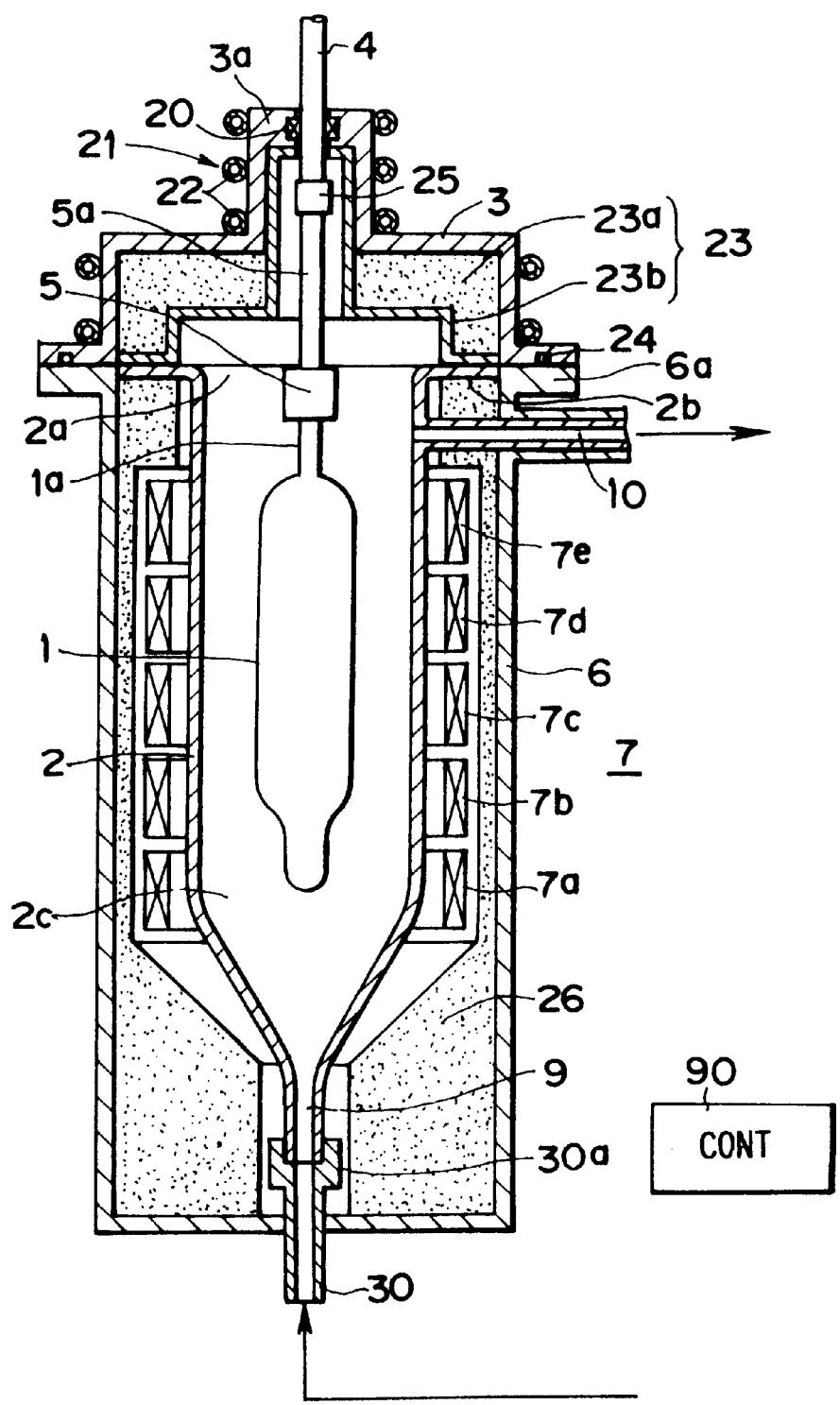
FIG. 5 is a vertical sectional view of a porous optical fiber preform dehydration and vitrification apparatus according to a third embodiment of the present invention.

FIG. 5 is a vertical sectional view of the general configuration of the porous optical fiber preform dehydration and vitrification apparatus according to a third embodiment of the present invention.

The dehydration and vitrification apparatus illustrated in FIG. 5 resembles the dehydration and vitrification apparatus illustrated in FIG. 4. The same reference numerals are assigned to parts corresponding to those of the dehydration and vitrification apparatus of FIG. 4.

In the dehydration and vitrification apparatus of the third embodiment, the heater 7 has a multlheater type structure comprised of a plurality of heaters, for example, in the present example, five heaters 7a to 7e, in multiple stages in a direction along the longitudinal direction of the porous optical fiber preform 1 around the outer circumference of the furnace tube 2.

The dehydration and vitrification apparatus has attached to it the heat insulating means 23 serving as the first insulating means of the present invention covering the inner surface of the metal upper lid 3. This insulating means 23 is comprised of a carbon felt shaped article or quartz wool or other insulating material 23a covering the inner surface of the upper lid 3 and the quartz cover 23b covering the surface facing the interior of the furnace tube 2 of this insulating material 23a. The quartz cover 23b is provided so as to cover also the inner surface on the rising portion 3b side provided at the center of the upper lid 3 and at which there is no insulating material 23a. Further, the quartz cover 23b is provided so as not to contact the elevating shaft 4 as illustrated.

In the dehydration and vitrification apparatus of such a structure, the following effects can be obtained in addition to the effects of the first embodiment and the second embodiment explained above.

(1) In the third embodiment, by controlling the supply of power to a plurality of heaters 7a to 7e by the controller 90, the intended position of the porous optical fiber preform 1 in the longitudinal direction can be heated without moving the porous optical fiber preform 1 in the furnace tube 2, therefore there are the advantages that the abrasion by the shaft seal is reduced, the service life can be extended, and the precision of the elevating shaft 4 is no longer strictly required. Note that details of the temperature control by the controller 90 will be explained later by referring to FIG. 12 to FIG. 20.

(2) The quartz cover 23b is provided at a surface facing the interior of the furnace tube 2 of the heat insulating material 23a covering the inner surface of the metal upper lid 3, so the dropping of fiber of the heat insulating material 23a to the porous optical fiber preform 1 side can be prevented.

(3) As in the present embodiment, in the case of the dehydration and vitrification apparatus of the multiheater type in which the porous optical fiber preform 1 is not elevated or lowered in the treatment chamber 2c of the furnace tube 2 during the treatment, the elevating shaft 4 can be made of metal. In this case, a corrosion-resistant layer the same as that of the upper lid 3 is provided at the surface of the metal elevating shaft 4.

Fourth Embodiment

Figure 6:
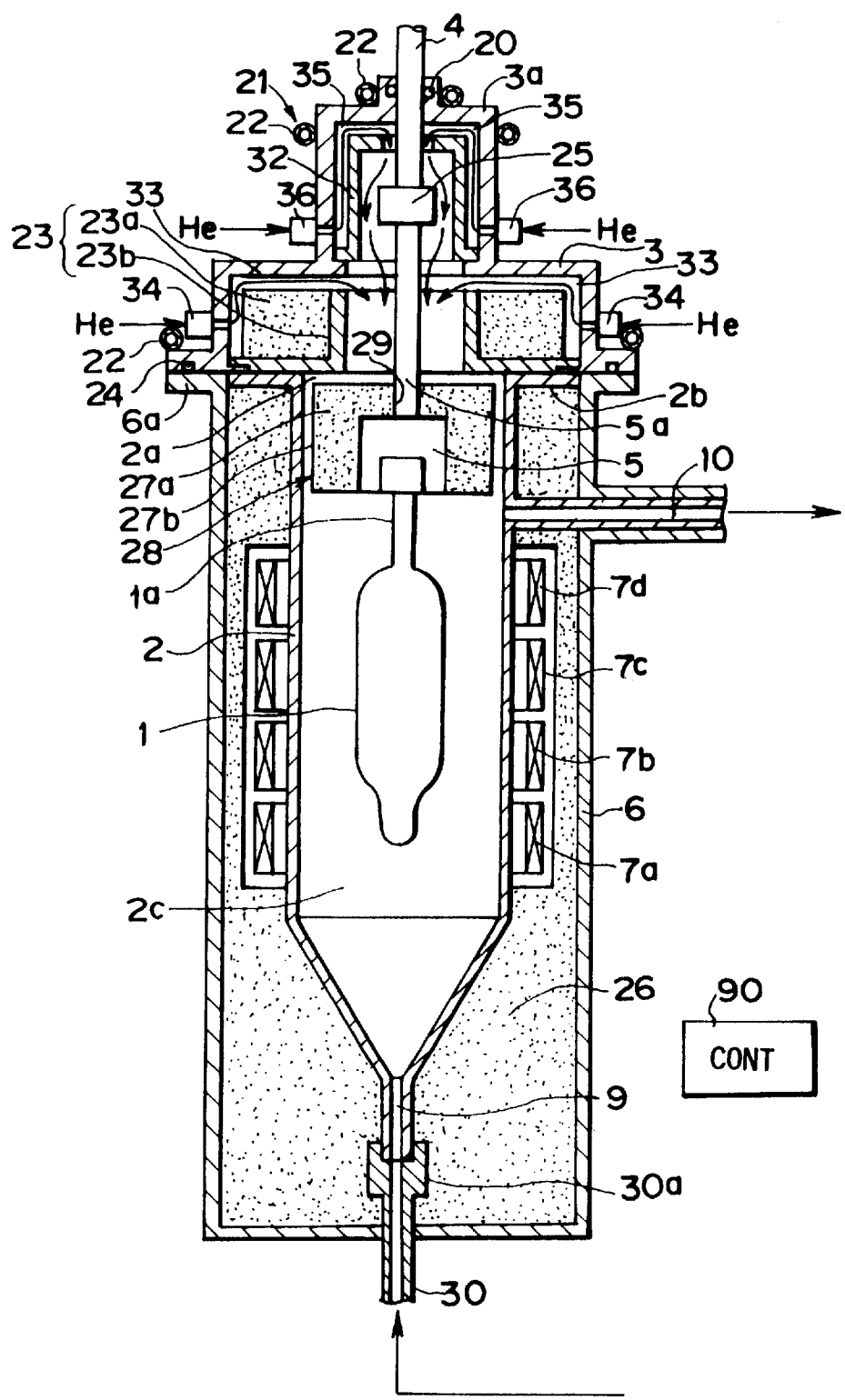
FIG. 6 is a vertical sectional view of a porous optical fiber preform dehydration and vitrification apparatus according to a fourth embodiment of the present invention.

FIG. 6,is a vertical sectional view of the general configuration of a porous optical fiber preform dehydration and vitrification apparatus according to a fourth embodiment of the present invention.

The dehydration and vitrification apparatus illustrated in FIG. 6 resembles the dehydration and vitrification apparatus of the third embodiment illustrated in FIG. 5. The same reference numerals are assigned to parts corresponding to those of the dehydration and vitrification apparatus of FIG. 5.

The dehydration and vitrification apparatus of the present embodiment is a dehydration and vitrification apparatus further improved in the multiheater type structure shown in FIG. 5.

Below, the differences from the dehydration and vitrification apparatus illustrated in FIG. 5 will be primarily explained.

The upper portion of the preform holder 5, in the same way as the dehydration and vitrification apparatus of the second embodiment shown in FIG. 3, has attached to it a heat insulating means 28 serving as the second insulating means of the present invention for preventing the conductance of the radiant heat in the furnace tube 2 to the upper lid 3.

The heat insulating means 28 is comprised of a carbon felt shaped article or quartz wool or other insulating material 27a covered by a cover 27b made of quartz. This heat insulating means 28 acts also as a gas blocking means for preventing the gas in the furnace from flowing to the upper lid 3 side other than the heat blocking means. The center of the heat insulating means 28 is provided with a through hole 29 for passing the elevating shaft 4. The inner circumference of this through hole 29 is covered by the quartz cover 27b.

In the present embodiment as well, the heat insulating means 23 serving as the first insulating means of the present invention covering the inner surface of the metal upper lid 3 is attached in the same way as the third embodiment shown in FIG. 5. This insulating means 23 is comprised by a carbon felt shaped article or quartz wool or other insulating material 23a covering the inner surface of the upper lid 3 and the quartz cover 23b covering the surface facing the interior of the furnace tube 2 of this insulating material 23a. The quartz cover 23b is provided so as not to contact the elevating shaft 4 as illustrated. On the inner surface of the rising portion 3b side provided at the center of the upper lid 3 at which there is no insulating material 23, another quartz cover 32 is provided.

Between the inner surface of the upper lid 3 facing the heat insulating means 23 and the heat insulating means 23 is provided an inert gas passage 33 serving as the first inert gas passage of the present invention carrying the inert gas while covering the inner surface of the upper lid 3 facing the heat insulating means 23. To this inert gas passage 33, the inert gas such as N2, He, or Ar gas is fed from an inert gas feed port 34 provided at the surface of the upper lid 3.

The inert gas passing through the inert gas passage 33 is ejected to the shaft 5a side of the preform holder 5 from between the top end of the quartz cover 27b and the upper lid 3.

Between the inner surface of the upper lid 3 facing the quartz cover 32 and the cover 32 is provided an inert gas passage 35 serving as the second inert gas passage of the present invention carrying the inert gas while covering the inner surface of the rising portion 3b of the upper lid 3 facing the cover 32. To this inert gas passage 35, an inert gas such as He gas is fed from an inert gas feed port 36 provided at the surface of the upper lid 3. The inert gas passing through the inert gas passage 35 is ejected from between the top end of the cover 32 and the rising portion 3b of the upper lid 3 so as to move downward along the surface of the elevating shaft 4.

In the multiheater type dehydration and vitrification apparatus of the present embodiment, desirably the elevating shaft 4 is formed by metal in view of the cost. In this case, a corrosion-resistant layer is provided at the surface of the metal elevating shaft 4.

The rest of the configuration of the dehydration and vitrification apparatus of the present embodiment is similar to that of the third embodiment explained by referring to FIG. 5.

In the dehydration and vitrification apparatus of this structure of the present embodiment, the following effects can be obtained in addition to the effects of the third embodiment explained above.

(1) In the upper portion of the preform holder 5, since the heat insulating means 28 serving as the second insulating means of the present invention for preventing the conductance of the radiant heat in the furnace tube 2 to the upper lid 3 is arranged in the same way as the second embodiment, a temperature rise of the upper lid 3 due to the radiant heat in the furnace tube 2 can be suppressed and thermal damage of the seal member 20 made of rubber or a resin can be more effectively prevented.

(2) In the heat insulating means 28, since the surface of the carbon felt shaped article or quartz wool or other insulating material 27a is covered by the quartz cover 27b, the dropping of the fiber of the heat insulating material 27a to the porous optical fiber preform 1 side at the time of an elevation or lowering operation can be prevented.

(3) Since the upper lid 3 is provided with two inert gas passages 33 and 35 (first and second inert gas passages of the present invention) covering the inner surface thereof and the inert gas is passed covering the inner surface of the upper lid 3, the treatment gas can be kept from reaching the metal upper lid 3 and elevating shaft 4.

Fifth Embodiment

Figure 7:
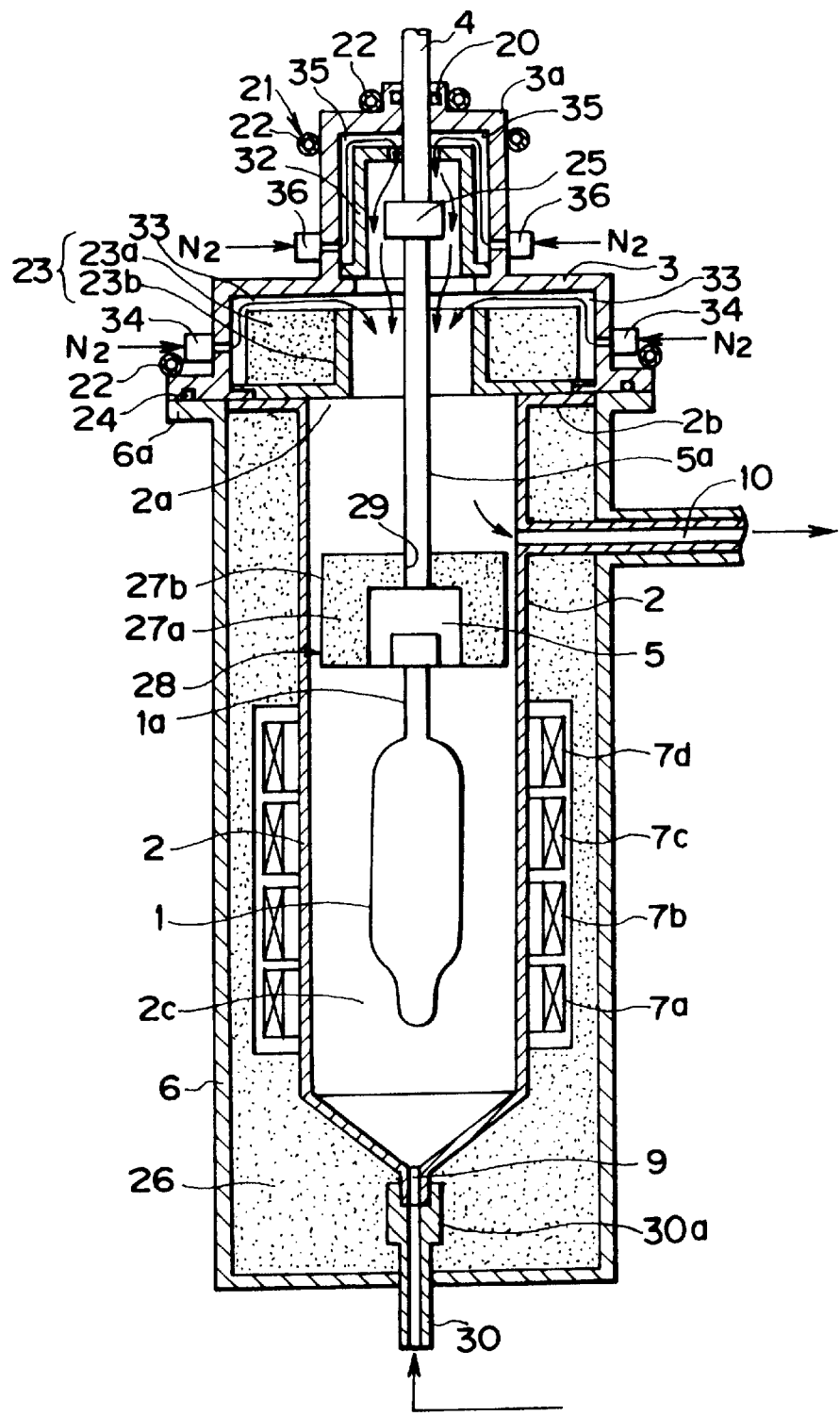
FIG. 7 is a vertical sectional view of a porous optical fiber preform dehydration and vitrification apparatus according to a fifth embodiment of the present invention.

FIG. 7 is a vertical sectional view of the general configuration of a porous optical fiber preform dehydration and vitrification apparatus according to a fifth embodiment of the present invention.

In the dehydration and vitrification apparatus of FIG. 7, the same reference numerals are assigned to parts corresponding to those of the dehydration and vitrification apparatus of the fourth embodiment illustrated in FIG. 6.

The dehydration and vitrification apparatus of the present embodiment shows a modification of the fourth embodiment shown in FIG. 6.

In the dehydration and vitrification apparatus illustrated in FIG. 7, when using an inert gas such as Ar, $N_2$ or He gas provided as the sealing gas from the inert gas passages 33 and 35, the gas blocking means-cum-heat insulating means 28 (gas blocking and insulating means of the present invention) covering the preform holder 5 is arranged under the gas discharge port 10, and the porous optical fiber preform 1 is heat treated in such a state.

When performing the heat treatment by arranging the gas blocking means-cum-heat insulating means 28 under the gas discharge port 10 in this way, even if a sealing gas such as Ar or $N_2$ gas provided from the inert gas passages 33 and 35 enters into the furnace tube 2, it is discharged from the gas discharge port 10, and almost no gas enters into the treatment chamber 2c accommodating the porous optical fiber preform 1.

The present inventors intensively studied and examined the phenomenon of the degradation of the transmission characteristic of the optical fiber when the gas (mainly He gas) fed into the furnace tube 2 from the gas feed port 9 was reduced and consequently discovered that this phenomenon occurred in a case where the clearance between the furnace tube 2 and the porous optical fiber preform 1 was considerably large.

As the reason for this, it was found that the He gas in the treatment gas introduced into the treatment chamber 2c from the gas feed port 9 was lighter than the $N_2$ gas used as the sealing gas introduced from the inert gas passages 33 and 35 into the treatment chamber 2c and that the density of the gas was further lowered by heating at the treatment chamber 2c of the furnace tube 2 and that accordingly the difference of density between the He gas and the sealing gas became very large, therefore a differential density flow of gas occurred in the furnace tube 2 and the $N_2$ gas flowed into the vicinity of the heating portion by the heater in the furnace tube 2. It can be considered that this tendency becomes greater when the treatment gas introduced from the gas feed port 9, for example, the He gas, is small in volume. It can be understood that this tendency tends to occur also in a case where the gap between the furnace tube 2 and the porous optical fiber preform 1 is large and that this is one of causes of the increase of the transmission loss of the optical fiber.

As a countermeasure for this a gas blocking means for inhibiting the flow of the sealing gas to be fed from the inert gas passages 33 and 35 to the lower side in the furnace tube 2 or the gas blocking means-cum-heat insulating means 28 is provided. This gas blocking means or gas blocking means-cum-heat insulating means 28 is preferably arranged beneath the gas discharge port 10. When arranging it in this way, the sealing gas substantially no longer flows beneath the gas blocking means or the gas blocking means-cum-heat insulating means 28. Further, by further providing this gas blocking means or gas blocking means-cum-heat insulating means 28, the flow of the sealing gas into the lower side in the furnace tube 2 can be further reduced. The gap between the upper lid and the gas blocking means 28 becomes a buffer chamber storing the sealing gas, the pressure becomes a little higher than the pressure of the buffer chamber for the discharge from the gas discharge port 10, and thus the amount of sealing gas can be reduced.

Sixth Embodiment

Figure 8:
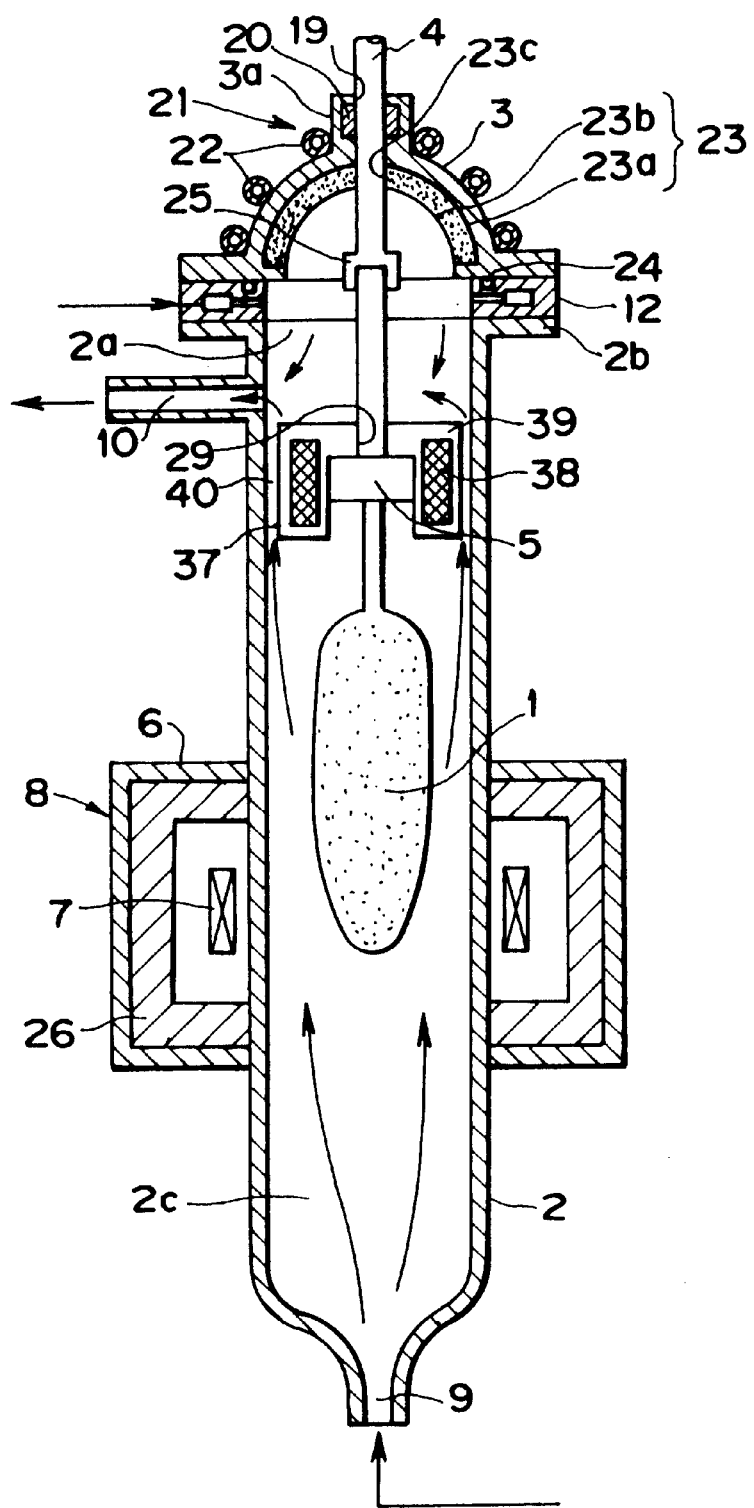
FIG. 8 is a vertical sectional view of a porous optical fiber preform dehydration and vitrification apparatus according to a sixth embodiment of the present invention.

FIG. 8 is a vertical sectional view of the general configuration of a porous optical fiber preform dehydration and vitrification apparatus according to a sixth embodiment of the present invention provided with a gas blocking means.

In the dehydration and vitrification apparatus illustrated in FIG. 8, parts corresponding to those of the above dehydration and vitrification apparatuses are indicated by the same reference numerals.

In the dehydration and vitrification apparatus illustrated in FIG. 8, a gas blocking means-cum-insulating means 37 (gas blocking and insulating means of the present invention) is provided in the preform holder 5 while surrounding the preform holder 5. This gas blocking means-cum-insulating means 37 is constituted by an annular insulating material 38 and a gas blocking member 39 covering the surface of this insulating material 38.

The outside diameter of the gas blocking means-cum-insulating means 37 is smaller than the inside diameter of for example the furnace tube 2 by about 5 to 20 mm. The clearance 40 between the gas blocking means-cum-insulating means 37 and the furnace tube 2 is set to not more than the size capable of preventing the sealing gas from moving downward due to the differential density flow and entering into the treatment chamber 2c of the furnace tube 2 by the flow of the treatment gas in the treatment chamber 2c. This clearance 40 is determined by the amount of treatment gas, the amount of the sealing gas, the clearance between the furnace tube 2 and the porous optical fiber preform 1, etc.

This gas blocking means-cum-insulating means 37 is placed on the preform holder 5 and is elevated or lowered together with the elevating shaft 4 at the time of elevation or lowering of the elevating shaft 4 by the operation of for example the elevating mechanism 120 illustrated in FIG. 20.

The rest of the configuration is similar to that of the dehydration and vitrification apparatus of FIG. 2.

In the dehydration and vitrification apparatus of the present embodiment, the porous optical fiber preform 1 is inserted down to a predetermined position in the furnace tube 2, the gas blocking means-cum-insulating means 37 is located under the gas discharge port 10 in this state, then the gas to be fed into the furnace tube 2 is switched to the treatment gas, and the temperature of the heater 7 is raised up to the treatment temperature. Thereafter, treatment such as dehydration and vitrification is carried out in the same way as the first embodiment explained by referring to FIG. 2 or the related art explained by referring to FIG. 1.

The effects of the present embodiment will be explained next.

(1) In the present embodiment, since the gas blocking means-cum-insulating means 37 is arranged under the gas discharge port 10 as illustrated, even if part of the sealing gas introduced from the furnace tube upper sealing gas feeder 12 moves downward due to the differential density flow, it can reach only to the top surface of the gas blocking means-cum-insulating means 37. Accordingly, the porous optical fiber preform 1 is almost never exposed to the sealing gas atmosphere.

(2) According to the gas blocking means-cum-insulating means 37 of the present embodiment, the atmosphere above the heat insulating means 37 is insulated, so the upper lid 3 made of metal and the seal member 20 made of rubber or a resin such as polytetrafluoroethylene can be prevented from becoming high in temperature and thus the precision of the clearance between the elevating shaft 4 and the upper lid 3 can be improved. As a result, the amount of sealing gas fed from the furnace tube upper sealing gas feeder 12 can be made smaller. Further, due to the improvement of the insulation effect, the radiant heat to the upper lid 3 side is reduced and the power consumed by the heater 7 fed from the power supply 95 illustrated in FIG. 2 can be reduced, thus there is an energy saving effect.

(3) According to the present embodiment, the deformation of the preform holder 5 made of quartz due to the heat can be prevented.

In the present embodiment, the gas blocking means-cum-insulating means 37 is elevated or lowered along with the elevation or lowering of the porous optical fiber preform 1, but when the clearance 40 between the furnace tube 2 and the gas blocking means-cum-insulating means 37 is small or when the elevating shaft 4 is bent due to thermal deformation, the gas blocking means-cum-insulating means 37 sometimes contacts the inner surface of the furnace tube 2. The inner surface of the furnace tube 2 sometimes has fine glass particles adhered to it, so there is a possibility that the adhered substance will detach from the inner surface of the furnace tube 2 due to the elevation or lowering of the gas blocking means-cum-insulating means 37 and adhere to the porous optical fiber preform 1 to cause a surface defect in the porous optical fiber preform 1. Therefore, a stopper for receiving the gas blocking means-cum-insulating means 37 is provided under the gas discharge port 10 at the inner surface of the furnace tube 2, the gas blocking means-cum-insulating means 37 is received by this stopper, and the gas blocking means-cum-insulating means 37 is prevented from moving downward lower than this stopper, whereby the occurrence of surface defects in the porous optical fiber preform 1 can be substantially completely prevented.

Seventh Embodiment

Figure 9:
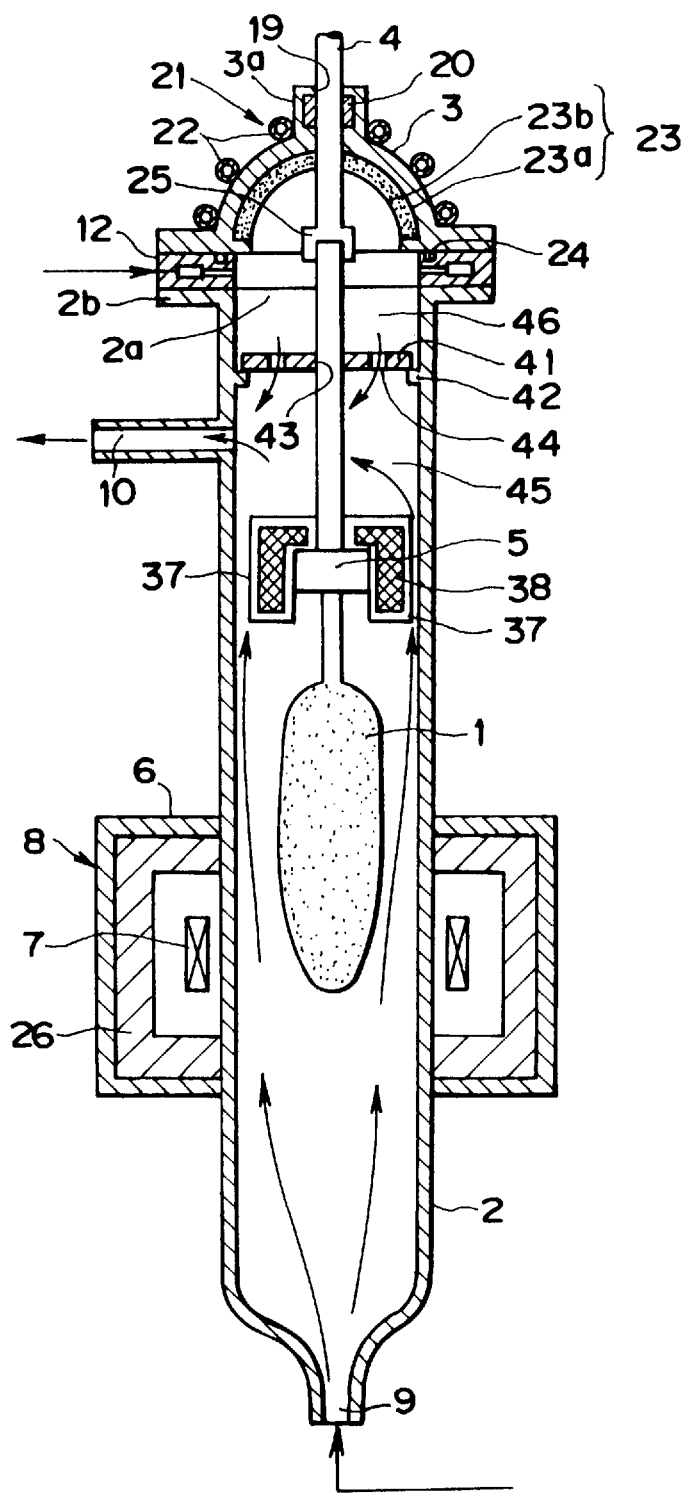
FIG. 9 is a vertical sectional view of a porous optical fiber preform dehydration and vitrification apparatus according to a seventh embodiment of the present invention.

FIG. 9 is a vertical sectional view of the general configuration of a porous optical fiber preform dehydration and vitrification apparatus according to a seventh embodiment of the present invention provided with a gas blocking means.

In the dehydration and vitrification apparatus illustrated in FIG. 9, the same reference numerals are assigned to parts corresponding to those of the dehydration and vitrification apparatus of FIG. 8.

In the dehydration and vitrification apparatus illustrated in FIG. 9, the gas blocking means-cum-insulating means 37 is arranged under the gas discharge port 10 in the furnace tube 2 while supported by the preform holder 5. The gas blocking means 41 is arranged above the gas discharge port 10, and is positioned so that it will not move further lower than this by a stopper 42 at the inner surface of the furnace tube 2. A hole 43 through which the elevating shaft 4 passes is provided at the center of the gas blocking means 41. The gas blocking means is provided with a gas through hole 44 for passing the sealing gas introduced from the furnace tube upper sealing gas feeder 12. A buffer chamber 45 is provided between the gas blocking means-cum-insulating means 37 and the gas blocking means 41, and a buffer chamber 46 is provided between the gas blocking means 41 and the upper lid 3. The rest of the configuration is similar to that of the dehydration and vitrification apparatus of FIG. 8.

In such a dehydration and vitrification apparatus, the sealing gas is rectified by the gas through hole 44 of the gas blocking means 41, flows into the buffer chamber 45, and flows out of the gas discharge port 10. Further, the flow of the sealing gas introduced from the furnace tube upper sealing gas feeder 12 is throttled at the gas through hole 44, therefore the gas pressure of the buffer chamber 46 between the gas blocking means 41 and the upper lid 3 becomes higher, the sealing performance of the upper portion of the furnace tube 2 rises by this, and thus the amount of sealing gas fed from the furnace tube upper sealing gas feeder 12 can be reduced. Further, the entry of the treatment gas into the buffer chamber 46 can be prevented.

Eighth Embodiment

Figure 10:
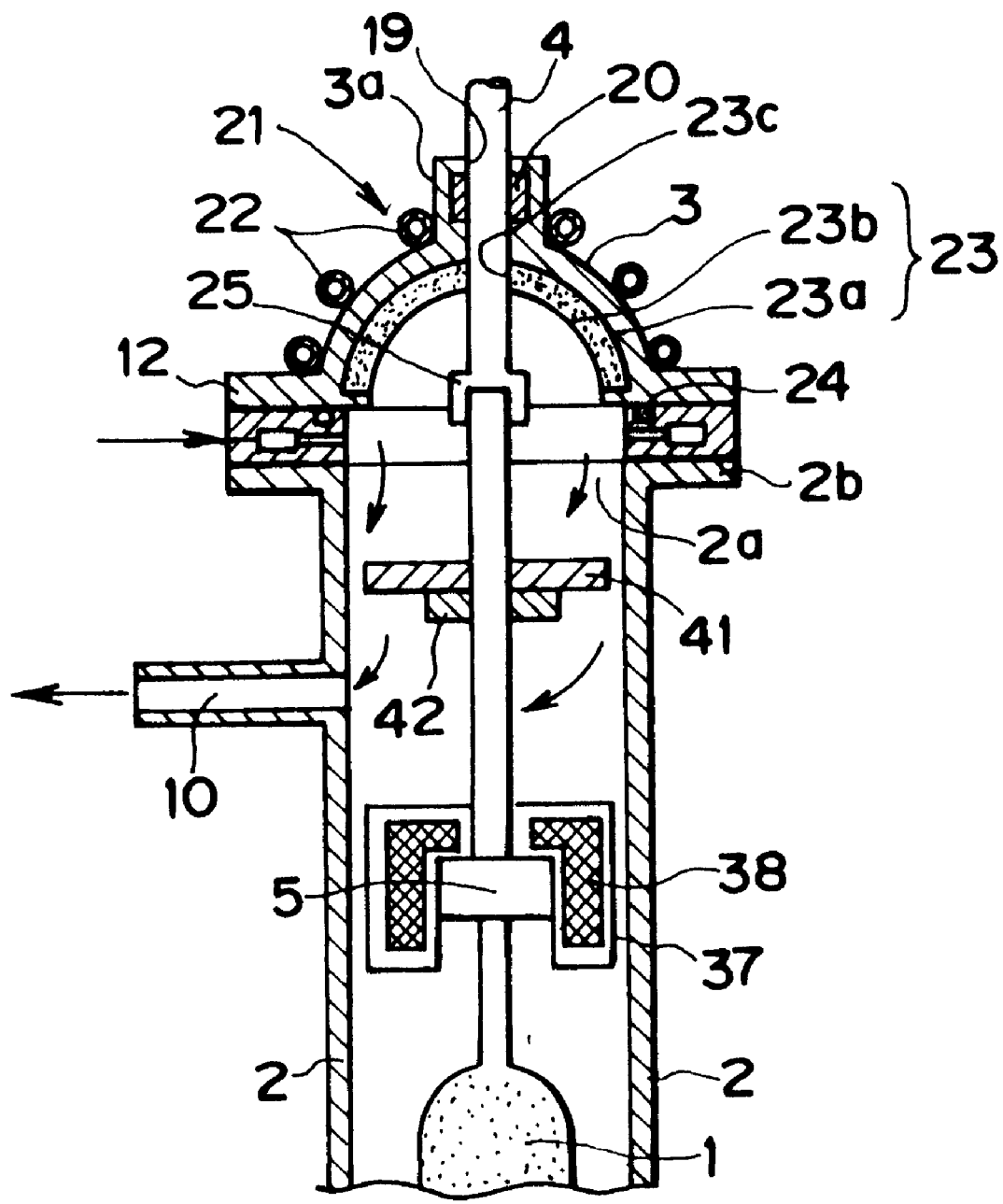
FIG. 10 is a vertical sectional view of a porous optical fiber preform dehydration and vitrification apparatus according to an eighth embodiment of the present invention.

FIG. 10 is a vertical sectional view of the general configuration of a porous optical fiber preform dehydration and vitrification apparatus according to an eighth embodiment of the present invention provided with a gas blocking means.

In the dehydration and vitrification apparatus of FIG. 10, the same reference numerals are assigned to parts corresponding to those of the dehydration and vitrification apparatus illustrated in FIG. 9.

In the dehydration and vitrification apparatus illustrated in FIG. 10, the gas blocking means 41 supporting the stopper 42 is provided in the elevating shaft 4. The rest of the configuration is similar to that of the dehydration and vitrification apparatus shown in FIG. 9.

In this dehydration and vitrification apparatus as well, similar effects to those by the dehydration and vitrification apparatus shown in FIG. 9 can be obtained.

Ninth Embodiment

Figure 11:
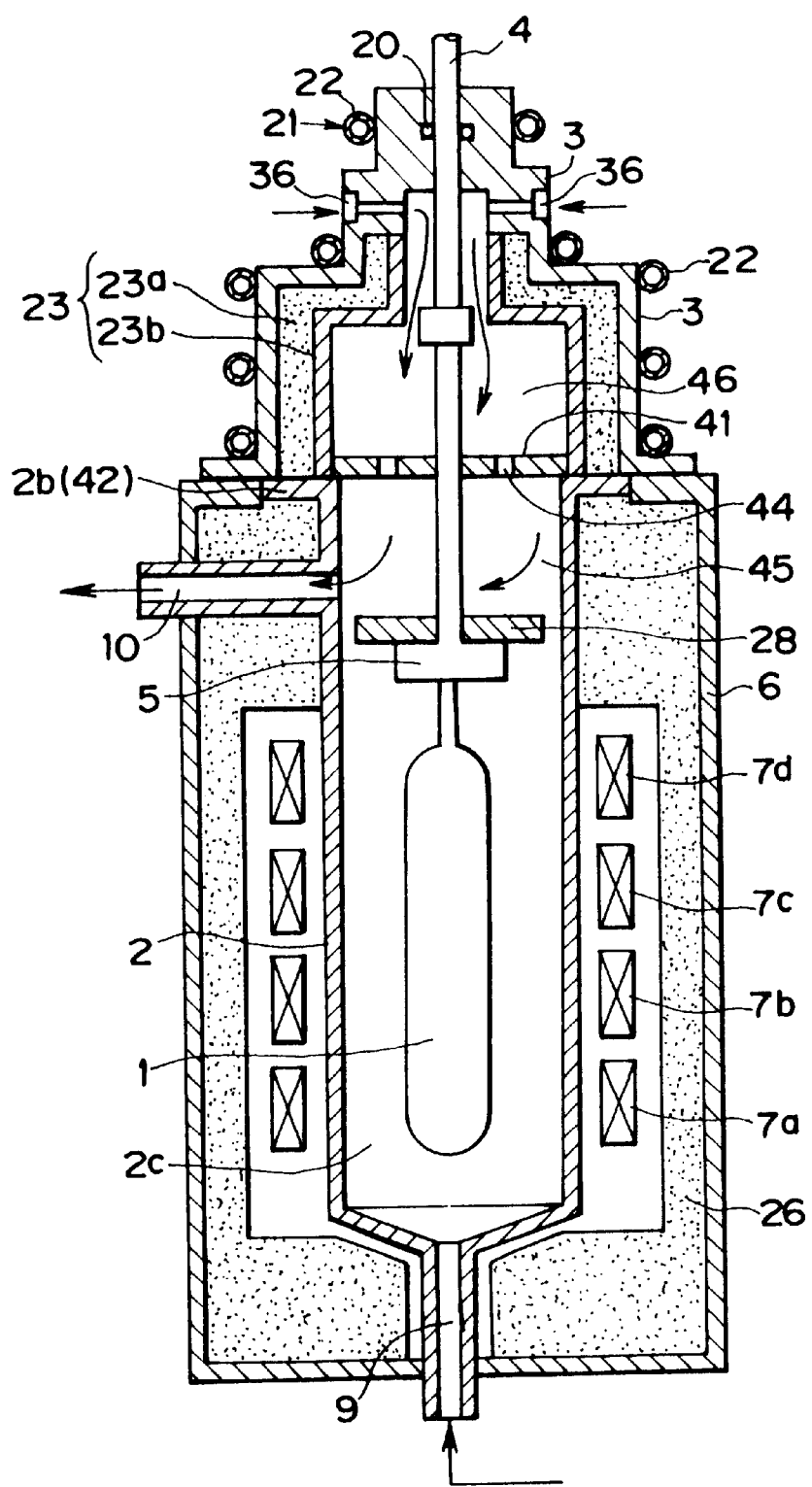
FIG. 11 is a vertical sectional view of a porous optical fiber preform dehydration and vitrification apparatus according to a ninth embodiment of the present invention.

FIG. 11 is a vertical sectional view of the general configuration of a porous optical fiber preform dehydration and vitrification apparatus according to a ninth embodiment of the present invention provided with the gas blocking means.

In the dehydration and vitrification apparatus of FIG. 11, the same reference numerals are assigned to parts corresponding to those of the dehydration and vitrification apparatus illustrated in FIG. 9.

The dehydration and vitrification apparatus illustrated in FIG. 11 is of a multiheater type provided with the gas blocking means-cum-insulating means 37 and the gas blocking means 41 shown in FIG. 9.

In the present embodiment, the upper flange 2b of the furnace tube 2 acts also as the stopper and supports the gas blocking means 41.

Such a multiheater type dehydration and vitrification apparatus can give similar effects to those by the dehydration and vitrification apparatus shown in FIG. 9.

10th Embodiment

The porous optical fiber preform dehydration and vitrification apparatus according to the 10th embodiment of the first aspect of the present invention suitably combines the features of the first to ninth embodiments explained above. By this, combined effects of the dehydration and vitrification apparatuses of the first to ninth embodiments can be obtained.

Note that the elevating shaft 4 in the first to 10th embodiments of the present invention explained by referring to FIG. 2 to FIG. 11 is structured inside so cooling medium flows from an outbound path to a return path by for example a double tube. The elevating shaft 4 is cooled by this. In such a structure, when the elevating shaft 4 is made of a metal, machining is easy and maintenance of the mechanical strength is simple.

Summary of Effects of Dehydrations and Vitrification Apparatuses of First to 10th Embodiments In the porous optical fiber preform dehydration and vitrification apparatuses of the first to 10th embodiments of the present invention, since the upper lid is formed by a metal, the machining of the seal member for forming the sealing portion between the upper lid and the elevating shaft becomes easy, the clearance between the upper lid and the elevating shaft can be made as small as possible, and the two can be easily sealed by a seal member made of rubber or a resin.

By sealing the upper lid and elevating shaft and the upper lid and furnace tube or furnace body by a seal member made of rubber or a resin, these can be reliably sealed without generating dust at the upper portion of the furnace tube.

Since the upper lid and elevating shaft and the upper lid and furnace tube or furnace body can be reliably sealed, heat treatment while placing the interior of the furnace tube in a depressurized state (or a vacuum state) or pressurized state becomes easy.

Even if the seal member is made of rubber or a resin, since the upper lid is cooled by the cooling means by a cooling medium, the thermal damage of the seal member can be prevented.

When both of the upper lid and the elevating shaft are formed by a metal, the precision of the sealing part can be further improved and the seal can be made more reliable.

Even when the elevating shaft is made of a metal, since the preform holder is formed by quartz glass or a ceramic, the entry of a foreign substance from the preform holder near the porous optical fiber preform into the porous optical fiber preform can be avoided as much as possible.

Even if both of the upper lid and the elevating shaft are made of metal, since a corrosion-resistant layer is provided on at least the inner surface of the upper lid and the surface of the elevating shaft, these can be prevented from being corroded due to the treatment gas.

Method of Heat Treatment of Porous Optical Fiber Preform and Apparatus for Same A method of heat treatment of a porous optical fiber preform and an apparatus for the same will be explained as a second aspect of the present invention.

A method of heat treatment of a porous optical fiber preform using the porous optical fiber preform dehydration and vitrification apparatus illustrated in FIG. 12 and a heating apparatus for this purpose will be explained as a first embodiment of the second aspect of the present invention.

Figure 12:
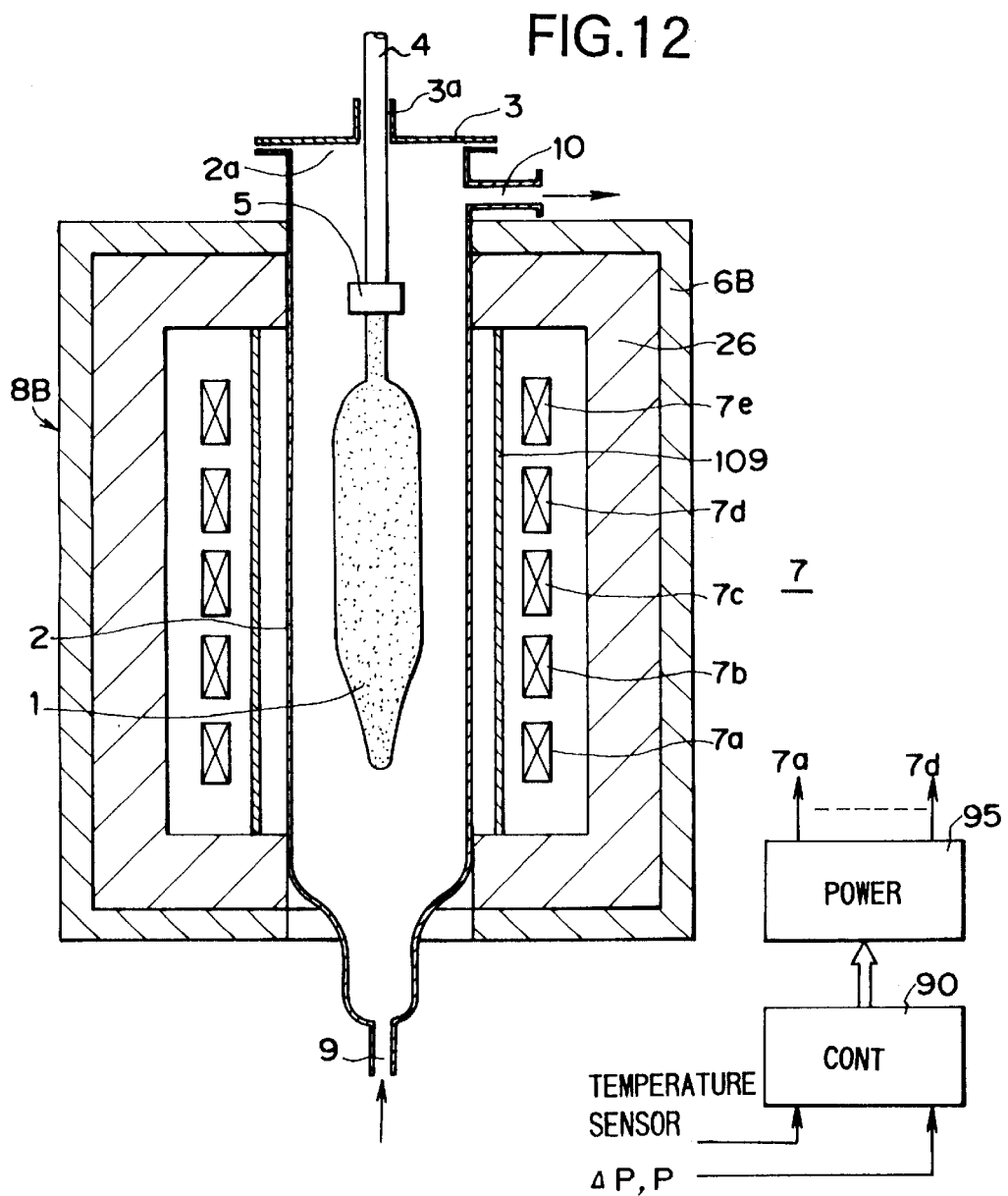
FIG. 12 is a vertical sectional view of a porous optical fiber preform dehydration and vitrification apparatus according to 11th and 12th embodiments of the present invention.

The dehydration and vitrification apparatus illustrated in FIG. 12 resembles the dehydration and vitrification apparatuses illustrated in FIGS. 5 to 7 and 11. However, the first aspect of the present invention was explained focusing on the structures of the upper lid 3 of the upper portion (head) of the dehydration and vitrification apparatus, elevating shaft 4, etc. And the gas conditions inside the furnace tube 2 as explained above, therefore, in the dehydration and vitrification apparatuses explained by illustration in FIGS. 5 to 7 and 11, in addition to the structure of the dehydration and vitrification apparatus illustrated in FIG. 12, the upper lid 3, elevating shaft 4, cooling means 21, cooling pipe 22, insulating means 23, lid holder 25, gas feed structure, etc. were also illustrated.

The dehydration and vitrification apparatus (heating apparatus) of a second aspect of the present invention explained by referring to FIG. 12 desirably comprises a dehydration and vitrification apparatus having the features of the first to 10th embodiments based on the first aspect of the present invention explained above. However, the gist of the second aspect of the present invention resides in the method for heating the porous optical fiber preform in the dehydration and vitrification apparatus (heating apparatus) and the structure of the heating apparatus for this purpose, therefore the method of heat treatment of a porous optical fiber preform according to the second aspect of the present invention is not limited to the usage of a dehydration and vitrification apparatus having an upper structure such as the upper lid 3, elevating shaft 4, cooling means 21, cooling pipe 22, and insulating means 23 illustrated in FIG. 2 to FIG. 11. However, the structure of the multlheater of FIG. 12 of the core of the heating apparatus is similar to the structure of the heaters in FIGS. 5 to 7 and 11.

11th to 12th Embodiments

FIG. 12 is a view of the configuration of the porous optical fiber preform dehydration and vitrification apparatus (hereinafter, referred to simply as the "dehydration and vitrification apparatus" or "heating apparatus") for the heat treatment of the porous optical fiber preform according to the second aspect of the present invention.

The 11th embodiment and the 12th embodiment of the present invention will be explained by referring to FIG. 12.

The heating apparatus of a porous optical fiber preform illustrated in FIG. 12 has a heating furnace 8B, controller 90, and power supply 95.

The controller 90 receives as its input the temperature detection signal of the temperature sensor and controls the amount of power to be supplied to the multiheater 7 constituted by a plurality of heaters 7a to 7e according to a later explained control method. The power supply 95 includes for example a thyristor. It ignites the thyristor at an ignition angle in accordance with a power supply control signal computed at the controller 90 and supplies power to the heaters 7a to 7e.

The controller 90 receives as its input the detection signal of the differential pressure meter 17 and controls the degree of opening of the pressure control valve 14 and the pressure control valve 16 as illustrated in FIG. 2. It also controls the heating of the heaters 7a to 7e. In the second aspect of the present invention, the controller 90 operates as the temperature controlling means.

Further, in addition to controlling the temperature, the controller 90 also controls the gas feed and discharge explained later.

The controller 90 is constituted by for example a microcomputer. A later explained temperature control method is stored in a memory of the microcomputer as a program. The temperature control explained later is carried out by the execution of the program.

The heating furnace 8B illustrated in FIG. 12 resembles the heating furnace 8 of the dehydration and vitrification apparatus illustrated in FIG. 5. Below, a summary of the heating furnace 8B will be given.

In the heating furnace 8B, a quartz furnace tube 2 is arranged at the center along the vertical direction. From the upper portion of this furnace tube 2, the porous optical fiber preform 1 is held at the bottom end of the elevating shaft 4 by the preform holder 5 and supported by this suspended into the furnace tube 2. The upper opening 2a of the furnace tube 2 is closed by the upper lid 3. The upper lid 3 is provided with a passage 3a for elevating and lowering the elevating shaft 4. The gas feed pipe 9 for feeding the treatment gas into the furnace tube 2 is connected to the lower portion of the furnace tube 2. The exhaust pipe (gas discharge port) 10 for discharging the exhaust gas in the furnace tube 2 to the outside is connected to the upper portion of the furnace tube 2. A muffle pipe 109 is concentrically arranged around the outer circumference of the part of the furnace tube 2 accommodating the porous optical fiber preform 1. Around the outer circumference of this muffle pipe 109, a plurality of heaters, for example, in the illustrated example, five heaters 7a to 7e, are arranged in the vertical direction at predetermined intervals along the longitudinal direction of the outer circumference of the furnace tube 2. The heat insulating material 26 is arranged on the outside of the heaters 7a to 7e surrounding these muffle pipe 109 and heaters 7a to 7e. A furnace body 6B is arranged surrounding this insulating material 26. The heating furnace 8B is constituted by this.

Two examples of the method of heat treatment of a porous optical fiber preform using the heating furnace 8B illustrated in FIG. 12 will be explained.

11th Embodiment (First Heat Treatment Method)

A first heat treatment method of porous optical fiber preform will be explained an 11th embodiment of the present invention.

FIGS. 13A to 13E are graphs for explaining the method of heat treatment of a porous optical fiber preform 1A for a core doped in the porous layer (hereinafter, this will be referred to as the "porous optical fiber preform without target 1A").

FIG. 13A relates to the case before introducing the porous optical fiber preform without target.

Before introducing the porous optical fiber preform 1 into the furnace tube 2 of the heating furnace 8B, the controller 90 supplies power to the heaters 7a to 7e via the power supply 95 and heats the heaters 7a to 7e so that the temperature of a predetermined section in the furnace tube 2 in which the porous optical fiber preform without target 1A is to be arranged becomes a holding temperature T0, for example, 900° C. as shown in FIG. 13A. At this time, the $N_2$ gas is fed into the furnace tube 2 from the gas feed pipe 9 of the lower portion and discharged from the upper exhaust pipe (gas discharge port) 10.

The controller 90 receives as its input the temperature detected by the temperature sensor arranged in the vicinity of the heaters 7a to 7e and controls the temperature so that the holding temperature is obtained. The rest of the method of temperature control is the same.

FIG. 13B shows the case of preheating before dehydration.

In a state heated to the holding temperature, the upper lid 3 at the upper portion of the heating furnace 8B is opened, the porous optical fiber preform without target 1A is arranged suspended at a predetermined section in the furnace tube 2, then the upper lid 3 is closed.

Thereafter, the controller 90 raises the temperatures of the heaters 7a to 7e and controls the temperatures of the heaters 7a to 7e so that the temperature in the furnace tube 2 becomes an substantially uniform dehydration preheating temperature T1 in the longitudinal direction of the porous optical fiber preform without target 1A as shown in FIG. 13B.

FIG. 13C shows the case of dehydration.

The controller 90 switches the gas to be fed into the furnace tube 2 from $N_2$ gas to He gas and $Cl_2$ gas and further, in a certain case, $O_2$ gas in predetermined amounts simultaneously with the change of the temperatures of the heaters 7a to 7e. During this time, the controller 90 receives as its input the detection value from the differential pressure meter 17 illustrated in FIG. 2 and controls the pressure control valve 14 and the pressure control valve 16 so that the differential pressure between the pressure in the furnace tube 2 and the pressure in the furnace body 6B becomes constant.

After the gas in the furnace tube 2 is completely switched, the temperatures of the heaters 7a to 7e reach the predetermined temperatures, and the temperatures in the furnace tube 2 corresponding to the heaters 7a to 7e reach the dehydration preheating temperature T1 along with this, the controller 90 raises the temperature of the lowermost heater 7a to change the temperature in the furnace tube 2 corresponding to this heater 7a to the dehydration temperature T2 as shown in FIG. 13C. The rate of temperature rise at this time differs according to the size of the heaters 7a to 7e and the type of the porous optical fiber preform (with target or without target).

When the temperature in the furnace tube 2 corresponding to the lowermost heater 7a reaches the dehydration temperature T2, the controller 90 raises the temperature in the furnace tube 2 corresponding to the second lowest heater 7b next to change the temperature in the furnace tube 2 corresponding to this heater 7b to the required heat treatment temperature, that is, the dehydration temperature T2, and, at the same time, reduces the temperature of the lowermost heater 7a to return the temperature in the furnace tube 2 corresponding to this heater 7a to the dehydration preheating temperature T1. Namely, the controller 90 drives the heaters 7a to 7e so that the temperature of the porous optical fiber preform 1 partially moves from the lower portion to the upper portion as illustrated in FIG. 13C. This switching of the temperatures of the heaters 7a to 7e by the controller 90 sequentially moves upward for the dehydration at the dehydration temperature T2 over the entire length of the porous optical fiber preform without target 1A.

By dehydrating the preform in this way, it is possible to move the position where the porous optical fiber preform without target 1A becomes the dehydration temperature T2 while moving the porous optical fiber preform 1A in the longitudinal direction of the porous optical fiber preform 1A.

In such heat treatment, it is important to raise the parts of the porous optical fiber preform without target 1A in the longitudinal direction from the dehydration preheating temperature T1 to the required heat treatment temperature, that is, the dehydration temperature T2, and perform the heating so that the rate of temperature rise becomes constant at all portions of the porous optical fiber preform without target 1A in the longitudinal direction. Further, in such heat treatment, preferably the heating is carried out so that the temperatures of all parts of the porous optical fiber preform without target 1A in the longitudinal direction fall from the required heat treatment temperature, that is, the dehydration temperature T2, to the dehydration preheat temperature T1, and the rate of temperature fall becomes constant at all parts of the porous optical fiber preform without target 1A in the longitudinal direction.

Such temperature control is easy by measuring the temperature distribution in the furnace tube 2 by using the temperature sensor and determining the power supply condition etc. of the heaters 7a to 7e from the power supply 95 in a state where the porous optical fiber preform without target 1A is not in the furnace tube 2. Further, preferably the power supply condition of the heaters 7a to 7e, the temperature distribution in the furnace tube, etc. are finally determined by measuring in the longitudinal direction the distribution of the OH in the diametrical direction of the porous optical fiber preform without target 1A for which the dehydration ended.

In the present embodiment, this method of temperature control is performed by the controller 90.

FIG. 13D shows the case of preheating before vitrification.

When the dehydration ends, the controller 90 suspends the supply of the chlorine gas to be fed to the furnace tube 2 and raises the temperatures of the heaters 7a to 7e so that predetermined sections in the furnace tube 2 corresponding to these heaters 7a to 7e uniformly become a vitrification preheating temperature T3 as shown in FIG. 13D.

FIG. 13E shows the case of vitrification.

After the temperatures in the predetermined sections in the furnace tube 2 corresponding to the heaters 7a to 7e reach the vitrification preheating temperature T3, in the same way as the case of dehydration, the controller 90 performs the vitrification with respect to the entire length of the porous optical fiber preform without target 1A while moving the position at which the temperature of the porous optical fiber preform without target 1A becomes a vitrification temperature T4 higher than the vitrification preheat temperature T3 in the longitudinal direction of the porous optical fiber preform without target 1A as shown in FIG. 13E.

It is important to perform the heating so that the rate of temperature rise for raising the parts of the porous optical fiber preform without target 1A in the longitudinal direction from the vitrification preheating temperature T3 to the required heat treatment temperature, that is, the vitrification temperature T4, becomes constant at all parts of the porous optical fiber preform without target 1A in the longitudinal direction even in such heat treatment. Further, even in such heat treatment, preferably the heating is carried out so that the rate of temperature fall for lowering all the parts of the porous optical fiber preform without target 1A in the longitudinal direction from the required heat treatment temperature, that is, the vitrification temperature T4, to the vitrification preheating temperature T3 becomes constant at all portions of the porous optical fiber preform without target 1A in the longitudinal direction.

Accordingly, in the present embodiment as well, the controller 90 performs this heat treatment.

If the temperature can be raised to the vitrification temperature T4 in the section at the top end of the porous optical fiber preform without target 1A by raising the temperature of the heater 7e under the temperature control of the controller 90, the porous optical fiber preform without target 1A becomes a transparent core optical fiber preform over its entire length.

Suitably thereafter, the controller 90 reduces the temperatures of the heaters 7a to 7e so as to reduce the temperature of all sections of the transparent core optical fiber preform to a substitution temperature T5. The controller 90 gradually changes the gas to be fed into the furnace tube 2 from the He gas (in some case, the chlorine gas or the oxygen gas is supplied together) to $N_2$ gas or Ar gas simultaneously with this fall in temperature.

The controller 90 receives as its input the detection value of the temperature sensor. When confirming that the temperatures of all sections of the transparent core optical fiber preform corresponding to the heaters 7a to 7e fall to the substitution temperature T5, the controller 90 holds the temperatures at this substitution temperature T5 for a predetermined time, and replaces a gas in the core furnace 2, and then reduces the temperatures of all sections of the transparent core optical fiber preform to the holding temperature T0, for example, about 900° C.

After reaching the holding temperature T0, the upper lid 3 is removed and the transparent core optical fiber is moved upward by the upward movement of the elevating shaft 4 and then taken out of the furnace tube 2.

12th Embodiment (Second Heat Treatment Method)

A second heat treatment method will be explained next as a 12th embodiment of the present invention.

FIGS. 14A to 14G are graphs for explaining a method of heat treatment of a porous optical fiber preform 1B in which a transparent core optical fiber preform 1C is used as the core and the porous layer 1D is not doped on its surface side (hereinafter this will be referred to as a "porous optical fiber preform with target 1B") as a second heat treatment method.

FIG. 14A shows the case before introducing the porous optical fiber preform with target.

Before introducing the porous optical fiber preform with target 1B into the furnace tube 2 of the heating furnace 8B, the controller 90 supplies power to the heaters 7a to 7e via the power supply 95 and heats the heaters 7a to 7e so that a predetermined section in the furnace tube 2 in which the porous optical fiber preform with target 1B is to be arranged becomes the holding temperature T0, for example, about 900° C. as shown in FIG. 14A. At this time, $N_2$ gas is fed from the lower gas feed bipe 9 into the furnace tube 2 and discharged from the upper exhaust pipe (gas discharge port) 10.

FIG. 14B shows the case of preheating before dehydration.

When suspending the porous optical fiber preform with target 1B in a predetermined section in the furnace tube 2 in such a preheating state, the controller 90 raises the temperatures of the heaters 7a to 7e and controls the temperatures of the heaters 7a to 7e so that the temperatures in the furnace tube 2 become the substantially a uniform dehydration preheating temperature T1 in the longitudinal direction of the porous optical fiber preform with target 1B as shown in FIG. 14B.

The controller 90 gradually changes the gas to be fed into the furnace tube 2 from $N_2$ gas to He gas and Cl gas and, further, according to the case, $O_2$ gas in predetermined amounts simultaneously with the change of the temperatures of the heaters 7a to 7e. During this period, the controller 90 receives as its input the detection value from for example the pressure meter 17a and the differential pressure meter 17b illustrated in FIG. 2 and controls the pressure in the core furnace 6B the pressure control valve 14 and the pressure control valve 16 so that the differential pressure between the pressure in the furnace tube 2 and the pressure in the furnace body 6B becomes constant.

FIGS. 14C and 4D show the case of dehydration.

After the gas in the furnace tube 2 is completely switched, the temperature of the heaters 7a to 7e reach the predetermined temperatures, and the temperatures in the furnace tube 2 corresponding to the heaters 7a to 7e reach the dehydration preheating temperature T1 along with this, the controller 90 raises the temperature of the heater 7c at the center and controls the temperature of the heater 7c so that the temperature in the furnace tube 2 corresponding to this heater 7c becomes the dehydration temperature T2 as shown in FIG. 14C. The rate of temperature rise at this time differs depending upon the size of the heaters 7a to 7e and the type of the porous optical fiber preform (with target or without target).

When the temperature in the furnace tube 2 corresponding to the heater 7a at the center reaches the dehydration temperature T2, the controller 90 raises the temperatures in the furnace tube 2 corresponding to the heaters 7d and 7b vertically adjoining to this heater 7c at the center, changes the temperature so that the temperatures in the furnace tube 2 corresponding to these heaters 7d and 7b becomes the required heat treatment temperature, that is, dehydration temperature T2, and, at the same time, lowers the temperature of the heater 7c at the center to return the temperature in the furnace tube 2 corresponding to this central heater 7c to the dehydration preheating temperature T1. Such switching of the temperature of the heaters 7a to 7e sequentially moves to both ends from the center as shown in FIG. 14D. The dehydration at the dehydration temperature T2 is carried out over the entire length of the porous optical fiber preform with target 1B.

When dehydrating the preform while gradually moving the position of the porous optical fiber preform with target 1B where the temperature changes to the dehydration temperature T2 from the center to the two ends in this way, the time required for the dehydration can be shortened to about half compared with the case where the porous optical fiber preform 1B is dehydrated while moving the position where the porous optical fiber preform with target 1B becomes the dehydration temperature T2 from one end to the other end in the longitudinal direction of the porous optical fiber preform 1B.

In such heat treatment by the controller 90 as well, it is important to perform the heating so that the rate of temperature rise becomes constant at all parts of the porous optical fiber preform with target 1B in the longitudinal direction when raising the temperature from the dehydration preheating temperature T1 to the required heat treatment temperature, that is, the dehydration temperature T2, in the longitudinal direction of the porous optical fiber preform with target 1B, since the dehydration temperature can be made higher than that of the case where the dehydration is carried out at a uniform temperature and therefore the efficiency of the dehydration can be raised.

Further, in such heat treatment by the controller 90 as well, preferably the heating is carried out so that the rate of temperature fall for reducing the temperatures of all parts of the porous optical fiber preform with target 1B in the longitudinal direction from the required heat treatment temperature, that is, dehydration temperature T2, to the dehydration preheating temperature T1 becomes constant at all parts of the porous optical fiber preform with target 1B in the longitudinal direction.

Also such temperature control becomes easy by measuring the temperature distribution in the furnace tube 2 by the temperature sensor and determining the power supply conditions etc. of the heaters 7a to 7e in the state where the porous optical fiber preform with target 1B is not in the furnace tube 2 in advance. Further, preferably, the power supply conditions of the heaters 7a to 7e by the controller 90, the temperature distribution in the furnace tube, and so on are finally determined by measuring in the longitudinal direction the distribution of the concentration of OH in the diametrical direction in the porous optical fiber preform with target 1B for which the dehydration ended.

FIG. 14E shows the case of preheating before the vitrification.

When the dehydration ends, the controller 90 suspends the supply of the chlorine gas to be fed to the furnace tube 2 and raises the temperatures of the heaters 7a to 7e so that the predetermined sections in the furnace tube 2 corresponding to these heaters 7a to 7e uniformly become the vitrification preheat temperature T3 as shown in FIG. 14E.

FIGS. 14F and 14G show the case of vitrification.

After the temperatures of the predetermined sections in the furnace tube 2 corresponding to the heaters 7a to 7e reach the vitrification preheating temperature T3, as shown in FIG. 14F, the controller 90 controls the temperature in the same way as the case of the dehydration and performs the vitrification with respect to the entire length of the porous optical fiber preform 1B while moving the position at which the porous optical fiber preform with target 1B becomes the vitrification temperature T4, higher than the vitrification preheating temperature T3, to the two ends in the longitudinal direction from the center of the porous optical fiber preform 1B as shown in FIG. 14G.

Even in such heat treatment, it is important to perform the heating so that the rate of temperature rise for raising the temperatures of the portions of the porous optical fiber preform with target 1B in the longitudinal direction from the vitrification preheating temperature T3 to the required heat treatment temperature, that is, the vitrification temperature T4, becomes constant at all portions of the porous optical fiber preform with target 1B in the longitudinal direction for preventing fluctuation of the outside diameter of the porous optical fiber preform with target 1B during the vitrification. Further, in such heat treatment, preferably the heating is carried out so that the rate of temperature fall for lowering the temperatures of all portions of the porous optical fiber preform with target 1B in the longitudinal direction from the required heat treatment temperature, that is, the vitrification temperature T4, to the vitrification preheating temperature T3 becomes constant at all parts of the porous optical fiber preform with target 1B in the longitudinal direction.

The controller 90 of the present embodiment performs this control.

If the temperatures can be raised to the vitrification temperature T4 in sections at the two ends of the porous optical fiber preform with target 1B by raising the temperature of the heaters 7e and 7a, the porous optical fiber preform with target 1B becomes a transparent core optical fiber preform over its entire length.

Thereafter, the controller 90 lowers the temperatures of all sections of the transparent core optical fiber preform to the substitution temperature T5 by reducing the temperatures of the heaters 7a to 7e. The controller 90 gradually replaces the gas to be fed into the furnace tube 2 from He gas (in some case, chlorine gas or the oxygen gas flowing together) to $N_2$ gas or Ar gas simultaneously with this temperature fall.

When the temperatures of all sections of the transparent core optical fiber preform corresponding to the heaters 7a to 7e fall to the substitution temperature T5, the controller 90 holds the temperatures at this substitution temperature T5 for a predetermined time and then reduces the temperatures of all sections of the transparent core optical fiber preform to the holding temperature T0 (for example 900° C.).

After the temperatures reach the holding temperature T0, the upper lid 3 is removed and the transparent core optical fiber preform is raised by the elevation of the elevating shaft 4 and taken out of the furnace tube 2.

Doping

In this second heat treatment method according to the 12th embodiment of the present invention, the doping for incorporating the dopant for changing the refractive index of the porous layer 1D on the surface of the porous optical fiber preform with target 1B can be carried out as follows. Note, the following description will be made on a second heat treatment, and, of course, the doping process can be applied to the first heat treatment.

Figures 15A, 15B, 15C:
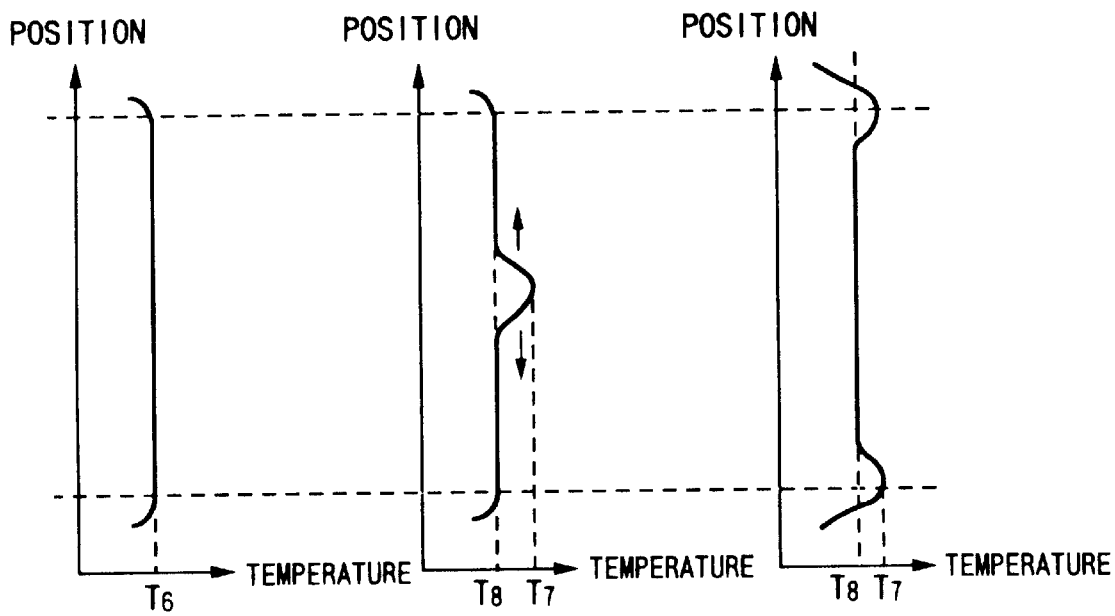
FIGS. 15A to 15C are graphs of the temperature distributions in the furnace tube at steps added when doping between the dehydration and the vitrification in the 11th and 12th embodiments of the present invention.

(1) First, an explanation will be made of the case of doping between the dehydration and the vitrification. In this case, the controller 90 performs the treatment as shown in FIGS. 14A to 14D. After the end of the dehydration, the controller 90 changes the temperature of the porous optical fiber preform with target 1B from the dehydration preheating temperature T1 to the doping temperature T6 as shown in FIG. 15A and holds the atmosphere in the furnace tube 2 to a gas containing He gas and the doping gas (for example $SiF_4$, $SF_6$) for a predetermined time to replace the gas in the porous layer 1D on the surface side with a gas containing the doping gas.

(2) Next, the controller 90 changes the surface temperature of the porous optical fiber preform with target 1B to the surface densifioation temperature T7. This surface densification treatment temperature T7 is set to a temperature whereby at least the surface layer portion of the porous layer 1D on the surface side becomes high in density. Note that, when the surface temperature of the porous optical fiber preform with target 1B is changed to the surface densification treatment temperature T7 by the controller 90, the controller 90 may set the entire surface of the porous optical fiber preform with target 1B at the surface densification treatment temperature T7. Alternatively, as shown in FIG. 15B, it is possible to change the temperature at the center of the porous optical fiber preform with target 1B in the longitudinal direction from a post surface densification temperature T8 between the doping temperature T6 and the surface densifioation treatment temperature T7 to the surface densification treatment temperature T7 and move the region becoming the surface densification treatment temperature T7 sequentially toward the two sides in the longitudinal direction as shown in FIG. 15C.

(3) After the doping ends, the controller 90 sets the temperature of the entire surface of the porous optical fiber preform with target 1B to the vitrification preheating temperature T3 and performs the vitrification.

(4) The rest of the heat treatment process is similar to that of the second heat treatment method explained above.

Simultaneous Doping and Vitrification

An explanation will be made next of the case of doping simultaneously with vitrification.

Figure 16:
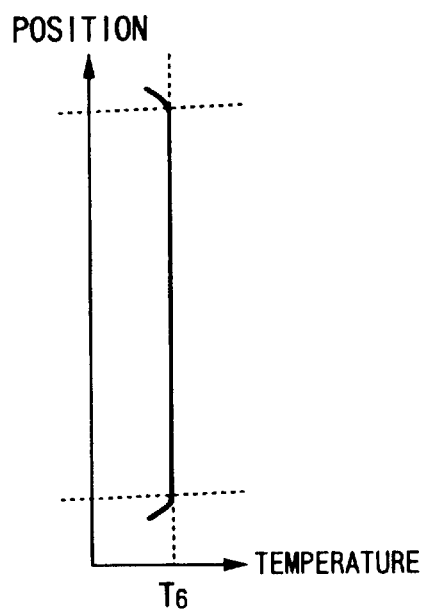
FIG. 16 is a graph of the temperature distribution in the furnace tube at a step added when doping simultaneously with the vitrification in the 11th and 12th embodiments of the present invention.

(1) In this case, after the dehydration ends, the controller 90 changes the temperature of the porous optical fiber preform with target 1B from the dehydration preheating temperature T1 to the doping temperature T6 as shown in FIG. 16 and holds the atmosphere in the furnace tube 2 to a gas containing He gas and dope gas (for example $SiF_4$ or $SF_6$) for a predetermined time to replace the gas in the porous layer 1D on the surface side to a gas containing a doping gas.

(2) Next, the controller 90 sets the surface temperature of the porous optical fiber preform with target 1B at the vitrification preheating temperature T3 and performs the vitrification.

(3) The rest of the process is similar to that of the above second heat treatment method.

Note that, where doping, the temperature at the vitrification tends to become slightly lower.

EXPERIMENTS

Below, the actual temperature conditions used in the first and second temperature treatment methods will be shown.

Table 1 shows the actual temperature conditions used in the first temperature treatment method.

TABLE 1

| Temperature type | Temperature |
| --- | --- |
| Dehydration preheating temperature T1 | |
| Porous optical fiber preform without target 1A | 1000° C. to 1200° C. |
| Porous optical fiber preform with target 1B | 1100° C. to 1250° C. |
| Dehydration temperature T2 | 1250° C. to 1300° C. |
| Porous optical fiber preform without target 1A | 1300° C. to 1350° C. |
| Porous optical fiber preform with target 1B | 300 to 500 mm/h |
| Rate of dehydration temperature rise - both porous optical fiber preforms | 1250° C./1300° C. |
| Vitrification preheat temperature T3 | |
| Porous optical fiber preform without target 1A | 1300° C./1350° C. |
| Porous optical fiber preform with target 1B | 1450° C./1600° C. |
| Vitrification temperature T4 - both porous optical fiber preforms | 270 to 400 mm/h |
| Rate of rise of vitrification temperature - both porous optical fiber preforms | 1250° C. to 1300° C. |
| Substitution temperature T5 - temperature at which preform does not stretch | |

When the porous optical fiber preform becomes large in size, the treatment temperature tends to be higher and the rate of temperature rise tends to be lower. Further, when the density of the porous optical fiber preform is high, a similar tendency is exhibited.

Table 2 shows the actual temperature conditions used in the second temperature control method.

TABLE 2

| Temperature type | Temperature |
| --- | --- |
| Doping temperature T6 | 900° C. to 1250° C. |
| Surface densification temperature T7 | 1000° C. to 1350° C. |
| Post surface densification temperature T8 | 900° C. to 1300° C. |

The experiment shows that by applying the present invention, the dehydration time and the vitrification time of the porous optical fiber preform with target 1A can be shortened by about 15 to 25 percent. There was substantially no fluctuation of the dopant contained in advance in the porous optical fiber preform in the longitudinal direction before the heat treatment, and there was no lowering of the quality of the vitrified optical fiber preform by application of the heating method of the present embodiment.

On the other hand, by applying the embodiments of the present invention, the dehydration time and the vitrification time of the porous optical fiber preform with target 1B can shortened by about 20 percent.

Combination of 11th Embodiment and 12th Embodiment

Further, the method of heat treatment from the center to the two ends of the porous optical fiber preform with target 1B shown in the second heat treatment method according the 12th embodiment of the present invention can be of course applied to the method of heat treatment of the porous optical fiber preform without target 1A shown in the first heat treatment method according to the 11th embodiment of the present invention.

Further, the method of heat treatment from one end to the other end of the porous optical fiber preform with target 1B shown in the first heat treatment method according to the 11th embodiment of the present invention can be of course applied to the method of heat treatment of the porous optical fiber preform without target 1A shown in the second heat treatment method according to the 12th embodiment.

Experiments of 11th and 12th Embodiments

Figure 17:
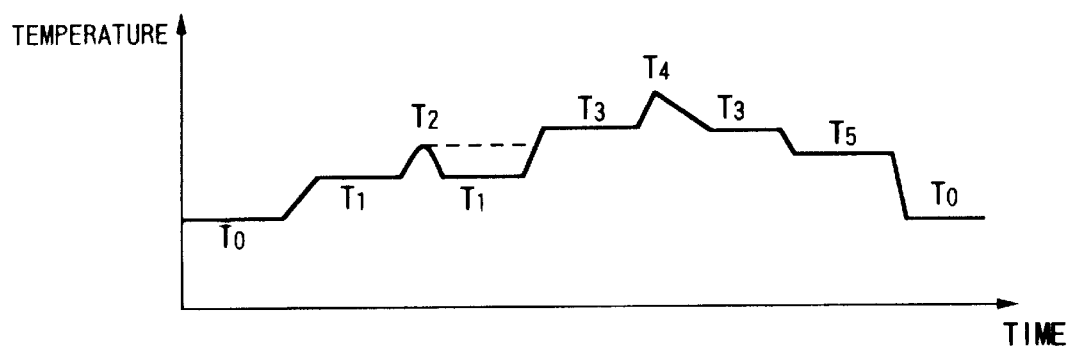
FIG. 17 is a view of the pattern of the heat hysteresis at a specific position in the longitudinal direction of the porous optical fiber preform when performing dehydration and vitrification in the embodiments of the present invention.

FIG. 17 is a graph of the pattern of heat hysteresis at a specific position of the porous optical fiber preform in the longitudinal direction resulting from the first and second heat treatment methods of these embodiments in the heat treatment of a dehydrated and vitrified porous optical fiber preform. Here, the temperatures are in the relationship of T0<T1, T1<T2, T3<T4, and T4>T5>0.

Figure 18A:
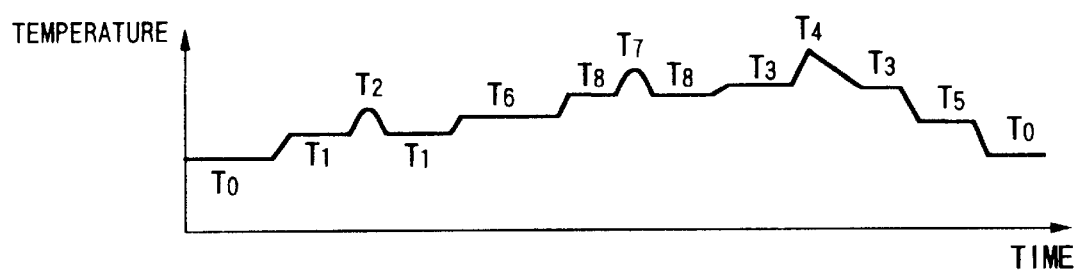
FIGS. 18A and 18B are views of the pattern of the heat hysteresis at a specific position in the longitudinal direction of the porous optical fiber preform when doping between the dehydration and the vitrification in the embodiments of the present invention.

FIG. 18A is a graph of the pattern of heat hysteresis at a specific position of the porous optical fiber preform in the longitudinal direction in the case of doping between the dehydration and vitrification.

Figure 18B:
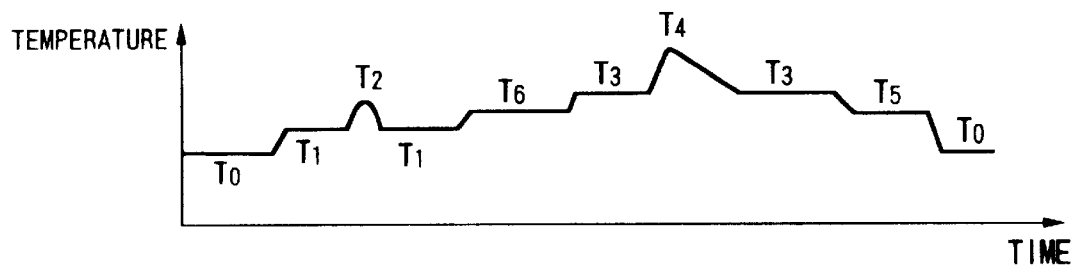

FIG. 18B is a graph of the pattern of heat hysteresis at a specific position of the porous optical fiber preform in the longitudinal direction in the case of doping simultaneously with the vitrification.

The temperature pattern shifted in the longitudinal direction at the time of the heat treatment described above, in the case of dehydration and doping, can be relatively freely selected, but considering the reproducibility of the temperature pattern etc., it is preferably symmetrical in the longitudinal direction about the highest temperature point as shown in FIG. 19A. In the case of vitrification, considering the prevention of air bubbles from remaining in the preform after the vitrification, it preferably is shaped with one end trailing backward against the forward direction from the highest temperature point as shown in FIG. 19B.

Note that, in FIG. 17 and FIGS. 18A and 18B, the heat treatment temperature pattern is shifted once for each of the dehydration, doping, and vitrification, but the heat treatment temperature pattern may be shifted several times. The shifts may be set according to need.

13th Embodiment

A method of heat treatment of a porous optical fiber preform using the porous optical fiber preform dehydration and vitrification apparatus illustrated in FIG. 20 and an apparatus for this will be explained as a 13th embodiment of the present invention.

FIG. 20 is a view of the configuration of a dehydration and vitrification apparatus (heating apparatus) for working the method of heat treatment of a porous optical fiber preform as another embodiment of the present invention.

The structure of the heating furnace 8B in the porous optical fiber preform dehydration and vitrification apparatus illustrated in FIG. 20 is similar to the structure of the heating furnace 8B in the dehydration and vitrification apparatus illustrated in FIG. 12.

In the dehydration and vitrification apparatus illustrated in FIG. 20, the same reference numerals are assigned to parts corresponding to those of the dehydration and vitrification apparatus illustrated in FIG. 12.

In the dehydration and vitrification apparatus (heating apparatus) illustrated in FIG. 20, the elevating mechanism 120 provided in the upper portion of the upper lid 3 is illustrated. The elevating mechanism 120 elevates and lowers the elevating shaft 4 and elevates and lowers the porous optical fiber preform 1A grasped by the preform holder 5 in the furnace tube 2. The elevating mechanism 120 has the motor 115, horizontally oriented elevating horizontal arm 114, threaded hole 116, bearing 118, vertically oriented elevating drive shaft 117, and motor 119.

Further, the heating furnace 8B illustrated in FIG. 20 is constituted by a plurality of heaters (multiheater 7) arranged around the outer circumference of the furnace tube 2, e.g., four heaters 7a to 7e in the illustrated example, partitions 121 for partitioning these adjoining heaters, and the heat insulating material 26 surrounding the multiheater 7 and the partitions 121.

The controller 90 is provided in order to control the temperature and control the gas feed and discharge of such a multiheater 7. The controller 90 is similar to that explained above by referring to FIG. 12.

In the elevating mechanism 120, the top end of the vertically oriented elevating shaft 4 is rotatably supported on one end of the horizontally oriented elevating horizontal arm 114 while penetrating through the elevating horizontal arm 114. On the top face of the elevating horizontal arm 114 is mounted the motor 115 which rotates the porous optical fiber preform 1A around its axis by rotating the elevating shaft 4. In the threaded hole 116 on the other end of the elevating horizontal arm 114, the vertically oriented elevating drive shaft 117 is penetrated by a screw connection. This elevating drive shaft 117 is rotatably supported a not illustrated support by the bearing 118 and driven to rotate by the motor 119 supported at the not illustrated support. The elevating mechanism 120 of the porous optical fiber preform 1 is constituted by these elevating horizontal arm 114, motor 115, threaded hole 116, elevating drive shaft 117, bearing 118, and motor 119.

In the heating furnace 8B, the heaters 7a to 7d serving as the heat sources arranged around the outer circumference of the furnace tube 2 at predetermined intervals in its longitudinal direction are divided so that a preheating zone is comprised by the uppermost heater 7d, a heat treatment zone is comprised by the center heaters 7b and 7c, and a post-treatment zone is comprised by the lowermost stage heater 7a. Partitions 121 for preventing a mutual influence of heat are arranged between the adjoining heaters.

14th Embodiment

Figure 21:
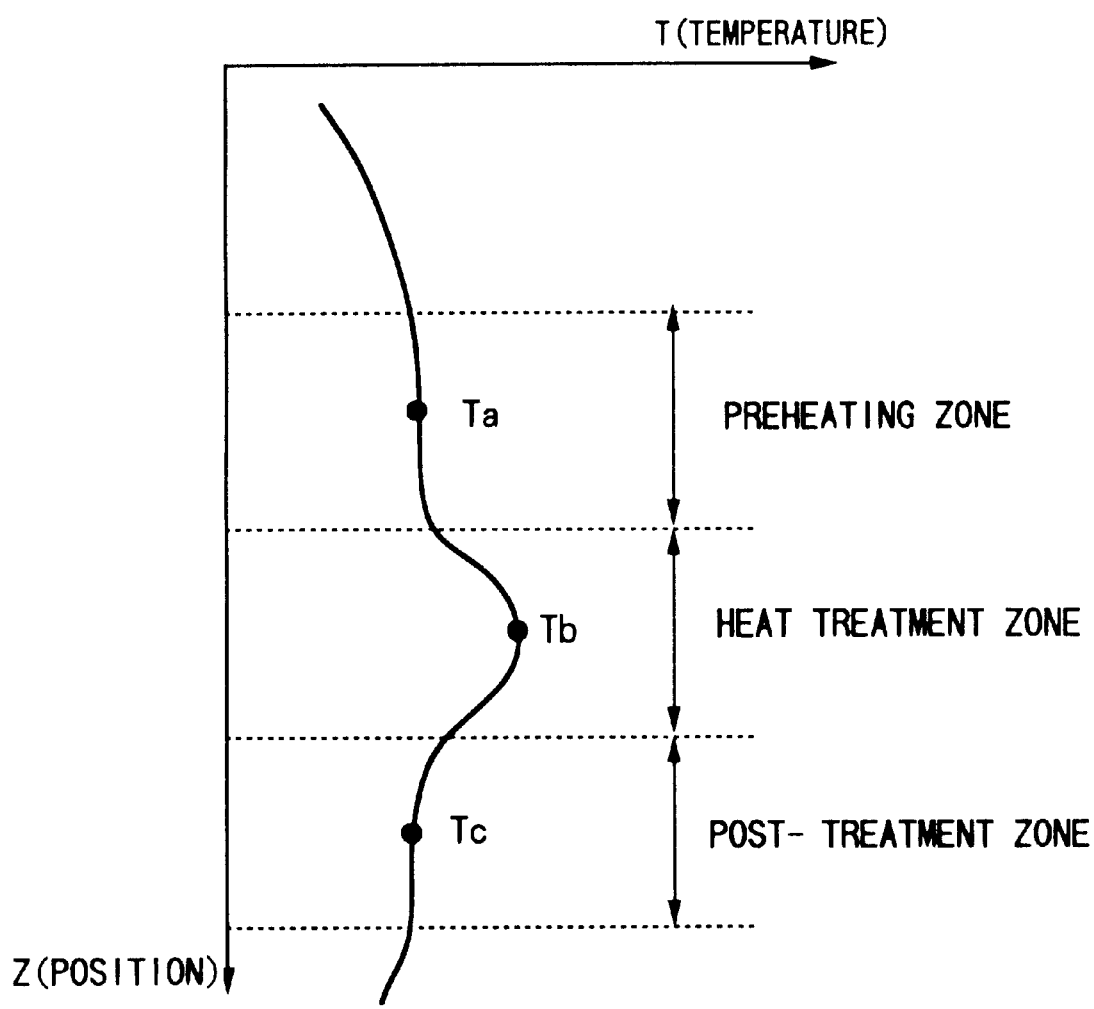
FIG. 21 is a graph of the temperature distribution in the furnace tube in the heating furnace illustrated in FIG. 20.

As a 14th embodiment of the present invention, a method of heat treatment of a porous optical fiber preform without target 1A using a porous optical fiber preform heating furnace 8B of a multiheater type using a plurality of heaters 7a to 7d illustrated in FIG. 20 will be explained by referring to FIG. 21 showing the temperature distribution of the preheating zone, heat treatment zone, and post-treatment zone in the heating furnace 81.

In the 11th and 12th embodiments, the heat treatment was carried out by rotating the porous optical fiber preform around its axis in the state with the porous optical fiber preform fixed so as not to move in its axial direction, but in the present embodiment, the heat treatment is carried out while moving the porous optical fiber preform without target 1A in its axial direction using the elevating mechanism 120 while rotating the porous optical fiber preform without target 1A around its axis.

As illustrated in FIG. 21, the controller 90 controls the temperatures of the heaters 7a to 7d so that the interior of the furnace tube 2 corresponding to the heaters 7a to 7d exhibits a temperature distribution of a preheating zone, heat treatment zone, and post-heat treatment zone. The heaters 7a to 7d are controlled by the controller 90 by detecting the temperatures of the heaters 7a to 7d by a temperature sensor such as a radiant heat thermometer or a thermocouple in the same way as the 11th and 12th embodiments. The controller 90 stores in advance the temperatures of the heaters 7a to 7d for making the temperatures in the furnace tube 2 predetermined temperatures.

Specifically, the elevating mechanism 120 is used to insert the porous optical fiber preform without target 1A into the furnace tube 2 as shown in FIG. 20 and top the porous optical fiber preform 1A is at a position where the bottom end of the porous optical fiber preform 1A is a little above the uppermost preheating zone. The gas in the furnace tube 2 is replaced with He gas under the control of the controller 90, then the controller 90 raises the temperatures of the heaters 7a to 7d of the zones to the predetermined temperatures to form the temperature distribution for the dehydration as shown in FIG. 21 in the furnace tube 2. In this case, the temperature of the preheating zone is defined as Ta, the temperature of the heat treatment zone is defined as Tb, and the temperature of the post-treatment zone is defined as Tc.

When the temperature distribution shown in FIG. 21 is obtained in the furnace tube 2, the controller 90 changes the gas to be fed into the furnace tube 2 to the gas for the dehydration.

In such a state, the porous optical fiber preform 1A starts to move downward (is pulled down) in the furnace tube 2 at a constant speed by the drive of the elevating mechanism 120.

Due to the downward movement of this porous optical fiber preform 1A, portions of the porous optical fiber preform 1A first enter the preheating zone and are preheated at the temperature Ta, then enter the heat treatment zone and are heat treated at the temperature Tb, then enter the post-treatment zone and are treatment at the temperature Tc.

When the top end of the porous optical fiber preform 1A finishes being heat treated in this way, the controller 90 lowers the temperatures of the zones to the temperature Tc of the post-treatment zone as a whole and, at the same time, switches the gas to be fed into the furnace tube 2 to only He gas. The gas feed control by this controller 90 to similar to that of the above embodiments.

After the switching of the gas, the porous optical fiber preform 1A is pulled up and stopped at the position at which the dehydration was started.

In such a state, due to the temperature control of the heaters 7a to 7d by the controller 90, the preheating zone, heat treatment zone, and post-treatment zone in the furnace tube 2 are set to the temperature distribution for the vitrification and, at the same time, the gas to be fed into the furnace tube 2 is changed to the gas for vitrification.

In such a state, the porous optical fiber preform 1A starts to move downward (is pulled down) in the furnace tube 2 at a constant speed by the drive of the elevating mechanism 120.

Due to the downward movement of this porous optical fiber preform 1A, portions of the porous optical fiber preform 1A first enter the preheating zone and are preheated, then enter the heat treatment zone and are heat treated, then enter the post-treatment zone and are treated.

When the top end of the porous optical fiber preform 1A finishes being heat treated, the gas to be fed into the furnace tube 2 is switched to only He gas. After the switching of the gas, the elevating mechanism 120 is operated and the optical fiber preform is pulled up from the furnace tube 2.

In the above example of the present embodiment, heat treatment of a porous optical fiber preform without target 1A was explained, but a porous optical fiber preform with target 1B can be similarly heat treated using the elevating mechanism 120 and the controller 90.

In this way, by using the elevating mechanism 120, even if the porous optical fiber preform is moved in its axial direction, the time can be shortened to a heat treatment time substantially the same as that of the previously explained case where the porous optical fiber preform was not moved in its axial direction.

In the porous optical fiber preform dehydration and vitrification apparatus illustrated in FIG. 20, the heating furnace 8B can be made smaller in size and the capital costs can be reduced.

When performing dehydration at the dehydration and vitrification apparatus (heating furnace 8B) illustrated in FIG. 20, by setting the temperature Tc of the post-treatment zone the same as or near the temperature of the heat treatment zone Tb, the dehydration time can be further shortened. In this case, when the temperature Tc of the post-treatment zone is too high, the dehydration sometimes becomes uneven in the longitudinal direction of the porous optical fiber preform.

Further, in the case of vitrification, preferably the temperature Tc of the post-treatment zone is set at an intermediate temperature between the temperature Ta of the preheating zone and the temperature Tb of the heat treatment zone or a temperature higher than this. By setting the temperature Tc in this way, the vitrification time can be shortened, but when the temperature of the post-treatment zone is too high, there is a worry of stretching of the optical fiber preform.

Note that when doping at the dehydration and vitrification apparatus illustrated in FIG. 20, preferably temperature conditions substantially the same as the heat treatment conditions in the 11th and 12th embodiments are set.

Experiment

Table 3 shows the temperature conditions of an experiment according to the 13th embodiment in the case of dehydration (single-mode fiber).

TABLE 3

| Temperature type | Temperature |
| --- | --- |
| Preheating zone Ta (zone center) | 1200° C. to 1250° C. |
| Heat treatment zone temperature Tb (highest temperature) | 1300° C. to 1350° C. |
| Post-treatment zone temperature Tc (zone center) | 1250° C. to 1300° C. |
| Case of vitrification (single mode fiber) | |
| Preheating zone temperature Ta (zone center) | 1300° C. to 1350° C. |
| Heat treatment zone temperature Tb (highest temperature) | 1500° C. to 1600° C. |
| Post-treatment zone temperature Tc (zone center) | 1400° C. to 1480° C. |

Table 3 shows the temperature conditions of an experiment according to the 13th embodiment in the case of doping.

TABLE 4

| Temperature type | Temperature |
| --- | --- |
| Doping temperature Ta | 900° C. to 1250° C. |
| Surface densification temperature Tb | 1000° C. to 1350° C. |
| Post surface densification temperature Tc | 950° C. to 1300° C. |

Note that while the explanation was made with reference to the case of the dehydration and vitrification apparatus illustrated in FIG. 20 in which the heater 7 was a multiheater type, it is also possible to constitute this heater by a single heater giving the required temperature distribution in the longitudinal direction.

According to the method of heat treatment of porous optical fiber preform according to the second aspect of the present invention and the dehydration and vitrification apparatus (heating apparatus) for this, since the entire porous optical fiber preform is preheated up to a predetermined preheat temperature lower than the required heat treatment temperature in advance before the required heat treatment on the porous optical fiber preform, the time for the heat treatment over the entire length of the porous optical fiber preform by raising the porous optical fiber preform up to the predetermined heat treatment temperature can b e shortened.

Further, according to the second aspect of the present invention, since the required heat treatment with respect to the porous optical fiber preform is carried out while moving the position at which the porous optical fiber preform becomes the predetermined heat treatment temperature in the longitudinal direction of the porous optical fiber preform, the required heat treatment can be carried out at a substantially uniform temperature over the entire length of the porous optical fiber preform and the distribution of the refractive index of the porous optic al fiber preform can be made substantially uniform in the longitudinal direction of the porous optical fiber preform.

In the heat treatment in the second aspect of the present invention, when doping, the porous optical fiber preform is preheated, therefore the concentration of the dopant in the diametrical direction can be made substantially uniform. Further, the temperature hysteresis at the heat treatment of the porous optical fiber preform can be made substantially uniform in the longitudinal direction, therefore the concentration of the dopant in the longitudinal direction can be made substantially uniform.

Dehydration and Vitrification Apparatus of Third Aspect of Present Invention

A porous optical fiber preform dehydration and vitrification apparatus with a reinforced structure of the furnace tube will be explained as a third aspect of the present invention by referring to FIG. 22 to FIG. 27.

Figure 22:
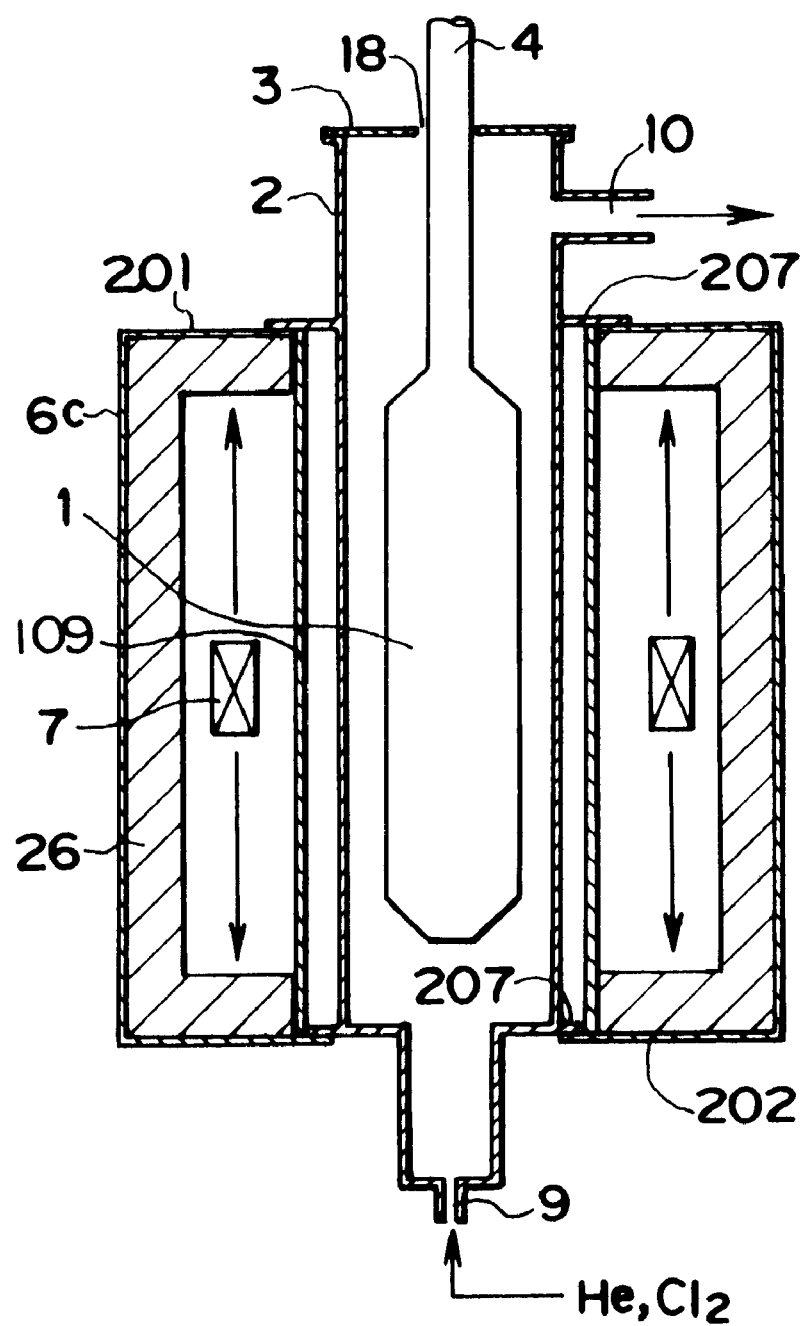
FIG. 22 is a vertical sectional view of a porous optical fiber preform dehydration and vitrification apparatus provided with one heater according to a 14th embodiment of the present invention.
Figure 23:
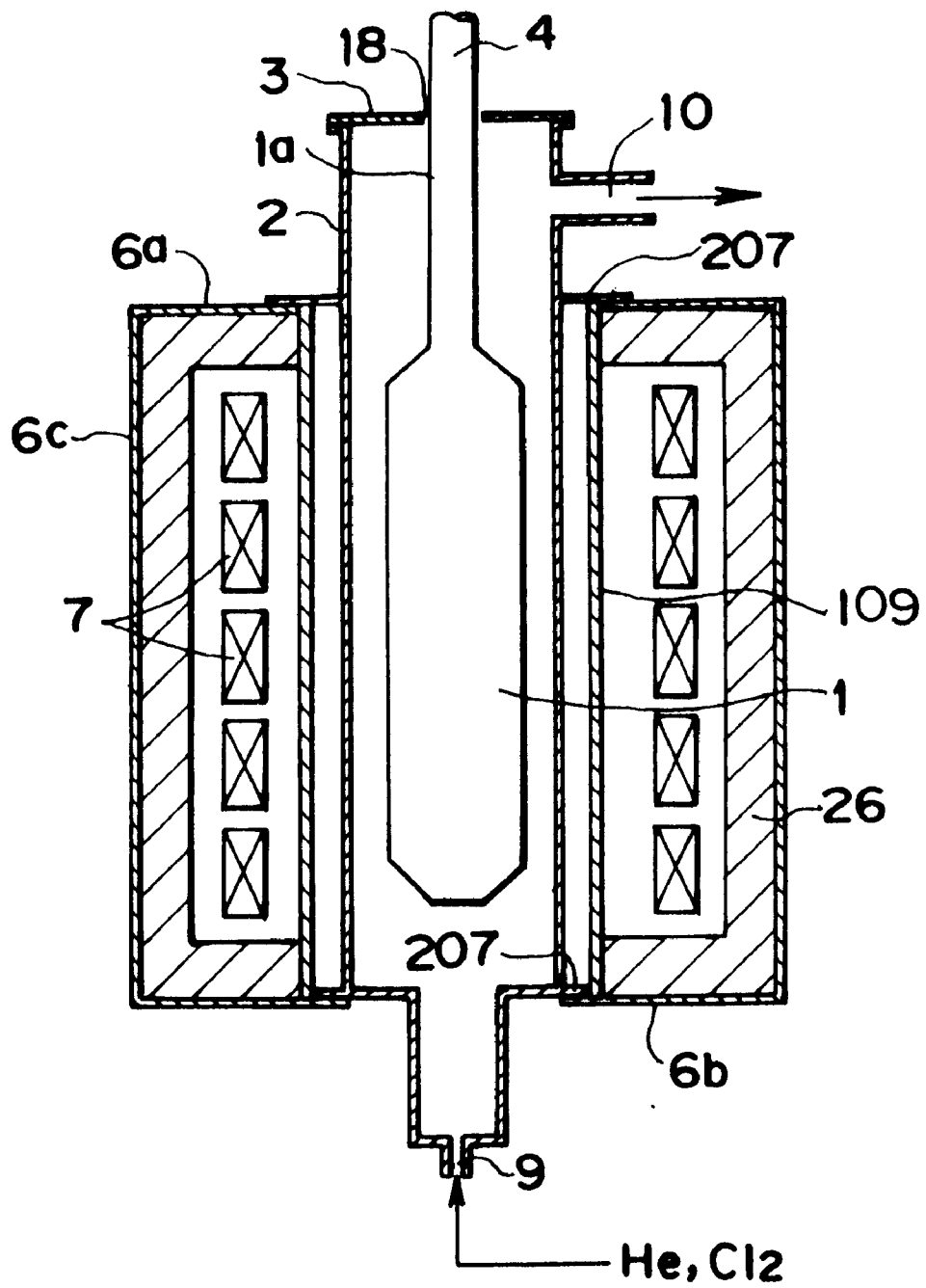
FIG. 23 is a vertical sectional view of a porous optical fiber preform dehydration and vitrification apparatus provided with a plurality of heaters according to another aspect of the present invention.

FIG. 22 and FIG. 23 are views illustrating the structure of a porous optical fiber preform dehydration and vitrification apparatus (dehydration and vitrification apparatus or heating furnace for dehydration and firing) for dehydrating, firing, and vitrifying an porous optical fiber preform.

The dehydration and vitrification apparatus of FIG. 22 is mainly constituted by a furnace body 6C, a furnace tube 2 made of quartz glass or the like which penetrates through the center of the furnace body 6C and accommodates the porous optical fiber preform 1, a heater 7 such as an electric heater which is arranged around the periphery of the furnace tube 2 in the furnace body 6C and heats the porous optical fiber preform 1 in the furnace tube 2, muffle pipe 109 arranged so as to surround the outer circumference of the furnace tube 2 between the furnace tube 2 and the heater 7, and a heat insulating material 26 arranged along the inner wall of the furnace body 6C outside of this muffle pipe 109.

FIG. 22 shows an example in which the dehydration and vitrification apparatus has one heater 7. FIG. 23 shows an example in which the dehydration and vitrification apparatus is provided with a plurality of, i.e., in this example, five heaters 7.

The furnace tube 2 is supported at the furnace body 6C by an annular flange (engagement portion) 207 made of quartz integrally formed at the outer circumference of the upper portion of the furnace tube 2 being placed on the top face 6a of the furnace body 6C and by an annular flange 207 made of quartz integrally formed at the outer circumference of the lower portion of the furnace tube 2 being placed on the bottom face 6b of the furnace body 6C. The top end of the furnace tube 2 is closed by the upper lid 3. This upper lid 3 is formed with a clearance 18 for passing the starting rod 1a of the porous optical fiber preform 1.

The porous optical fiber preform 1 is introduced into the furnace tube 2 by for example the elevating mechanism 120 illustrated in FIG. 20.

The gas feed pipe 9 is provided at t e bottom end of the furnace tube 2. Helium gas (He) or chlorine gas (Cl$_2$) etc. is fed into the furnace tube 2. The upper portion of the furnace tube 2 is provided with the gas discharge port 10 for discharging the exhaust in the furnace tube 2. Inert gas such as argon gas (Ar) or nitrogen gas (N$_2$) is fed into the furnace body 6C.

Where temperature-controlled dehydration and firing of the porous optical fiber preform 1 is carried out by using a dehydration and vitrification apparatus having such a structure, if only one heater shown in FIG. 22 is provided, the dehydration and the firing are carried out by moving the heater 7 in the vertical direction in the furnace body 6C or moving the porous optical fiber preform 1 in the vertical direction relative to the fixed heater 7 by operating for example the elevating mechanism 120 illustrated in FIG. 20. Further, when the temperature is controlled by using the dehydration and vitrification apparatus provided with a plurality of heaters 7 shown in FIG. 23, as explained above by referring to FIG. 12 to FIG. 21, the dehydration and the firing can be carried out by changing the amount of power supplied to the heaters 7 from the power supply 95 by the controller 90 and moving the heating zones formed by the heaters 7 in the vertical direction.

As mentioned at the start, along with the increase in demand for optical fiber in recent years, the porous optical fiber preforms 1 for optical fibers have become larger, that is, they have become larger in diameter and longer in length. In order to heat such a large porous optical fiber preform to and dehydrate and vitrify (sinter) it, a large-sized heating furnace becomes necessary. However, when dehydrating and firing a large porous optical fiber preform, since a furnace tube 2 made of quartz would be heated to 1500° C. or more over a wide range, there is a possibility that the furnace tube 2 would become soft and the furnace tube 2 would buckle and deform due to its own weight.

The third aspect of the present invention provides a porous optical fiber preform dehydration and vitrification apparatus capable of preventing buckling and deformation of the furnace tube at the time of high temperature heating due to its own weight.

Further, the third aspect of the present invention provides a porous optical fiber preform dehydration and vitrification apparatus capable of preventing buckling and deformation of the furnace tube at the time of high temperature heating due to its own weight by utilizing muffle pipes.

15th Embodiment

FIGS. 24A and 24B are views illustrating the structure of a porous optical fiber preform dehydration and vitrification apparatus according to a 15th embodiment of the present invention. FIG. 24A is a vertical sectional view of the dehydration and vitrification apparatus, and FIG. 24B is a perspective view of the structure of the furnace tube weight distributing means applied to the dehydration and vitrification apparatus.

The dehydration and vitrification apparatus illustrated in FIGS. 24A and 24B has a furnace tube 2 for accommodating the porous optical fiber preform 1. The dehydration and vitrification apparatus further has a furnace body 6C having muffle pipes 205 arranged around the periphery of the furnace tube 2, a muliheater 7 arranged around the outer circumference of muffle pipe 205, and a heat insulating material 26 surrounding the outside thereof. The furnace tube 2 penetrates through the center of the furnace body 6C and accommodates the porous optical fiber preform 1 inside it.

The furnace tube 2 is supported at the furnace body 6C by an annular flange (engagement portion) 207 made of quartz integrally formed around the outer circumference of the upper portion of the furnace tube 2 being placed on the top face 6a of the furnace body 6C and an annular flange 207 made of quartz integrally formed around the outer circumference of the lower portion of the furnace tube 2 being placed on the bottom face 6b of the furnace body 6C.

The top end of the furnace tube 2 is closed by the upper lid 3. This upper lid 3 is formed with a clearance 8 for passage of the starting rod 1a of the porous optical fiber preform 1.

The porous optical fiber preform 1 is introduced into the furnace tube 2 by for example the elevating mechanism 120 illustrated in FIG. 20.

The gas feed pipe 9 is provided at the bottom end of the furnace tube 2. Helium gas (He) or chlorine gas ($Cl_2$) etc. is fed into the furnace tube 2. The upper portion of the furnace tube 2 is provided with the gas discharge port 10 for discharging the exhaust in the furnace tube 2. Inert gas such as argon gas (Ar) or nitrogen gas ($N_2$) is fed into the furnace body 6C.

The dehydration and vitrification apparatus of the present embodiment is provided around the outer circumference of the quartz furnace tube 2 with a furnace tube weight distributing means 213 for distributing the weight of the furnace tube 2 per se in it longitudinal direction. The furnace tube weight distributing means 213 is made by a material having heat resistance and a high mechanical strength, for example, fiber-reinforced carbon.

The furnace tube weight distributing means 213 is constituted by a plurality of quartz flanges 207 annularly formed around the outer circumference of the intermediate portion of the furnace tube 2 at predetermined intervals in the longitudinal direction and a furnace tube weight receiving means 214 supporting the flanges 207 around the outer circumference of the furnace tube 2.

In the present embodiment, the furnace tube weight receiving means 214 is constituted by a short length muffle pipe 205 interposed between the vertically adjoining flanges 207 around the outer circumference of the furnace tube 2 for distributing the weight of the furnace tube 2 acting upon the upper flange 207.

The short length muffle pipes 205 are set to lengths between the vertically adjoining flanges 207 and are divided in structure by slits 205a provided along the longitudinal direction for facilitating the mounting. The muffle pipes 205 are comprised by a material having a heat resistance and a high mechanical strength, for example, fiber-reinforced carbon.

In this way, when the furnace tube weight distributing means 213 for distributing the weight of the furnace tube 2 in its longitudinal direction is provided around the outer circumference of the furnace tube 2, the weight of the furnace tube 2 is distributed to a plurality of positions in the longitudinal direction of the furnace tube 2, so buckling and deformation of the furnace tube 2 at the time of high temperature heating due to its own weight can be prevented.

Further, when the furnace tube weight distributing means 213 is constituted by a plurality of flanges 207 formed around the outer circumference of the furnace tube 2 at predetermined intervals in the longitudinal direction and the furnace tube weight receiving means 214 for supporting the flanges 207 around the Outer circumference of the furnace tube 2, the weight of the furnace tube 2 can be easily distributed to a plurality of positions in the longitudinal direction.

The furnace tube weight receiving means 214 may also be constituted by one muffle pipe 205 interposed between vertically adjoining flanges 207 around the outer circumference of the furnace tube 2 for distributing the weight of the furnace tube 2 acting upon the upper flange 207 as in the present embodiment.

16th Embodiment

FIGS. 25A and 25B are views of the structure of a porous optical fiber preform dehydration and vitrification apparatus according to a 16th embodiment of the present invention, in which FIG. 25A is a vertical sectional view of the dehydration and vitrification apparatus, and FIG. 25B is a perspective view showing the structure of the furnace tube weight distributing means applied to the dehydration and vitrification apparatus.

The structure of the dehydration and vitrification apparatus of the present embodiment basically resembles the dehydration and vitrification apparatus illustrated in FIGS. 24A and 24B.

In the dehydration and vitrification apparatus illustrated in FIGS. 25A and 25B, in the same way as the dehydration and vitrification apparatus illustrated in FIGS. 24A and 24B, the furnace tube weigh distributing means 213 for distributing the weight of the furnace tube 2 in its longitudinal direction is provided around the outer circumference of the quartz furnace tube 2. This furnace tube weight distributing means 213 is constituted by a plurality of quartz flanges 207 annularly formed around the outer circumference at an intermediate portion of the furnace tube 2 at predetermined intervals in the longitudinal direction of the furnace tube 2 and by the furnace tube weight receiving means 214 for supporting the flanges 207 around the outer circumference of the furnace tube 2.

Note that in the dehydration and vitrification apparatus of the present embodiment, the furnace tube weight receiving means 214 is constituted by muffle pipes 109 arranged along the outer circumference of the furnace tube 2 and by a plurality of supports 215 for supporting the flanges 207 provided in the muffle pipes 109 corresponding to the flanges 207 of the furnace tube 2.

The muffle pipes 109 are comprised by carbon fiber-reinforced carbon. In order to provide the supports 215 at predetermined intervals in the longitudinal direction at the inner circumference of the muffle pipes 109 having the required length, in the present example, the short length muffle pipes 109 are alternately connected via the supports 215.

When the furnace tube weight receiving means 214 is constituted in this way, the furnace tube weight receiving means 214 can be constituted by utilizing the muffle pipes 109 provided with the supports 215 at predetermined intervals in the longitudinal direction.

17th Embodiment

Figure 26:
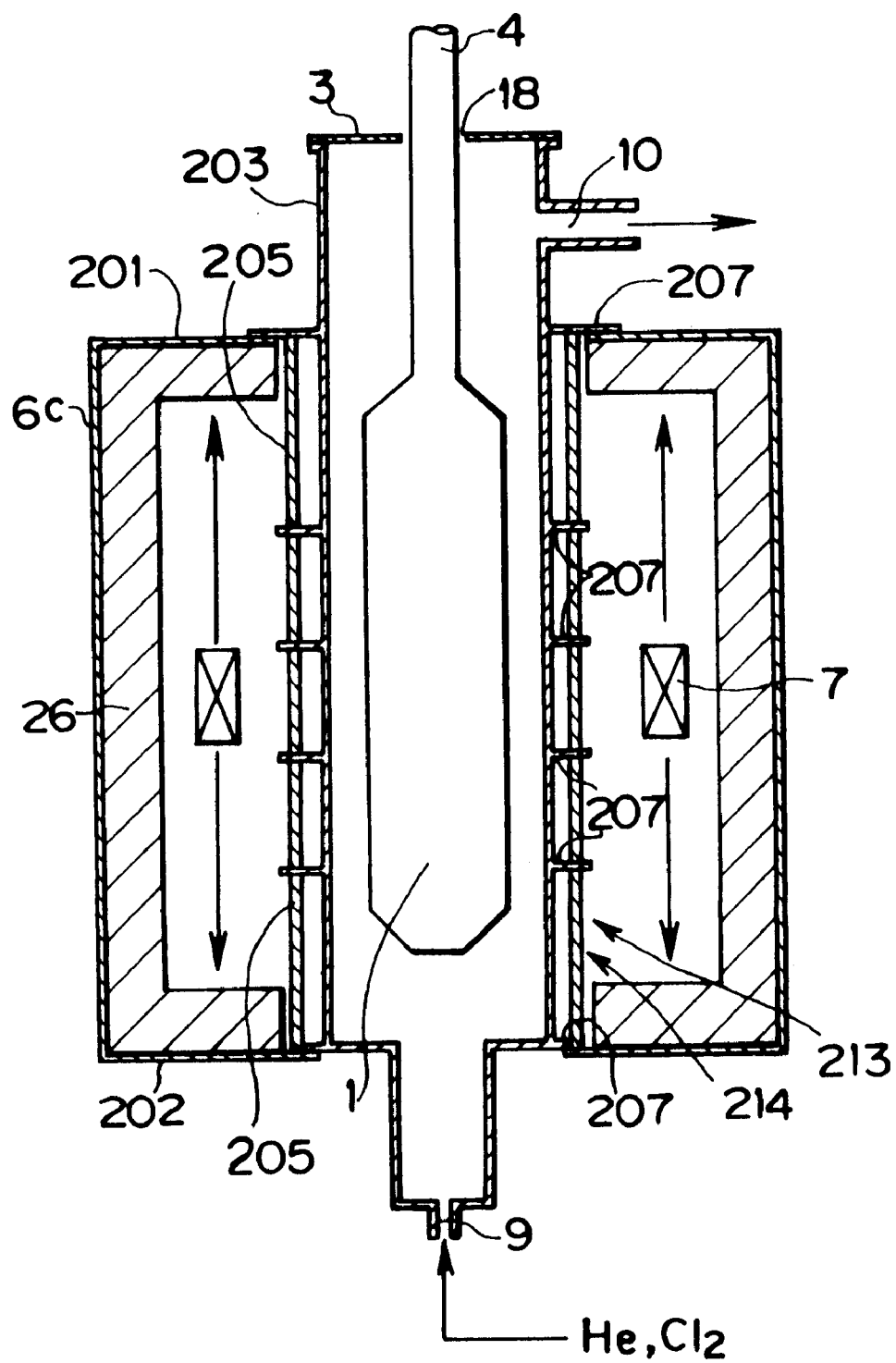
FIG. 26 is a vertical sectional view of a porous optical fiber preform dehydration and vitrification apparatus according to a 17th embodiment of the present invention.

FIG. 26 is a vertical sectional end view of the configuration of a porous optical fiber preform dehydration and vitrification apparatus according to a 17th embodiment of the present invention.

The dehydration and vitrification apparatus of the present embodiment is a dehydration and vitrification apparatus obtained by applying the furnace tube weight distributing means 213 and the furnace tube weight receiving means 214 to the dehydration and vitrification apparatus having one heater shown in FIG. 22.

In contrast with the dehydration and vitrification apparatus shown in FIGS. 24A and 24B, which is a dehydration and vitrification apparatus having a plurality of heaters 7, the present embodiment differs in the point that the dehydration and vitrification apparatus has one heater 7, but the rest of the configuration, particularly the configuration of the furnace tube weight distributing means 213, is the same as that shown in FIGS. 24A and 24B.

Accordingly, in the present embodiment is well, the effects by providing the furnace tube weight distributing means 213 are similar to those by the dehydration and vitrification apparatus explained by referring to FIGS. 24A and 24B.

18th Embodiment

Figure 27A:
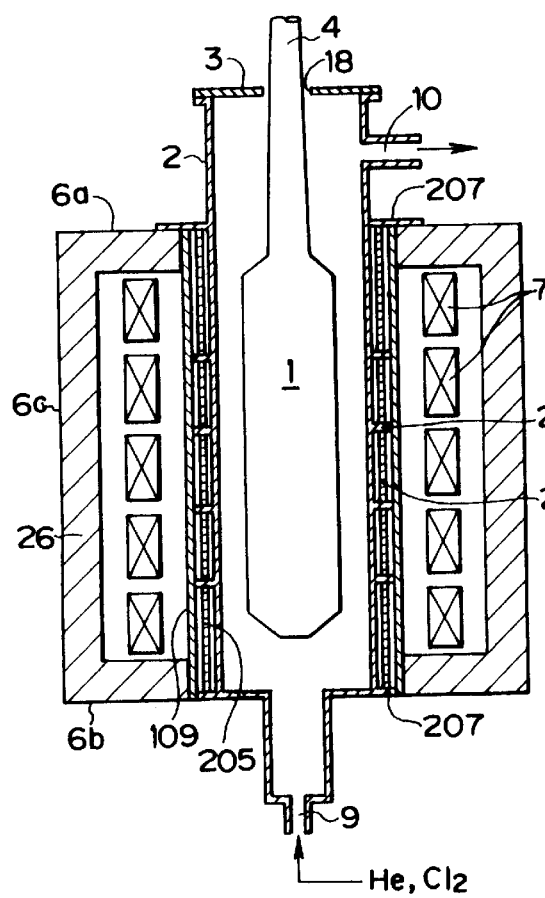
FIG. 27A is a vertical sectional view of a porous optical fiber preform dehydration and vitrification apparatus according to a 17th embodiment of the present invention.
Figure 27B:
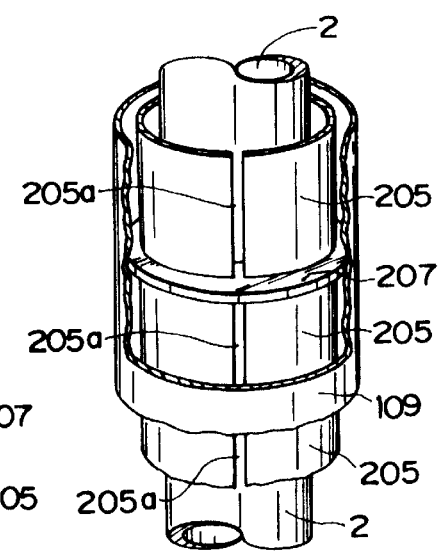
FIG. 27B is a perspective view of a furnace tube weight distributing means used in the porous optical fiber preform dehydration and vitrification apparatus illustrated in FIG. 27A.
Figure 27C:
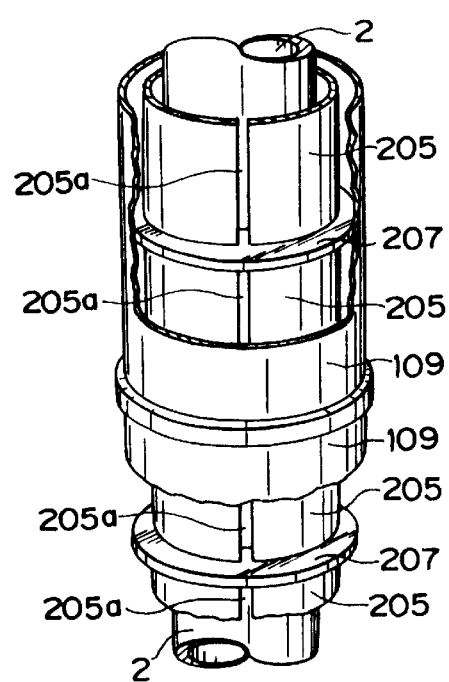
FIG. 27C is a perspective view of a furnace tube weight distributing means used in the porous optical fiber preform dehydration and vitrification apparatus illustrated in FIG. 27A, wherein the second muffle pipe has more than two portions.

FIGS. 27A to 27C are vertical sectional end views of the configuration of a porous optical fiber preform dehydration and vitrification apparatus chording to a 18th embodiment of the present invention, in which FIG. 27A is a vertical sectional view of a dehydration and vitrification apparatus, FIGS. 27B and 27C are perspective views of the configuration of a furnace tube weight distributing means used in a dehydration and vitrification apparatus.

The structure of the dehydration and vitrification apparatus of the present embodiment basically resembles the dehydration and vitrification apparatus illustrated in FIGS. 24A and 24B.

In the dehydration and vitrification apparatus illustrated in FIGS. 27A to 27C, in the same way as the dehydration and vitrification apparatus illustrated in FIGS. 24A and 24B, the furnace tube weight distributing means 213 for distributing the weight of the furnace tube 2 in its longitudinal direction is provided around the outer circumference of the quartz furnace tube 2. This furnace tube weight distributing means 213 is constituted by a plurality of quartz flanges 207 annularly formed around the outer circumference at an intermediate portion of the furnace tube 2 at predetermined intervals in the longitudinal direction of the furnace tube 2 and by the furnace tube weight receiving means 214 for supporting the flanges 207 around the outer circumference of the furnace tube 2.

Note that the furnace tube weight receiving means 214 is constituted by first muffle pipes 205 arranged along the outer circumference of the furnace tube 2 between vertically adjoining flanges 207.

Further, in the present embodiment, a second muffle pipe 109 arranged along the outer circumference of the furnace tube 2 and the first muffle pipe 205.

The first muffle pipe 205 and the second muffle pipe 109 are arranged so that the temperature in the furnace tube 2 becomes a predetermined distribution but the first muffle pipe 205 and the muffle pipe 119 are free from the thicknesses or other parameters within the condition where they can support the weighs of the furnace tube 2.

Usually, the use is made where the inner pressure of the furnace tube 2 is higher than the external pressure of the furnace tube 2, as a result, upon a high temperature, the furnace tube 2 is expanded to the outside. However, as the second muffle pipe 109 is positioned along the outer circumference of the furnace tube 2 and the first muffle pipe 205, the falling of the first muffle pipe 205 when the furnace tube 2 is expanded. Further, the contact between the first muffle pipe 205 and the second muffle pipe 109 shares the weight of the furnace tube 2, and the prevention of the bend and deformation of the furnace tube 2 can effectively be achieved.

In the porous optical fiber preform dehydration and vitrification apparatus according to the third aspect of the present invention, the furnace tube weight distributing means for distributing the weight of the furnace tube in its longitudinal direction s provided around the outer circumference of the furnace tube, therefore the weight of the furnace tube is distributed to a plurality of positions in the longitudinal direction of the furnace tube, so buckling and deformation of the furnace tube at the time of high temperature heating due to its own weight can be prevented.

A porous optical fiber preform dehydration and vitrification apparatus according to a fourth aspect of the present invention will be explained next.

The porous optical fiber preform dehydration and vitrification apparatus of the fourth aspect of the present invention is obtained by suitably combining the features of the porous optical fiber preform dehydration and vitrification apparatuses of the first to third aspects. Namely, the porous optical fiber preform dehydration and vitrification apparatus of the fourth aspect of the present invention appropriately combines the embodiments explained by referring to FIG. 2 to FIG. 26 to obtain the most preferred porous opical fiber preform dehydration and vitrification apparatus.

The porous optical fiber preform dehydration and vitrification apparatus of the first aspect of the present invention particularly improved the structure of the upper lid 3, elevating shaft 4, cooling means 21, cooling pipe 22, and insulating means 23 located in the upper portion of the furnace tube.

The porous optical fiber preform dehydration and vitrification apparatus of the second aspect of the present invention particularly improved the method for heating the porous optical fiber preform 1 inside the furnace tube 2. Further, the second aspect of the present invention related to an improvement of the method for heating the porous optical fiber preform 1.

The porous optical fiber preform dehydration and vitrification apparatus of the third aspect of the present invention particularly improved the durability of the furnace tube.

Table 5 shows examples of combination of the aspects of the invention.

TABLE 5

| Aspects of invention | Configuration of fourth aspect | | |
|---|---|---|---|
| Dehydration and vitrification apparatus of first aspect (FIG. 2 to FIG. 11, first to 10th embodiments) | ○ | ○ | ○ |
| Dehydration and vitrification apparatus of second aspect (FIG. 12 to FIG. 20, 11th to 13th embodiments) | ○ | | ○ | ○ |
| Dehydration and vitrification apparatus of third aspect (FIG. 24 to FIG. 26, 14th to 16th embodiments) | ○ | ○ | ○ |

According to the porous optical fiber preform dehydration and vitrification apparatus of the fourth aspect of the present invention, by appropriately combining the dehydration and vitrification apparatuses of the first to third aspects, synergistic effects (advantages) of the dehydration and vitrification apparatuses explained above can be obtained.

While the invention has been described by reference to specific embodiments chosen for purposes of illustration, it should be apparent that numerous modifications could be made thereto by those skilled in the art without departing from the basic concept and scope of the invention.

What is claimed is:

1. A porous optical fiber preform dehydration and sintering apparatus comprising:
   a furnace tube made of either one of a silica-based glass and a ceramic, wherein the furnace tube accommodates a porous optical fiber preform to be treated therein,
   an upper lid detachably attached to an upper portion of the furnace tube so as to shut an upper opening of the furnace tube for inserting and pulling up the porous optical fiber preform,
   an elevating shaft penetrating through an elevating shaft passage in the upper lid so that the elevating shaft can freely elevate,
   a preform holder provided at a bottom end of the elevating shaft and holding an upper portion of the porous optical fiber preform,
   a heating means provided around an outer circumference of the furnace tube and heating the porous optical fiber preform in the furnace tube by at least one heater,
   a gas feed port for feeding a gas from a lower portion to an internal portion of the furnace tube, and
   a gas discharge port for discharging the gas in the furnace tube wherein the gas discharge port is located near the upper portion above a portion having the heating means and is operatively connected to the internal portion of the furnace tube, where
      the upper lid is formed by a metal,
      the preform holder is formed from either one of silica-based glass or a ceramic,
      a corrosion-resistant layer is provided on at least an inner surface of the upper lid,
      a first seal member made of rubber or a resin provided at the elevating shaft passage of the upper lid through which the elevating shaft penetrates so that the elevating shaft can elevate while a sealed state is maintained,
      a second seal member made of rubber or a resin provided between either the upper lid and the furnace tube or the upper lid and the furnace body, and
      a cooling means for cooling the upper lid by a cooling medium is provided at the upper lid.

2. A porous optical fiber preform dehydration and sintering apparatus as set forth in claim 1, wherein a heat insulating material is provided at the upper lid covering the inner surface of the upper lid.

3. A porous optical fiber preform dehydration and vitrification apparatus as set forth in claim 2, wherein the upper lid is provided with an inert gas passage for passing an inert gas covering the inner surface thereof and covering the surface of the elevating shaft projecting into the upper lid.

4. A porous optical fiber preform dehydration and vitrification apparatus as set forth in claim 2, wherein a heat insulating means for preventing the radiant heat in the furnace tube from being conducted to the upper lid is supported at the upper portion of the preform holder.

5. A porous optical fiber preform dehydration and vitrification apparatus as set forth in claim 2, wherein the upper portion of the preform holder supports the gas blocking and insulating means which prevents the conductance of the radiant heat in the furnace tube to the upper lid and is always arranged lower than the gas discharge port during the period when the porous optical fiber preform is heat treated.

6. A porous optical fiber preform dehydration and vitrification apparatus as set forth in claim 1, wherein the upper lid is provided with an inert gas passage for passing an inert gas covering the inner surface thereof and covering the surface of the elevating shaft projecting into the upper lid.

7. A porous optical fiber preform dehydration and vitrification apparatus as set forth in claim 6, wherein a heat insulating means for preventing the radiant heat in the furnace tube from being conducted to the upper lid is supported at the upper portion of the preform holder.

8. A porous optical fiber preform dehydration and vitrification apparatus as set forth in claim 1, wherein a heat insulating means for preventing the radiant heat in the furnace tube from being conducted to the upper lid is supported at the upper portion of the preform holder.

9. A porous optical fiber preform dehydration and vitrification apparatus as set forth in claim 8, wherein a gas blocking means for keeping the sealing gas sealed between the upper lid and the elevating shaft penetrating through this from flowing into the treatment chamber containing the porous optical fiber preform is provided between the upper lid and the heat insulating means.

10. A porous optical fiber preform dehydration and vitrification apparatus as set forth in claim 9, wherein the heat insulating means is always arranged lower than the gas discharge port during the period when the porous optical fiber preform is treated.

11. A porous optical fiber preform dehydration and vitrification apparatus as set forth in claim 9, wherein the gas blocking means is always arranged higher than the gas discharge port during the period when the porous optical fiber preform is heat treated.

12. A porous optical fiber preform dehydration and vitrification apparatus as set forth in claim 8, wherein the heat insulating means is always arranged lower than the gas discharge port during the period when the porous optical fiber preform is treated.

13. A porous optical fiber preform dehydration and vitrification apparatus as set forth in claim 1, wherein the upper portion of the preform holder supports the gas blocking and insulating means which prevents the conductance of the radiant heat in the furnace tube to the upper lid and is always arranged lower than the gas discharge port during the period when the porous optical fiber preform is heat treated.

14. A porous optical fiber preform dehydration and vitrification apparatus as set forth in claim 1, wherein
the heating means is comprised of a plurality of heaters and
the plurality of heaters are provided in a plurality of stages around the outer circumference of the furnace tube in a direction toward the longitudinal direction of the porous optical fiber preform.

15. A porous optical fiber preform dehydration and vitrification apparatus as set forth in claim 14, further provided with:
a plurality of temperature sensors arranged at positions for detecting temperatures of positions of the furnace tube corresponding to heating states of the plurality of heaters and
temperature controlling means for receiving as input the detection signals of the plurality of temperature sensors and controlling the heating means,
said temperature controlling means comprising:
preheating means for controlling the plurality of heaters to preheat the entire porous optical fiber preform to a predetermined preheating temperature lower than the required heat treatment temperature before the heat treatment for dehydration and vitrification of the porous optical fiber preform and
heat treatment means for further controlling the plurality of heaters to perform the required heat treatment on the porous optical fiber preform in the preheated state by the above preheating means while moving the position where the porous optical fiber preform becomes the temperature of the dehydration and vitrification from the preheating temperature in the longitudinal direction of the porous optical fiber preform.

16. A porous optical fiber preform dehydration and vitrification apparatus as set forth in claim 15, further provided around the outer circumference of the furnace tube with a furnace tube weight distributing means for distributing the weight of the furnace tube in the longitudinal direction.

17. A porous optical fiber preform dehydration and sintering apparatus as set forth in claim 1, further comprising:
a second gas feed port for feeding the gas to the heating means,
a second exhaust pipe for discharging the gas fed from the heating means,
a pressure detecting means for detecting a difference between a pressure of gas passing through the second exhaust pipe and a pressure of gas passing through the gas discharge port operatively connected to the internal portion of the furnace tube which discharges the gas fed from the gas feed port of the lower portion of the furnace tube,
a first pressure control valve provided at the first gas exhaust pipe which is operatively connected to the internal furnace tube,
a second pressure control valve provided at the second exhaust pipe, and
a pressure controlling means for controlling the first pressure control valve or second pressure control valve so as to control the gas of the furnace tube in accordance with the pressure detected by the pressure detecting means.

18. A porous optical fiber preform dehydration and vitrification apparatus as set forth in claim 1, further provided around the outer circumference of the furnace tube with a furnace tube weight distributing means for distributing the weight of the furnace tube in the longitudinal direction.

19. A porous optical fiber preform dehydration and vitrification apparatus as set forth in claim 18, wherein said furnace tube weight distributing means is provided with:
a plurality of flanges provided at predetermined intervals in the longitudinal direction around the outer circumference of the furnace tube and
a furnace tube weight receiving means for supporting the flanges around the outer circumference of the furnace tube.

20. A porous optical fiber preform dehydration and vitrification apparatus as set forth in claim 19, wherein said furnace tube weight receiving means is constituted by muffle pipes which are interposed between vertically adjoining flanges around the outer circumference of the furnace tube and bear the weight of the furnace tube acting upon the upper flanges.

21. A porous optical fiber preform dehydration and vitrification apparatus as set forth in claim 19, wherein the furnace tube weight receiving means is constituted by:
muffle pipes arranged along the outer circumference of the furnace tube and
a plurality of supports which are provided in the muffle pipes corresponding to the flanges of the furnace tube and support the flanges.

* * * * *